US009720171B2

(12) United States Patent
Arai

(10) Patent No.: US 9,720,171 B2
(45) Date of Patent: Aug. 1, 2017

(54) OPTICAL WAVEGUIDE, OPTICAL INTERCONNECTION COMPONENT, OPTICAL MODULE, OPTO-ELECTRIC HYBRID BOARD, AND ELECTRONIC DEVICE

(71) Applicant: SUMITOMO BAKELITE CO., LTD., Tokyo (JP)

(72) Inventor: Shinya Arai, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 14/408,448

(22) PCT Filed: Jun. 18, 2013

(86) PCT No.: PCT/JP2013/066729
§ 371 (c)(1),
(2) Date: Dec. 16, 2014

(87) PCT Pub. No.: WO2013/191175
PCT Pub. Date: Dec. 27, 2013

(65) Prior Publication Data
US 2015/0168646 A1 Jun. 18, 2015

(30) Foreign Application Priority Data

Jun. 19, 2012 (JP) .................................. 2012-138118
Jun. 19, 2012 (JP) .................................. 2012-138119
(Continued)

(51) Int. Cl.
*G02B 6/122* (2006.01)
*G02B 6/42* (2006.01)
(Continued)

(52) U.S. Cl.
CPC ............. *G02B 6/122* (2013.01); *G02B 6/125* (2013.01); *G02B 6/428* (2013.01); *G02B 6/43* (2013.01)

(58) Field of Classification Search
CPC .... G02B 6/122; G02B 6/4257; G02B 6/4274; G02B 6/125; G02B 6/428; G02B 6/43
See application file for complete search history.

(56) References Cited

U.S. PATENT DOCUMENTS 8,200,058 B2 * 6/2012 Choki et al. .................. 385/131
8,290,008 B2 * 10/2012 Andry et al. .................. 372/36
(Continued)

FOREIGN PATENT DOCUMENTS

JP       5 48073      2/1993
JP      5 332880     12/1993
(Continued)

OTHER PUBLICATIONS

Shiraishi et al., "Cost-effective On-board Optical Interconnection using Waveguide Sheet with Flexible Printed Circuit Optical Engine," in Optical Fiber Communication Conference/National Fiber Optic Engineers Conference 2011, OSA Technical Digest (CD) (Optical Society of America, 2011), paper OTuQ5.*
(Continued)

*Primary Examiner* — Peter Radkowski
(74) *Attorney, Agent, or Firm* — Oblon, McClelland, Maier & Neustadt, L.L.P.

(57) ABSTRACT

In accordance with the present invention, an opto-electric hybrid board in which optical wiring is freely disposed without restriction by the arrangement of electrical elements and the like, and in which high-density mounting of electrical wiring and optical wiring is possible, and an electric device including this opto-electric hybrid board are provided. An opto-electrical hybrid board (1000) of the present (Continued)

invention has an optical waveguide (1), an optical connector disposed at an end section of the optical waveguide (1), and an opto-electric conversion section (4) disposed below the optical waveguide (1), and a motherboard (electrical wiring board) (5) disposed below the opto-electric conversion portion (4). Of these, the optical waveguide (1) includes a core layer (13) including a plurality of core sections (14) being configured to intersect with each other at one plane and side surface cladding sections, and a mirror (optical path conversion section) 17 converting the optical path of the core sections (14). Also, between the optical waveguide (1) and the motherboard (5) is connected via an electrical connector and preferably both the optical waveguide (1) and the motherboard (5) are detachable.

28 Claims, 33 Drawing Sheets

(30) Foreign Application Priority Data

| | | |
|---|---|---|
| Jun. 19, 2012 | (JP) | 2012-138120 |
| Jun. 14, 2013 | (JP) | 2013-125972 |
| Jun. 14, 2013 | (JP) | 2013-125973 |

(51) Int. Cl.
  G02B 6/43    (2006.01)
  G02B 6/125   (2006.01)

(56) References Cited

U.S. PATENT DOCUMENTS

| | | | |
|---|---|---|---|
| 8,536,512 B2* | 9/2013 | Shiraishi | 250/227.24 |
| 8,559,474 B2* | 10/2013 | Andry et al. | 372/34 |
| 8,588,566 B2* | 11/2013 | Matsuyama et al. | 385/52 |
| 8,611,711 B2* | 12/2013 | Lin | 385/31 |
| 8,699,841 B2* | 4/2014 | Mori et al. | 385/130 |
| 8,774,575 B2* | 7/2014 | Fujiwara et al. | 385/31 |
| 9,025,914 B2* | 5/2015 | Yagisawa et al. | 385/14 |
| 9,054,812 B2* | 6/2015 | Yagisawa et al. | |
| 2006/0023991 A1 | 2/2006 | Okubora | |
| 2009/0245720 A1* | 10/2009 | Choki et al. | 385/14 |
| 2010/0067861 A1* | 3/2010 | Choki et al. | 385/131 |
| 2011/0044369 A1* | 2/2011 | Andry et al. | 372/50.124 |
| 2011/0085771 A1* | 4/2011 | Matsuyama et al. | 385/125 |
| 2011/0108716 A1* | 5/2011 | Shiraishi | 250/227.24 |
| 2011/0243499 A1* | 10/2011 | Fujiwara et al. | 385/31 |
| 2011/0286713 A1* | 11/2011 | Mori et al. | 385/141 |
| 2012/0134624 A1* | 5/2012 | Lin | 385/31 |
| 2012/0326290 A1* | 12/2012 | Andry et al. | 257/680 |
| 2013/0170803 A1 | 7/2013 | Mori et al. | |
| 2013/0182997 A1 | 7/2013 | Fujiwara et al. | |
| 2014/0178079 A1* | 6/2014 | Yagisawa et al. | 398/139 |
| 2014/0193160 A1* | 7/2014 | Yagisawa et al. | 398/136 |

FOREIGN PATENT DOCUMENTS

| | | |
|---|---|---|
| JP | 2005 70082 | 3/2005 |
| JP | 2005 164650 | 6/2005 |
| JP | 2005 252040 | 9/2005 |
| JP | 2006 39391 | 2/2006 |
| JP | 2006 276735 | 10/2006 |
| JP | 2007 79283 | 3/2007 |
| JP | 2007 114583 | 5/2007 |
| JP | 2008 158474 | 7/2008 |
| JP | 2009 1064064 | 5/2009 |
| JP | 2009 145867 | 7/2009 |
| JP | 2010 90328 | 4/2010 |
| JP | 2011 105791 | 6/2011 |
| JP | 2011 107206 | 6/2011 |
| JP | 2011 221194 | 11/2011 |
| JP | 2012 68632 | 4/2012 |
| JP | 2012078607 A * | 4/2012 |
| WO | 2012 043417 | 4/2012 |

OTHER PUBLICATIONS

Hirobe et al., "Four-channel polymer optical waveguide with W-shaped index profile cores and its lowinter-channel crosstalk property," in Proc. 21st Annu. IEEE Lasers Electro-Opt. Soc. Meet., 2008, pp. 443-444.*

Hsu et al. "Fabrication and inter-channel crosstalk analysis of polymer optical waveguides with W-shaped index profile for high-density optical interconnections," Opt. Express 19, 14018-14030 (2011).*

Takeyoshi et al., "Multichannel parallel polymer waveguide with circular W-shaped index profile cores," IEEE Photon. Technol. Lett. 19(22), 1795-1797 (2007).*

International Search Report Issued Oct. 1, 2013 in PCT/JP13/066729 Filed Jun. 18, 2013.

* cited by examiner (a)

(b)

OPTICAL WAVEGUIDE, OPTICAL INTERCONNECTION COMPONENT, OPTICAL MODULE, OPTO-ELECTRIC HYBRID BOARD, AND ELECTRONIC DEVICE

TECHNICAL FIELD

The present application relates to an optical waveguide, an optical interconnection component, an optical module, an opto-electric hybrid board, and an electronic device.

The present application claims priority on Japanese Patent Application No. 2012-138118, filed Jun. 19, 2012, Japanese Patent Application No. 2012-138119, filed on Jun. 19, 2012, Japanese Patent Application No. 2012-138120, filed Jun. 19, 2012, Japanese Patent Application No. 2013-125972, filed Jun. 14, 2013, and Japanese Patent Application No. 2013-125973, filed Jun. 14, 2013, the content of which are incorporated herein by reference.

BACKGROUND ART

Optical communication technology transferring data using optical carrier waves has been developed, and an optical waveguide has become widespread as a means for leading such optical carrier waves from one point to another point. This optical waveguide has a linear core section and a cladding section provided so as to cover the periphery thereof. The core section is constituted by a material that is substantially transparent to light of the optical carrier waves and the cladding section is constituted by a material having a lower refractive index than the core section.

In the optical waveguide, light which has been introduced from one end of the core section is carried to the other end while reflecting at the boundary with the cladding section. At the incidence side of the optical waveguide is arranged a light-emitting element such as a semiconductor laser and at the emission side is arranged a light-receiving element such as a photodiode. Light that has entered from the light-emitting element propagates through the optical waveguide and is received by the light-receiving element, and communication is carried out based on the flicker pattern of the received light or the strength pattern thereof.

Laying such optical waveguide on a substrate and constructing optical wiring has been examined. For example, in the electronic device disclosed in Patent Document 1, a plurality of optical waveguides is disposed on a substrate and, furthermore, an electrical wiring board on which a light-emitting element and a light-receiving element have been mounted is arranged at an end section of the optical waveguides.

However, such optical wiring is mostly mounted in an electronic device for the purpose of replacing a part of the electrical wiring. For this reason, when saving space of the entire wiring is considering, the optical wiring is surfically mounted with the electrical wiring on the main substrate like disclosed in Patent Document 1.

On the other hand, many electrical elements other than optical wiring and electrical wiring are mounted on this substrate. In recent years, the demand for the miniaturization of substrates is great, and the mounting density of electrical elements has also increased in association with this. However, since it is necessary for these electrical elements to be fixed to the substrate by solder or the like, it is difficult for the electrical elements and the optical elements to coexist in the same position in planar view. For this reason, there is the necessity of laying the optical waveguide so as to avoid electrical elements, as well as, when the number of optical elements is large, there is the necessity of laying by dividing into pluralities. As a result, the higher the mounting density of electrical elements becomes, the more many optical waveguides must be intricately disposed, and the number of production steps becomes very large and the total extension of the optical waveguide increases, thus leading to increase in transmission loss.

PRIOR ART DOCUMENTS

Patent Documents

Patent Document 1: Japanese Patent Application, Publication No. 2009-104064

DISCLOSURE OF THE INVENTION

Problems to be Solved by the Invention

The object of the present invention is to provide an opto-electric hybrid board in which optical wiring is freely disposed without restriction by the arrangement of electrical elements and the like, and in which high-density mounting of electrical wiring and optical wiring is possible, and an electronic device including this opto-electric hybrid board.

On the other hand, mounting a sheet-like optical waveguide so as to cover electrical elements mounted on a substrate has been examined. Thereby, there are no longer the restrictions by the mounting of electrical elements in the laying path in the core section of the optical waveguide.

Also, since the optical elements become sandwiched between the substrate and the sheet-like optical waveguide, there is the possibility that heat dissipation of the electrical elements will decrease.

An object of the present invention is also to provide an optical waveguide that, when mounted so as to be superimposed on an electrical wiring board, is able to freely construct the electrical wiring while retaining heat dissipation of the electrical elements disposed on the electrical wiring board, and an optical interconnection component, an optical module, an opto-electric hybrid board, and an electronic device including highly-dense optical wiring.

Means for Solving the Problems

The objectives are achieved by the present invention of (1) to (28) below.

(1) An opto-electric hybrid board comprising:
an electrical wiring board including:
a first substrate,
a electrical wiring disposed on an inside of the first substrate or on a surface of the first substrate, and
an electrical element configured to be mounted on the first substrate, and
a film-like optical waveguide configured such that transmission or reception of a signal associated with opto-electric conversion is carried out between the optical waveguide and the electrical wiring board, the optical waveguide configured such that the electrical element is disposed between the optical waveguide and the first substrate, the optical waveguide including:
a core layer including: a plurality of core sections and a side surface cladding section disposed adjacent to a side surface of each core sections, the core sections configured to intersect each other on one plane, and the core sections having a refractive index, the refractive index decreasing in a direction from a center of the core sections towards the side surface cladding sections, and an optical path conversion section configured to convert an optical path of the core sections.

(2) The opto-electric hybrid board according to (1) above, wherein the optical waveguide is configured to be detachable from the electrical wiring board.

(3) The opto-electric hybrid board according to (1) or (2) above, further comprising:

an opto-electric conversion section, including:
a second substrate,
an electrical wiring disposed on an inside of the second substrate or on a surface of the second substrate, and
an optical element configured to mount on the second substrate, and wherein
the optical path conversion section that the optical waveguide comprises is configured to optically connect to the optical element that the opto-electric conversion section comprises, and the electrical wiring that the opto-electric conversion section comprises is configured to electrically connect to the electrical wiring that the electrical wiring board comprises.

(4) The opto-electric hybrid board according to (3) above, further comprising an electrical connector configured to electrically connect to the electrical wiring of the opto-electric conversion section and the electrical wiring of the electrical wiring board.

(5) The opto-electric hybrid board according to (3) or (4) above, wherein the opto-electric conversion section further includes a radiator configured to connect to the optical element.

(6) The opto-electric hybrid board according to any of (1) to (5) above, wherein the optical waveguide further includes a metal layer disposed on at least one surface of the core layer.

(7) The opto-electric hybrid board according to (6) above, wherein a constituent material of the metal layer includes aluminum, iron, copper, or an alloy of aluminum, iron or copper as a main component.

(8) The opto-electric hybrid board according to (6) or (7) above, wherein the metal layer is configured to be in direct contact with the electrical element or indirect contact with the electrical element via a heat conduction section.

(9) The opto-electric hybrid board according to any of (1) to (8), wherein the optical waveguide is arranged such that a space is formed between the first substrate and the electrical wiring board.

(10) The opto-electric hybrid board according to any of (1) to (9) above, comprising:

a motherboard;
an electrical interposer configured to mount, as the electrical wiring board, on the motherboard; and
the optical waveguide, wherein
the optical waveguide is configured to cover the electrical element that the electrical interposer comprises, and the electrical element is disposed between the optical waveguide and the first substrate.

(11) The opto-electric hybrid board according to (10) above, wherein the electrical wiring board comprises:

a metal layer disposed on both sides of the first substrate, and
a via post configured to connect both the metal layers by penetrating the first substrate.

(12) The opto-electric hybrid board according to any of (1) to (11) above, wherein the electrical wiring board includes a metal layer disposed on at least one side of the first substrate.

(13) The opto-electric hybrid board according to any one of (1) to (12), comprising:

the optical waveguide, and
an optical connector disposed at an end section of the core section.

(14) An electronic device comprising the opto-electric hybrid board according to any one of (1) to (13).

(15) An optical waveguide having:

a core layer including a through-hole, the through-hole configured for insertion of the electrical element when the optical waveguide is superimposed on an electrical wiring board having an electrical element, the core layer including:
a core section, and
a side surface cladding section disposed adjacent to a side surface of the core section; and
an optical path conversion section configured to convert an optical path of the core section.

(16) The optical waveguide according to (15) above, further comprising:

a metal layer disposed on one side of the core layer, the metal layer configured to block at least a part of the through-hole.

(17) The optical waveguide according to (16) above, wherein a constituent material of the metal layer includes any of copper, a copper alloy, aluminum, and an aluminum alloy as a main component.

(18) The optical waveguide according to any of (15) to (17) above, wherein the core layer includes a plurality of the core sections, the plurality of core sections being configured to intersect with each other at one plane.

(19) The optical waveguide according to any one of (15) to (18), wherein the core sections have a refractive index, the refractive index continuously decreasing in a direction from a center of the core sections towards the side surface cladding section.

(20) The optical waveguide according to any of (15) to (19) above, further comprising:

a lens disposed on another side of the core layer.

(21) An optical interconnection component comprising:

an optical waveguide according to any of (15) to (20) above, and
an optical connector disposed at an end section of the core section.

(22) An optical module comprising:

an optical waveguide according to any of (15) to (20) above, and
an optical element disposed on one side of the core layer and configured to optically connect to the optical path conversion section.

(23) The optical module according to (22) above, further comprising:

a radiator configured to cover the optical element.

(24) The optical module according to 22 or 23 above, further comprising:

a substrate disposed between the core layer and the optical element;
an electrical wiring disposed on an inside of the substrate or on a surface of the substrate; and
a first terminal configured to connect to the electrical wiring.

(25) The optical module according (24) above, further comprising:

a motherboard; and
an electrical interposer configured to mount, as the electrical wiring board comprising an electrical element, on the motherboard, and the electrical interposer being configured to be superimposed by the optical waveguide, the electrical element which the electric interposer comprises being configured for insertion into the through-hole.

(26) The optical module according to (25) above, wherein the electrical interposer includes:

electrical wiring disposed on an inside of the electrical interposer or on a surface of the interposer, and a second terminal configured to connect to the electrical wiring, wherein the first terminal is configured to connect to the second terminal disposed on the electrical interposer.

(27) An opto-electric hybrid board comprising an optical waveguide according to any of (15) to (20) above.

(28) An electronic device comprising an optical waveguide according to any of (15) to (20) above.

Effects of the Invention

In accordance with the present invention, an opto-electric hybrid board in which optical wiring is freely disposed without restriction by the arrangement of electrical elements and the like, and in which high-density mounting of electrical wiring and optical wiring is possible can be obtained.

Also, since detachment of an optical waveguide in which optical wiring has been constructed is possible, on opto-electric hybrid board for which assembly and repair are easy can be obtained.

Also, in accordance with the present invention, an electrical device comprising the above-mentioned opto-electric hybrid, and for which miniaturization and high performance has been made possible, can be obtained.

Furthermore, in accordance with the present invention, an optical waveguide which, when mounted so as be superimposed on the electrical wiring board, has made possible the free construction of optical wiring while retaining heat dissipation of electrical elements disposed on the electrical wiring board can be obtained.

Also, in accordance with the present invention, an optical interconnection component, an optical module, an opto-electric hybrid board, and an electronic device including high-density optical wiring can be obtained.

DESCRIPTION OF EMBODIMENTS

Hereinafter, the optical waveguide, the optical interconnection component, the optical module, the opto-electric hybrid board, and the electronic device of the present invention are explained in detail based on preferred embodiments shown in the attached drawings.

<Opto-Electric Hybrid Board>
<<First Embodiment>>

Firstly, a first embodiment of the opto-electric hybrid board of the present invention is explained.

Figure 1:
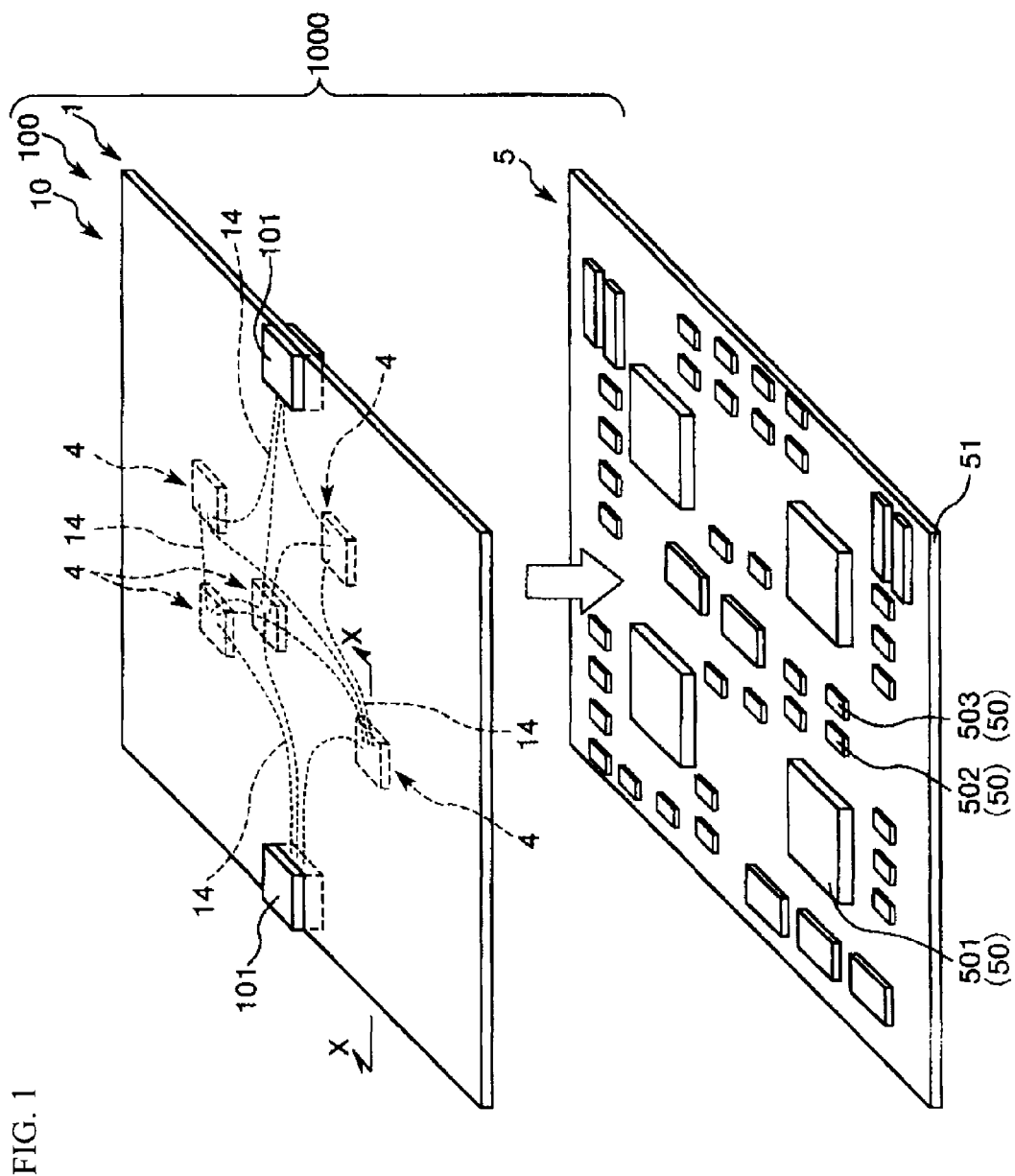
FIG. 1 is a perspective view (shown partially see-through) showing a first embodiment of the opto-electric hybrid board of the present invention.
Figure 2:
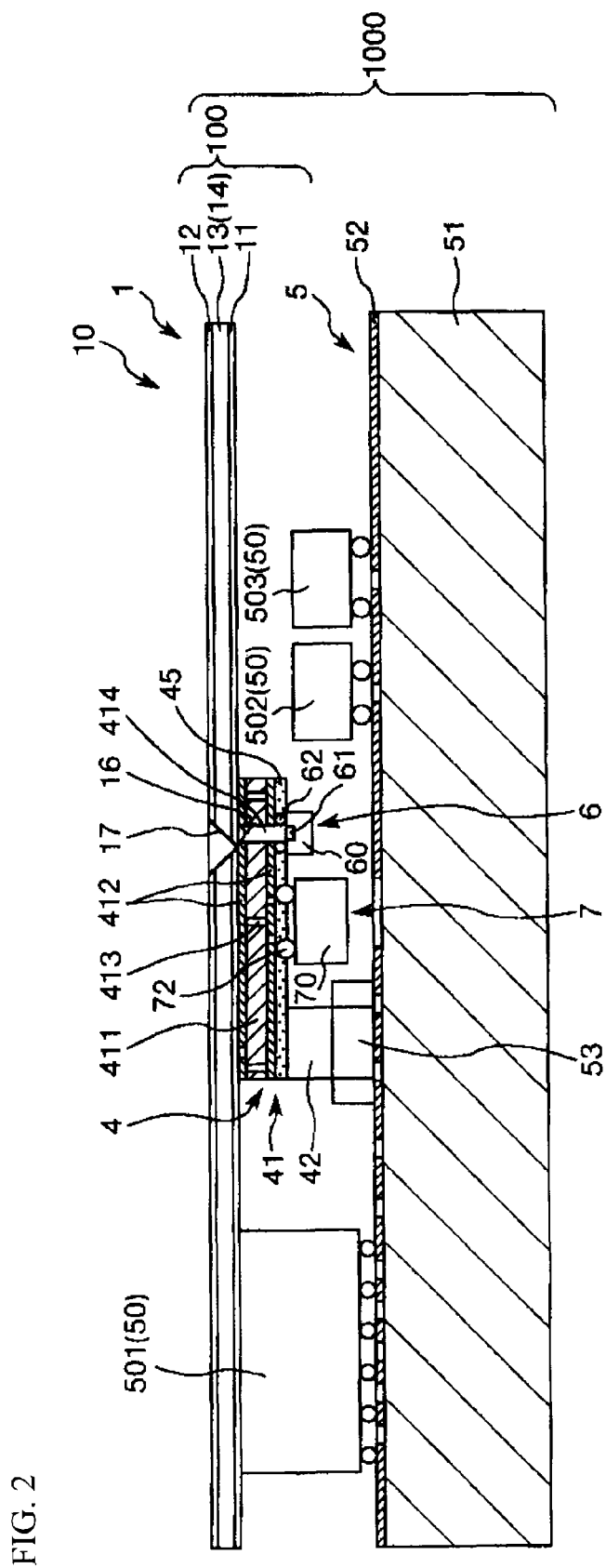
FIG. 2 is a line X-X cross-sectional view in the state in which the optical waveguide is superimposed as shown by the void arrow in FIG. 1.

FIG. 1 is a perspective view (shown partially cutaway and see-through) showing the first embodiment of the opto-electric hybrid board of the present invention and FIG. 2 is a line X-X cross-sectional view in the state in which the optical waveguide is superimposed as shown by the void arrow in FIG. 1.

An optical module 100 shown in FIG. 1 has an optical waveguide 1, an optical connector 101 disposed at an end section thereof, and an opto-electric conversion section 4 disposed below the optical waveguide 1. Also, an opto-electric hybrid board 1000 shown in FIG. 1 has the optical module 100, and a motherboard (electrical wiring board) 5 disposed below the opto-electric conversion section 4.

Of these, the optical waveguide 1 is a sheet-like member forming a quadrangle in the planar view. The optical waveguide 1, as shown in FIG. 2, is formed by stacking a cladding layer 11, a core layer 13, and a cladding layer 12 in this order from below. Core sections 14 propagating an optical signal are formed with a desired pattern in the core layer 13. Also, in FIG. 1, the core sections 14 formed in the core layer 13 are shown by broken lines together with the optical connector 101 and the opto-electric conversion section 4 hidden by the optical waveguide 1.

Of the four sides of the optical waveguide 1, the core section 14 is exposed from two opposing sides and the optical connector 101 is disposed there. The optical interconnection component 10 is configured so as able to be optically connected with the core section 14 of the optical waveguide 1 and other optical components via the optical connector 101. Also, in FIG. 1, although an example in which the optical connector 101 is disposed on two opposing sides of the optical waveguide 1 is shown, arrangement of the optical connector 101 is not limited thereto, and may be disposed on sides other than the sides shown in FIG. 1 and in locations other than the outer edge.

A plurality of opto-electric conversion sections 4 is disposed on the lower surface of the optical waveguide 1. By the opto-electric conversion section 4, an electric signal is converted to an optical signal and sent to the core sections 14, and an optical signal that has propagated through the core section 14 is received and converted to an electric signal. In addition, a mirror (optical path conversion section) 17 corresponding to the light receiving/emitting section of the opto-electric conversion section 4 is disposed. By this mirror 17, the light path of the core section 14 is converted from the surface direction of the optical waveguide 1 to a direction perpendicular thereto, and the core section 14 and the light receiving/emitting section of the opto-electric conversion section 4 are optically connected.

On the other hand, a plurality of electrical elements for an electrical wiring board 50 such as a plurality of LSI 501, a condenser 502, and a chip resistor 503 are mounted on the motherboard 5 disposed below the opto-electric conversion section 4. Also, between the opto-electric conversion section 4 and the motherboard 5 is electrically and mechanically connected via an electrical connector.

In such opto-electric hybrid board 1000, as shown in FIGS. 1 and 2, the sheet-like optical waveguide 1 is superimposed so as to cover the motherboard (electrical wiring board) 5. For this reason, since the electrical elements for an electrical wiring board 50 and the core section 14 coexist in the same region when the opto-electric hybrid board 1000 is planarly viewed, the pattern of the core section 14 can be freely set. In other words, since the electrical circuit and the optical wiring can be constructed on different levels, the electrical circuit and the optical wiring can be freely set in each level. As a result, for example, the distance of the core section 14 can be made minimized and transmission efficiency of the optical signal can be optimized. Also, since room occurs in the region forming the core section 14, when a plurality of the core sections 14 is formed, crosstalk can be relaxed by increasing the space between adjoining core sections 14, and, since more core sections can be formed, high densification of the core section 14 can be attained. Furthermore, since it becomes easier to separate the optical waveguide 1 from the motherboard 5, there is the advantage that it is easy to replace the optical waveguide 1 and the electrical element of an electrical wiring board 50 according to necessity.

Hereinafter, each section of the opto-electric hybrid board 1000 is explained in detail.

(Optical Waveguide)

Firstly, the optical waveguide is explained.

The optical waveguide 1 is a sheet-like member having the core section 14 and a cladding section, and is used as optical wiring transmitting an optical signal from one end section to the other end section of the core section 14.

Figure 3:
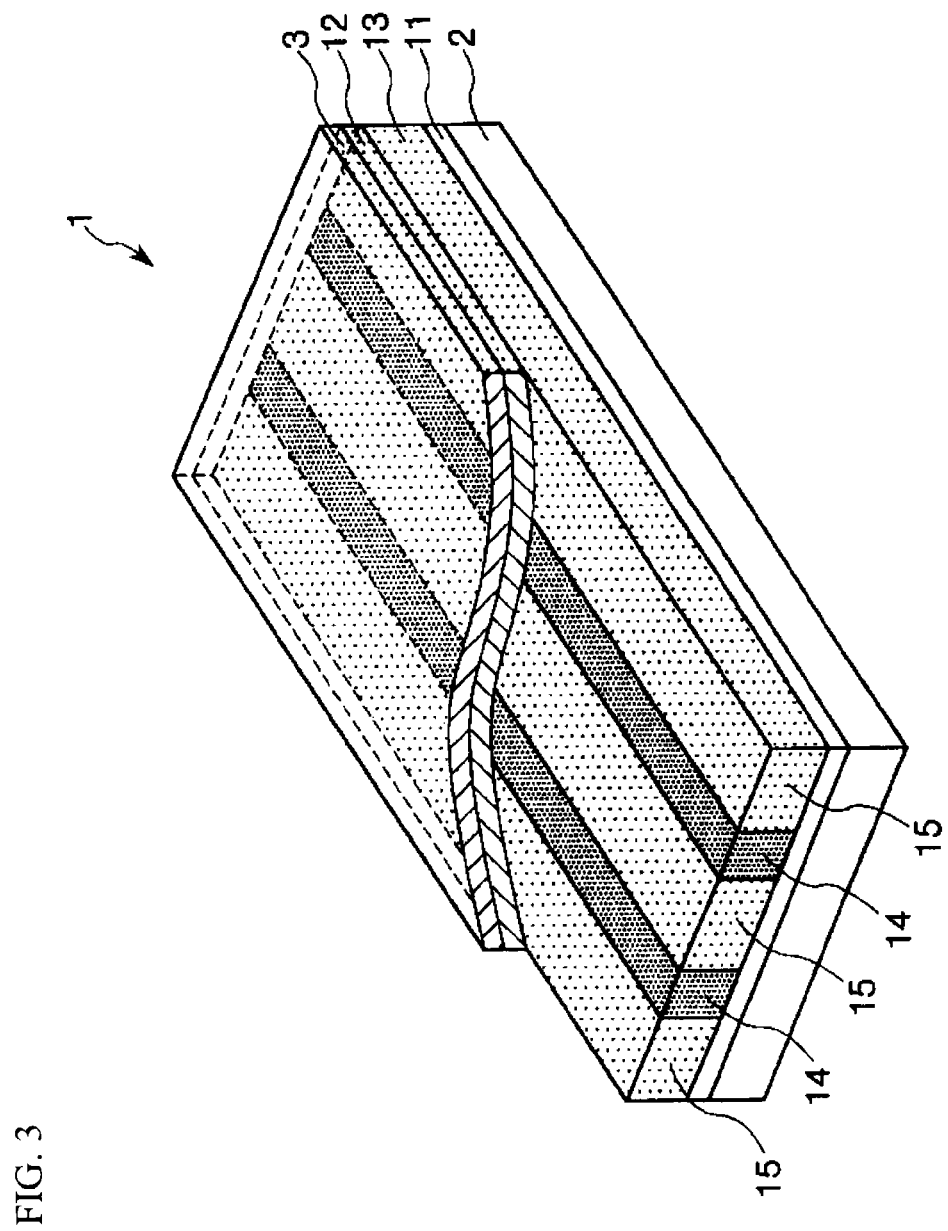
FIG. 3 is a perspective view (shown partially cutaway and see-through) showing a part of the optical waveguide shown in FIGS. 1 and 25 enlarged.

FIG. 3 is a perspective view (shown partially cutaway and see-through) showing a part of the optical waveguide shown in FIG. 1 enlarged.

((Core Layer))

The optical waveguide 1 shown in FIG. 3 has, from the lower side, the three layers of the cladding layer 11, the core layer 13, and the cladding layer 12. Of these, a long core section 14 and a side surface cladding section 15 adjacent to this core section 14 are formed in the core layer 13. Thereby, the core section 14 becomes surrounded by a cladding section (side surface cladding section 15 and each cladding layer 11, 12) and light can be propagated.

It suffices that the refractive index of the core section 14 is larger than the refractive index of the cladding section, and the difference thereof is preferably 0.3% or more and more preferably 0.5% or more. On the other hand, the upper limit is not specifically set, and is preferably about 5.5%. When the refractive index difference is less than the above-mentioned lower limit, there is the possibility that the effect of propagating light is reduced. On the other hand, when the refractive index is above the above-mentioned upper limit value, further improvement in the light transmission effect cannot be expected.

In addition, the above-mentioned refractive index difference is represented by the following formula where the refractive index of the core section 14 is denoted as A and the refractive index of the cladding section is denoted as B.

Refractive index difference (%)=|A/B−1|×100

Also, the refractive index distribution in the transverse section of the core section 14 may be a distribution of any shape.

Figure 4:
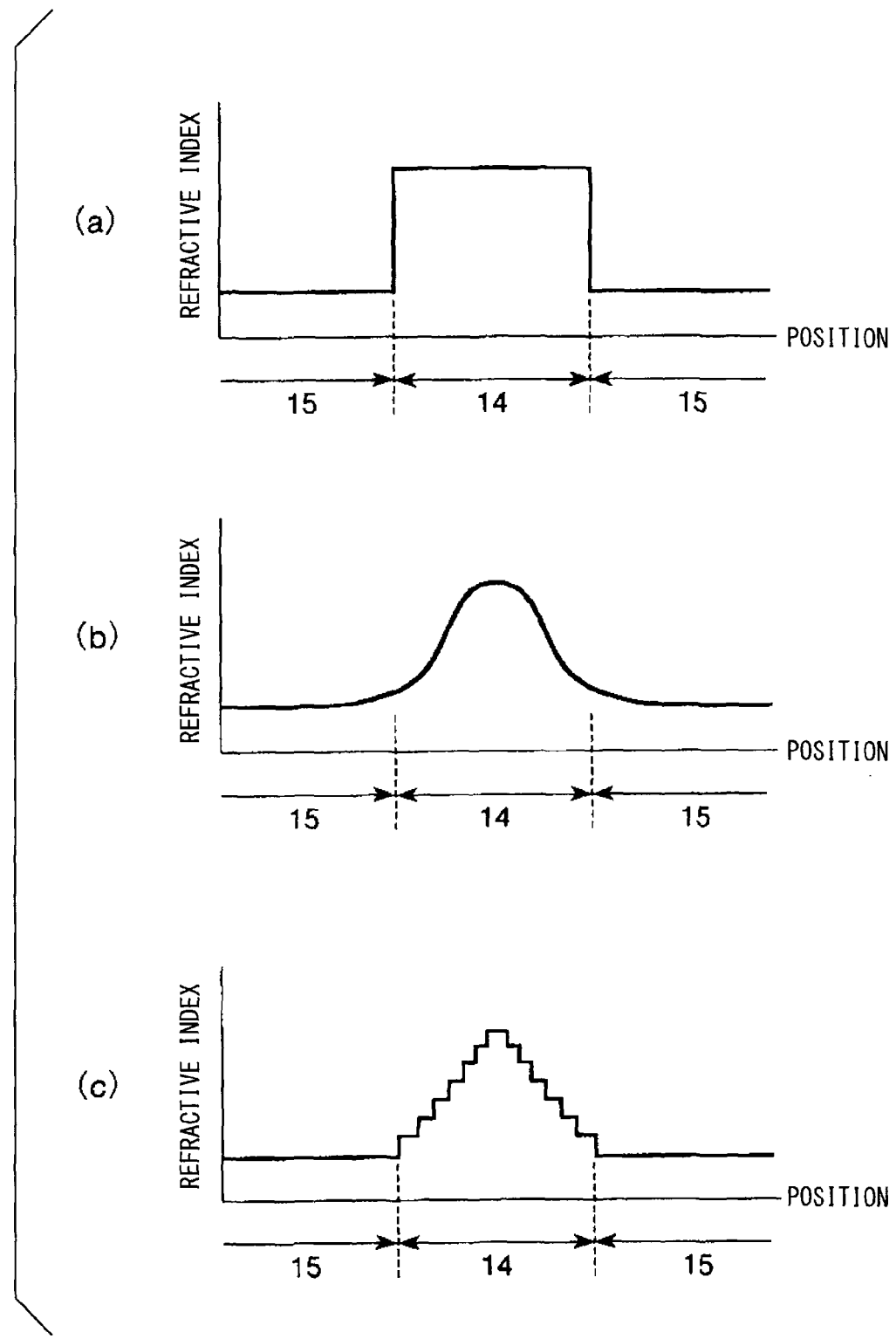
FIG. 4 is a drawing showing an example of the refractive index distribution in the width direction of the transverse section of the core section of the optical waveguide.

FIG. 4 is a drawing showing an example of the refractive index distribution in the width direction of the transverse section of the core section 14 of the optical waveguide 1.

This refractive index distribution may be a so-called step index-(SI) type distribution in which the refractive index changes discontinuously like shown in FIG. 4(a), or may be a so-called graded index-(GI) type distribution in which the refractive index changes continuously as shown in FIG. 4(b). If it is an SI-type distribution, formation of refractive index distribution is easy, and if it is a GI-type distribution, transmission efficiency is improved since signal light gathers in the region having a high refractive index.

Also, in the above-mentioned refractive index distribution, although the refractive index changes step-wise as shown in FIG. 4(c), it may be a distribution of a shape in which it can be considered that the refractive index continuously changes as a whole. The refractive index distribution shown in FIG. 4(c) is a distribution in which the refractive index changes stepwise, and since the amount of change in the refractive index for one step in the part changing step-wise is sufficiently small (for example, ⅕ or less) compared to the amount of change (refractive index difference) of the entire refractive index, the refractive index distribution like shown in FIG. 4(c) shows optical transmission characteristics close to a GI-type distribution. For this reason, the refractive index distribution shown in FIG. 4(c) has high transmission efficiency and formation is easy.

In addition, when the refractive index distribution is GI type or a shape based thereon, the above-mentioned refractive index difference can be determined with A denoted as the maximum value of the refractive index in the core section 14 and B denoted as the minimum value of the refractive index in the cladding section.

Also, in the distributions shown in FIGS. 4(b) and 4(c), the rate of change of the refractive index is preferably about 0.001 to 0.035 [/10 μm] and more preferably about 0.002 to 0.030 [/10 μm]. If the rate of change of the refractive index is within the above-mentioned ranges, effects such as decrease in transmission loss in each core section 14, decrease in the bluntness of the pulse signal, and suppression of crosstalk can be reliably obtained.

Hereinafter, the GI-type refractive index distribution is particularly explained in detail.

FIG. 5(a) is an example of a transverse sectional view cut so as to transect the core section of the optical waveguide shown in FIG. 3 and FIG. 5(b) is a drawing schematically showing an example of the refractive index distribution W on the center line C1 passing the center of the thickness direction of the core layer 13 of the transverse sectional view shown in FIG. 5(a). In addition, in FIG. 5(a), regarding the two long core sections 14 formed in the core layer 13 shown in FIG. 3, that on the left side is denoted as a core section 141 and that on the right side is denoted as a core section 142. Similarly, regarding the three side surface cladding sections 15 shown in FIG. 3, that on the left side is denoted as a side surface cladding section 151, that in the center is denoted as a side surface cladding section 152, and that on the right side is denoted as a side surface cladding section 153.

The refractive index distribution W, as shown in FIG. 5(b), has a high refractive index region WH that is disposed corresponding to the position of each core section 14 and that has a relatively high refractive index including a local maximum value Wm and two gradually reducing sections in which the refractive index continuously decreases towards both sides from this local maximum value Wm and has a low refractive index region WL that is disposed corresponding to the position of each side surface cladding section 15 and that has a relatively low refractive index. It is configured such that, in both sides of the local maximum value Wm in the high refractive index region WH, the refractive index continuously decreases toward the adjacent low refractive index region WL. In other words, in the high refractive index region WH, the local maximum value Wm is the apex and the refractive index is distributed so as to decline by gentling sweeping down from both sides thereof. On the other hand, in the low refractive index region WL, a refractive index that is lower than the refractive index of the high refractive index region WH and that is almost constant is distributed.

Also, although it is preferable that the plurality of local maximum values Wm existing in the refractive index distribution W are the same value, they may deviate a little. In this case, the deviation is preferably within 10% of the average value of the plurality of local maximum values Wm.

In addition, the two parallel core sections 14 are each formed as a long and narrow linear shape, and the refractive index distribution W like mentioned above maintains almost the same distribution in the entire longitudinal direction of these core sections 14.

On the other hand, the refractive index distribution W like mentioned above is also formed in the core section 14 intersecting these core sections 14, and almost the same distribution is maintained in the entire longitudinal direction of these core sections 14.

In association with the refractive index distribution W like above, it becomes so that the core section 14 and the side surface cladding sections 15 adjacent to side surfaces thereof are formed in the core layer 13 shown in FIG. 1.

More specifically, in the core layer 13 shown in FIG. 5(a), the two parallel core sections 141, 142 and the side surface cladding sections 151, 152, 153 disposed in regions other than these core sections are disposed. Thereby, it becomes the state in which each core section 141, 142 is surrounded by each side surface cladding section 151, 152, 153 and each cladding layer 11, 12 respectively. Here, since the refractive index of these core sections 141, 142 becomes higher than the side surface core sections 151, 152, 153, light can be confined in the width direction of each core section 141, 142. Also, dense dots are attached to each core section 14 shown in FIG. 5(a) and distanced dots are attached to each side surface cladding section 15.

Also, in the optical waveguide 1, by propagating light incident on one end section of the core section 14 to the other end while confining also in the thickness direction of each core section, it can be extracted from the other end section of the core section 14.

Also, in the refractive index distribution W, the refractive index continuously changes as a whole. Thereby, compared to an optical waveguide having a so-called step index-type refractive index distribution in which the refractive index changes stepwise, since the action of confining light in the core section is strengthened, further decrease in transmission loss is attained.

Furthermore, in the refractive index distribution W, since it has a local maximum value as well as the refractive index continuously changes, by the property of the speed of light is inversely proportional to the refractive index, the speed of light becomes faster as it moves away from the center and it hardly occurs difference in the propagation time for each optical path. For this reason, it hardly lose the shape of the transmission waveform, and, for example, even if a pulse signal is included in the transmitted light, bluntness of the pulse signal (widening of the pulse signal) can be suppressed. In addition to this, interference of transmitted light in the intersecting section is controlled. As a result, an optical waveguide 1 in which optical communication quality can be further increased can be obtained.

Note that, the refractive index continuously changes in the refractive index distribution W refers to the state in which the curve of the refractive index distribution has roundness in each section and this curve is differentiable.

Also, of the refractive index distribution W, although the local maximum value Wm is positioned in the core sections 141, 142 as shown in FIG. 5(a), even in the core sections 141, 142, it is preferably in the central section of the width thereof. Thereby, in each core section 141, 142, the probability of transmitted light gathering in the central section of the width of the core sections 141, 142 increases and relatively the probability of leaking to the side surface cladding sections 151, 152, 153 decreases. As a result, transmission loss of the core sections 141, 142 can be further decreased.

In addition, the central section of the width of the core section 141 refers to the region of a distance of 30% of the width of the high refractive index region WH on both sides from the center of the high refractive index region WH.

Also, it is better for the difference between the local maximum value Wm and the average refractive index in the low refractive index region WL to be as large as possible, and about 0.005 to 0.07 is preferable, about 0.007 to 0.05 is more preferable, and about 0.01 to 0.03 is further preferable. Thereby, light can be reliably contained in the core sections 141, 142. In other words, if the refractive index difference is less than the above-mentioned lower limit, there is the possibility that light leaks from the core sections 141, 142. On the other hand, if the refractive index difference is above the above-mentioned upper limit, not only can further improvement in the light confinement effect not be expected, but production of the optical waveguide 1 becomes difficult.

Also, in the refractive index distribution W in the core sections 141,142, when the position of the transverse section of the core layer 13 is the horizontal axis and the refractive index is the vertical axis as shown in FIG. 5(b), the shape near the local maximum value Wm preferably roughly a convex U-shape. Thereby, the light confinement action in the core sections 141, 142 becomes more remarkable.

On the other hand, the deviation from the average refractive index in the low refractive index region WL is preferably within 5% of the average refractive index. Thereby, the low refractive index region WL reliably functions as the side surface cladding section 15.

Here, by the refractive index distribution W like described above, although effects such as decrease in transmission loss, decrease in bluntness of the pulse signal, control of crosstalk, and control of interference in the intersecting section can be obtained, the present inventor has found that these effects receive a great influence from the average width WCL of a side surface cladding section or the ratio of the average width WCO of a core section and the average width WCL of a side surface cladding section. Also, when these factors are within given ranges, the above-described effects have been found to be more remarkable and reliable.

In other words, in the present invention, the ratio (WCO/WCL) of the average width WCO of a core section and the average width WCL of a side surface cladding section is preferably within the range 0.1 to 10. By optimizing the ratio of the width between the core section 14 and the side surface cladding section 15, each of the above-described effects can be advanced. Accordingly, for example, if WCO/WCL is less than the above-mentioned lower limit, since the average width of the core section 14 becomes too narrow, although decrease in crosstalk is attained, there is the possibility that increase of transmission loss becomes easier and also, miniaturization of the optical waveguide 1 is impeded. Also, if WCO/WCL exceeds the above-mentioned upper limit, since the average width of the side surface cladding becomes too narrow, crosstalk is increased and furthermore, the average width of the core section 14 becomes too wide, and thus there is the possibility that bluntness of the pulse signal is increased.

In addition, WCO/WCL is more preferably about 0.1 to 5 and further preferably about 0.2 to 4.

On the other hand, in the present invention, independent of WCO/WCL or in addition thereto, the average width WCL of a side cladding section 15 is preferably within the range of 5 to 250 μm. Thereby, each of the above-described effects can be advanced. Accordingly, for example, if the WCL is less than the above-mentioned lower limit, since the average width of the side surface cladding section 15 becomes too narrow, there is the possibility that the bluntness of the pulse signal increases and the crosstalk increases. Also, if the WCL exceeds the above-mentioned upper limit, the shape of the refractive index distribution W cannot be optimized and there is the possibility that the transmission loss increases. Furthermore, there is the possibility that miniaturization of the optical waveguide 1 becomes difficult.

In addition, WCL is more preferably within the range of 10 to 200 μm and further preferably within the range of 10 to 120 μm.

Also, the refractive index distribution W, near each local maximum value Wm, may include a flat section in which the refractive does not substantially change. Even in this case, the optical waveguide of the present invention achieves the action and effects like described above. Here, the refractive index in the flat section in which the refractive index does not substantially change refers to a region in the fluctuation in the refractive index is less than 0.001 and the refractive index continuously decreases in both side sections thereof.

The length of the flat section is not particularly limited, and is preferably 100 nm or less, more preferably 20 m or less, and further preferably 10 m or less.

In addition, the number of core sections 14 is not particularly limited, and may be three or more. Even in this case, the refractive index distribution W is a distribution that has a high refractive index region WH corresponding to each core section 14 and a low refractive index region WL exists between high refractive index regions WH.

Also, the refractive index distribution W may be a distribution having a local minimum value between the high refractive index region WH and the low refractive index region WL. By such distribution, the function of propagating by confining in a region having a high refractive index is enhanced, and transmission loss and bluntness of the pulse signal can particularly be suppressed so as to be small.

Also, in this case, in the low refractive index region WL, a local maximum value (This is referred to as the "second local maximum value".) smaller than a local maximum value (This is referred to as the "first local maximum value".) is preferably included in the high refractive index region. By including such second local maximum value in the low refractive index region WL, crosstalk between adjacent core sections in the width direction is suppressed. As a result, even when multi-channeling by forming a plurality of core sections in the core layer 13 and making highly densified by narrowing the gap between core sections, if it is the optical waveguide 1, high quality optical communication can be maintained. Also, even if a plurality of core sections 14 intersect each other on the same plane, interference of light signals is suppressed.

FIG. 6(a) is another example of a transverse sectional view cut so as to transect the core section of the optical waveguide shown in FIG. 3 and FIG. 6(b) is a drawing schematically showing another example of the refractive index distribution W on the center line C1 passing the center of the thickness direction of the core layer 13 of the transverse sectional view shown in FIG. 6(a).

The refractive index distribution W shown in FIG. 6(b) has four local minimum values Ws1, Ws2, Ws3, Ws4 and five local maximum values Wm1, Wm2, Wm3, Wm4, Wm5. Also, in the five local maximum values exist local maximum values (first local maximum values) Wm2 and Wm4, which have a relatively large refractive index, and local maximum values (second local maximum values) Wm1, Wm3, Wm5, which have a relatively small refractive index.

Of these, the local maximum value Wm2 and the local maximum value Wm4 exist between the local minimum value Ws1 and the local minimum value Ws2, and between the local minimum value Ws3 and the local minimum value Ws4.

Figure 6:
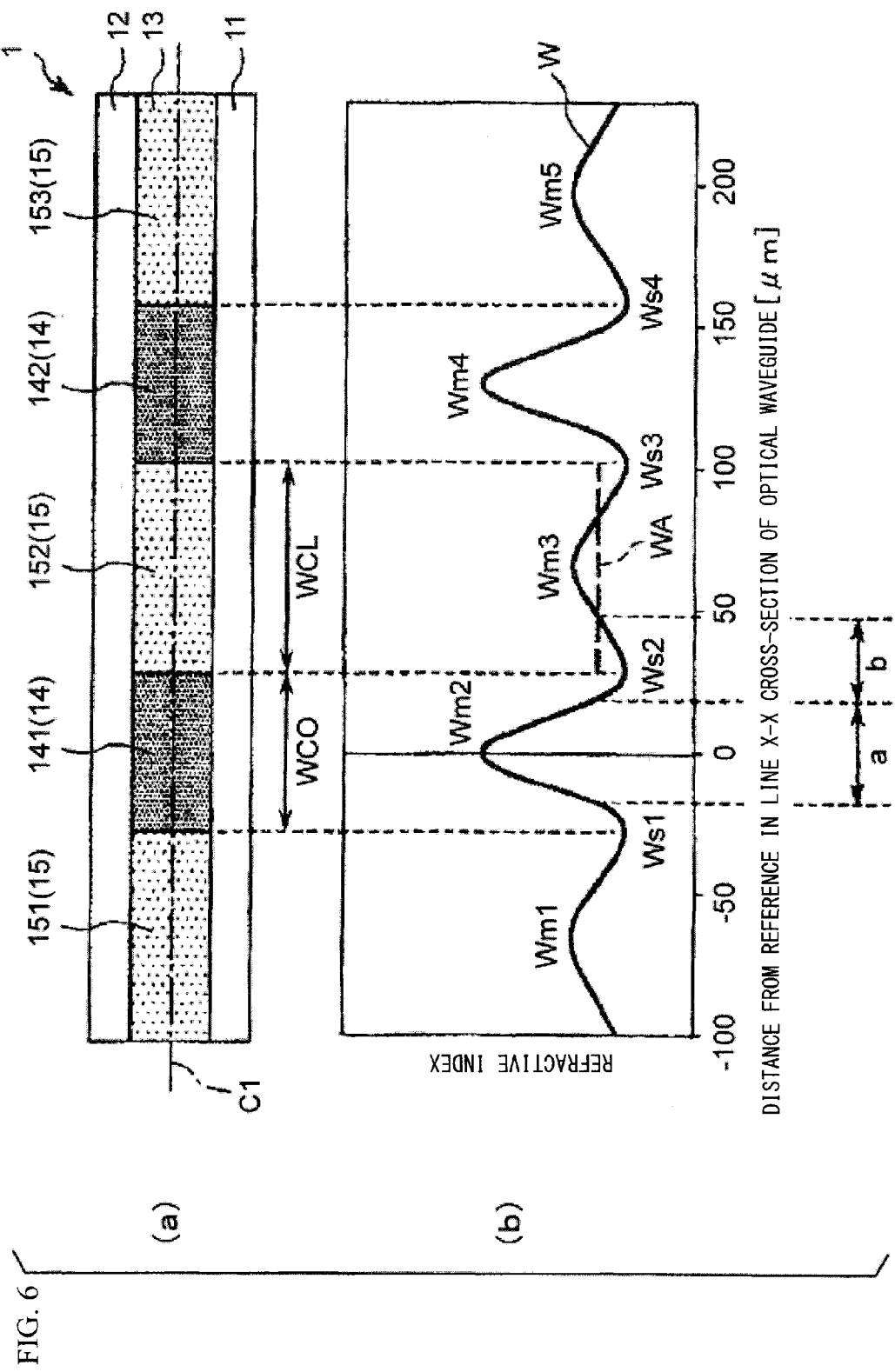
FIG. 6(a) is another example of a transverse sectional view cut so as to transect the core section of the optical waveguide shown in FIG. 3
FIG. 6(b) is a drawing schematically showing another example of the refractive index distribution W on the center line C1 passing the center of the thickness direction of the core layer of the transverse sectional view shown in FIG. 6(a).

In the optical waveguide 1 shown in FIG. 6, from the local maximum value Wm2 with a relatively large refractive index being positioned between the local minimum value Ws1 and the local minimum value Ws2, this region becomes a core section 14, and similarly, from the local maximum value Wm4 being positioned between the local minimum value Ws3 and the local minimum value Ws4, this becomes a core section 14. In addition, herein, the region between the local minimum value Ws1 and the local minimum value Ws2 is denoted as the core section 141, and the region between the local minimum value Ws3 and the local minimum value Ws4 is the denoted as the core section 142.

Also, from the region on the left of the local minimum value Ws1, between the local minimum value Ws2 and the local minimum value Ws3, and the region on the right of the local minimum value Ws4 being regions respectively neighboring both sides of the core section 14, they become side surface cladding sections 15. In addition, herein, the region on the left of the local minimum value Ws1 is denoted as a side surface cladding section 151, the region between the local minimum value Ws2 and the local minimum value Ws3 is denoted as a side surface cladding section 152, and the region on the right of the local minimum value Ws4 is denoted as the side surface cladding section 153.

In other words, it suffices that the refractive index distribution W has a region in which at least the second local maximum value, the local minimum value, the first local maximum value, the local minimum, and the second local maximum value are aligned in this order. In addition, this region is repetitively disposed corresponding to the number of core sections. In the case where two core sections 14 are disposed like the present embodiment, it suffices that the refractive index distribution W has a region in which the local maximum values and the local minimum values are alternately aligned like the second local maximum value, the local minimum value, the first local maximum value, the local minimum value, the second local maximum value, the local minimum value, the first local maximum value, the local minimum value, and the second local maximum value, and, regarding the local maximum value, the first local maximum value and the second local maximum value are alternately aligned.

Also, although preferably the plurality of local minimum values, the plurality of first local maximum values, and the plurality of second local maximum values respectively have almost mutually the same values, slight deviations in the mutual values are allowable so long as the relationships of the local minimum value is smaller than the first local maximum value and the second local maximum value, and the second local maximum value is smaller than the first local maximum value are kept. In this case, the deviation preferably is suppressed to within 10% of the average of the plurality of local minimum values.

Here, the four local minimum values Ws1, Ws2, Ws3 and Ws4 are each smaller than the average refractive index WA of the adjacent side surface cladding section 15. Thereby, there exists a region having a refractive index smaller than the refractive index of the side surface cladding sections 15 at the boundary of each core section 14 and each side surface cladding sections 15. As a result, a steeper slope of refractive index appears near each local minimum value Ws1, Ws2, Ws3 Ws4, and since the leakage of light from each core section 14 is suppressed thereby, the optical waveguide 1 with small transmission loss can be obtained.

Also, of the refractive index distribution W shown in FIG. 6(b), although the local maximum values Wm1, Wm3, Wm5 are positioned the side surface cladding sections 151, 152, 153, they are preferably positioned other than near the edge section of the side surface cladding sections 151, 152, 153 (near interface with core sections 141, 142). Thereby, the local maximum values Wm2, Wm4 in the core sections 141, 142 and the local maximum values Wm1, Wm3, Wm5 in the side surface cladding sections 151, 152, 153 are sufficiently distanced from each other, and thus probability of the transmitting light in the core sections 141, 142 leaking into the side surface cladding sections 151, 152, 153 can be sufficiently reduced. As a result, the transmission loss in the core sections 141, 142 can be reduced.

In addition, near the edge section of the side surface cladding sections 151, 152, 153 refers a region which falls within a 5% distance of the width of the side surface cladding sections 151, 152, 153 on the inside from the above-described edge section.

Also, the local maximum values Wm1, Wm3, Wm5 are preferably positioned at the central section of width of the side surface cladding sections 151, 152, 153, and the refractive index preferably decreases continuously from the local maximum values Wm1, Wm3, Wm5 towards the adjacent local minimum values Ws1, Ws2, Ws3, Ws4. Thereby, the distance between the local maximum values Wm2, Wm4 in the core sections 141, 142 and the local maximum values Wm1, Wm3, Wm5 in the side surface cladding section 151, 152, 153 can be maximally kept, and also, the light may reliably be confined near the local maximum values Wm1, Wm3, Wm5. The above-described leakage of transmitted light from the core sections 141, 142 can thus be suppressed more reliably.

Furthermore, since the local maximum values Wm1, Wm3, Wm5 are smaller than the above-described local maximum values Wm2, Wm4 positioned at the core sections 141, 142, although the light transmission property is not so high as the core sections 141, 142, they have a slight light transmission property due to the refractive index being higher than the refractive index of the periphery. As a result, the side surface cladding sections 151, 152, 153 confine the transmitted light leaked from the core sections 141, 142, to thereby prevent the leakage light from affecting the other core sections. In other words, existence of the local maximum values Wm1, Wm3, Wm5 can suppress crosstalk.

In addition, as described above, local minimum values Ws1, Ws2, Ws3, Ws4 are smaller than the average refractive index WA of the adjacent side cladding section 15, and the difference thereof is preferably within a given range. Specifically, the difference between the local minimum values Ws1, Ws2, Ws3, Ws4 and the average refractive index WA is preferably about 3 to 80%, more preferably about 5 to 50%, and further preferably about 7 to 20%, of the difference between the local minimum values Ws1, Ws2, Ws3, Ws4 and the local maximum values Wm2, Wm4. Thereby, the side surface cladding section 15 has necessary and sufficient light transmission properties for suppressing crosstalk. In addition, if the differences between the local minimum values Ws1, Ws2, Ws3, Ws4 and the average refractive index WA of the side surface cladding sections 15 is smaller than the above-mentioned lower limit values, there is the possibility that the optical transmission property of the surface cladding section 15 is too small, and thus crosstalk cannot be sufficiently suppressed. On the other hand, if larger than the above-mentioned upper limit value, there is the possibility that the optical transmission property of the side surface cladding section 15 becomes too excessive, and thus negatively affects the optical transmission property of the core sections 141, 142.

Also, the difference between the local minimum values Ws1, Ws2, Ws3, Ws4 and the local maximum values Wm1, Wm3, Wm5 is preferably about 6 to 90%, more preferably about 10 to 70%, and further preferably about 14 to 40%, of the difference between the local minimum values Ws1, Ws2, Ws3, Ws4 and the local maximum values Wm2, Wm4. Thereby, the balance between the height of the refractive index in the surface side cladding section 15 and the height of the refractive index in the core section 14 is optimized, and the optical waveguide 1 can thus particularly have a superior light transmission property and more reliably suppress crosstalk.

In addition, it is better for the difference between the local minimum values Ws1, Ws2, Ws3, Ws4 and the local maximum values Wm2, Wm4 in the core sections 141, 142 to be as large as possible, and is preferably about 0.005 to 0.07, more preferably about 0.007 to 0.05, and further preferably about 0.01 to 0.03. Thereby, the above-described refractive index difference becomes necessary and sufficient for reliably confining light in the core sections 141, 142

Figure 7:
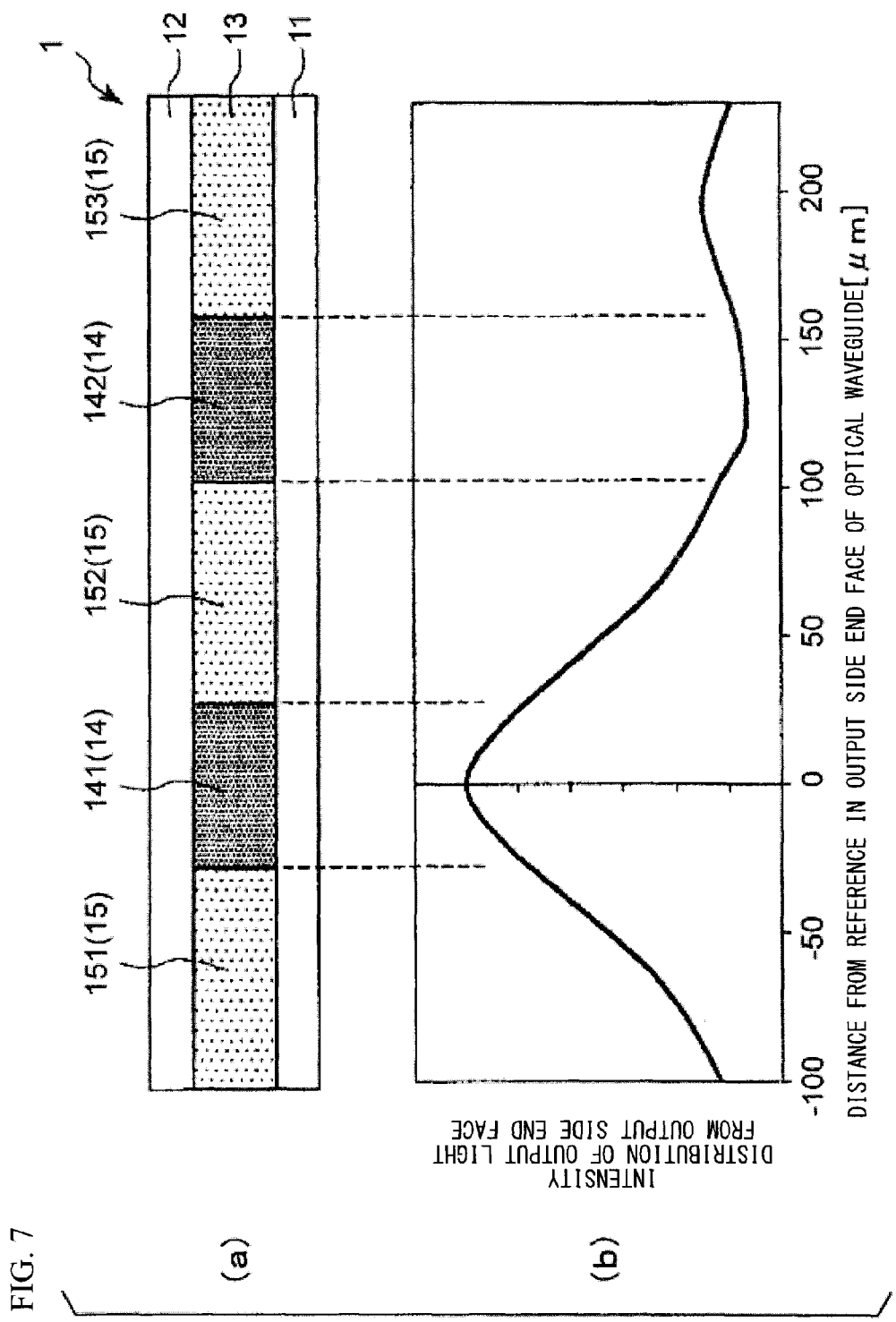
FIG. 7 is a drawing showing the intensity distribution of output light when light is incident on the core section of the optical waveguide having the refractive index distribution shown in FIG. 6.

Here, FIG. 7 is a drawing showing the intensity distribution of output light when light is incident on the core section 141 of the optical waveguide 1 having the refractive index distribution shown in FIG. 6. This intensity distribution is the intensity distribution of emitted light in the other end section when light is incident on an end section of the core section 141 of the two parallel core sections 141, 142 formed on the optical waveguide 1.

When light is incident on the core portion 141, the intensity distribution of the output light is the largest at a central section on the output end of the core section 141. Then, although the intensity of the output light decreases with distance from the central point of the core portion 141, by the optical waveguide 1 of the present invention, an intensity distribution having a local minimum value positioned in the core portion 142 which is adjacent to the core portion 141 can be obtained. By the local minimum value of the intensity distribution of output light thus matching with the position of the core section 142, crosstalk of the core portion 142 is significantly suppressed. As a result, an optical waveguide 1 which can reliably prevent the occurrence of crosstalk even in a case of multi-channeling and high densification can be obtained.

In conventional optical waveguides, the intensity distribution of output light does not have a local minimum value in a core section adjacent to another core portion on which light is incident, but rather has a local maximum value, and thus the problem of crosstalk occurs. In contrast, the intensity distribution of output light in the optical waveguide 1 according to the above-described present embodiment is very useful for suppressing crosstalk.

The specific reasons why the optical waveguide 1 according to the present embodiment can obtain such intensity distribution are not sufficiently clear, but as one of the reasons, the characteristic refractive index distribution W which has the local minimum values Ws1, Ws2, Ws3, Ws4, and for which the refractive index continuously changes over the entirety of the refractive index distribution, shifts the intensity distribution of light conventionally having the local maximum value at the core section 142 to the side surface cladding section 153 and the like adjacent to the core section 142, can be mentioned. In other words, crosstalk is reliably suppressed by this shift in intensity distribution.

In addition, even if the intensity distribution of the output light shifts towards the side surface cladding section 15, since a photodetector or the like is positionally aligned with the core section 14, there is little possibility of crosstalk and no degradation in the quality of optical communication.

Also, although the intensity distribution of output light is observed with high probability if at least two core sections 14 are formed in parallel in the optical waveguide of the present invention, it is not necessarily observed. By the NA (numerical aperture) of the light input, the transverse sectional area of the core portion 141 and the pitch of the core portions 141, 142, there are cases where a distinct local minimum value is not formed or the local minimum value is not positioned in the core section 142. Even in the above cases, crosstalk is sufficiently suppressed.

In the refractive index distribution W shown in FIG. 6(*b*), when the width of the average refractive index in the side surface cladding section 15 is defined as WA, the width of the part near the local maximum values Wm2, Wm4 having a refractive index continuously higher than the average refractive index WA is defined as a [μm] and the width of part the near the local minimum values Ws1, Ws2, Ws3, Ws4 having a refractive index continuously lower than the average refractive index WA is defined as b [μm]. In this case, b is preferably about 0.1a to 1.2a, more preferably 0.03a to 1a, and further preferably 0.1a to 0.8a. Therefore, the substantive widths of the local minimum values Ws1, Ws2, Ws3, Ws4 become necessary and sufficient to achieve the above-described operation and effects. In other words, if b is smaller than the above lower limit, there is the possibility that the operation of confining light in the core sections 141, 142 decreases since the substantive widths of the local minimum values Ws1, Ws2, Ws3, Ws4 are too narrow. On the other hand, if b is larger than the above-mentioned upper limit, the substantive widths of the local minimum values Ws1, Ws2, Ws3, Ws4 become too wide, restricting the width and the pitch of the core sections 141, 142 by that amount, and thus there is the possibility that transmission efficiency decreases, and multi-channeling and high densification are impeded.

In addition, it is possible to approximate the average refractive index WA of the side surface cladding section 15 with the midpoint of the local maximum value Wm1 and the local minimum value Ws1.

In addition, the refractive index distribution W can be specified by, for example, (1) a method in which interference fringes which depend on refractive index are measured using an interference microscope and the refractive index distribution is calculated based on the interference fringes, (2) the refracted near field (RNF) method, and the like. Of these, the refracted near field method may adopt the conditions of measurement described in Japanese Unexamined Patent Application, Publication No. H05-332880. On the other hand, the interference microscope is useful from the point that specification of the refractive index distribution W can be easily carried out.

Also, the core section 14 may be linear or curved in planar view. Furthermore, the core section 14 partway intersects and may be branched according to necessity. In particular, since it is possible to intersect optical signals in the same plane by the core sections 14 partway being intersected like showing in FIG. 1, the core section 14 having a pattern of the shortest distance without three-dimensional intersection and diversion can be formed. As a result, decrease of transmission efficiency, pulse signal bluntness, and the like of the optical waveguide 1 can be minimized. Also, in this case, the refractive index distribution is preferably a distribution like shown in FIG. 4(b), FIG. 4(c), FIG. 5(b), or FIG. 6(b). Thereby, interference of optical signals in the intersecting section can be particularly suppressed.

In addition, the transverse sectional shape of the core section 14 is not particularly limited, and, for example, may be a circular shape such as a true circle, an ellipse, and an oval or a polygonal shape such as a triangle, a quadrangle, a pentagon, and a hexagon. By being a quadrangle (rectangular shape), a core section 14 of stable quality can be efficiently produced.

Also, the height of the core section 14 (thickness of the core layer 13) is not particularly limited, and is preferably about 1 to 200 μm, more preferably about 5 to 100 μm, and further preferably 10 to 70 μm. Thereby, thinning of the core section 14 can be attained while suppressing decrease in transmission efficiency of the optical waveguide 1.

As the constituent material (main material) of such above-described core layer 13, for example, in addition to cyclic ether-based resins like acrylic-based resins, methacrylic-based resins, polycarbonate, polystyrene, epoxy-based resins and oxetane-based resins; polyamide; polyimide, polybenzoxazole; polysilane; polysilazane; silicone-based resins; fluorine-based resins; polyurethane; polyolefin-based resins; polybutadiene; polyisoprene; polychloroprene; polyesters such as PET and PBT; polyethylene succinate, polysulfone, polyether, cyclic olefin-based resins such as benzocyclobutene-based resins and norbornene-based resins, glass materials like quartz glass and borosilicate glass, and the like can be used. The resin material may be a composite material combining those of different compositions.

Also, among these, particularly at least one selected from the group consisting of (meth)acrylic-based resins, epoxy-based resins, silicone-based resins, polyimide-based resins, fluorine-based resins, and polyolefin-based resins is preferable, and a (meth)acrylic-based resin or an epoxy-based resin is more preferable. Since these resin materials have high transparency, an optical waveguide 1 having particularly low transmission loss can be obtained.

((Cladding Layer))

On the other hand, the cladding layers 11, 12 are positioned in the upper section and the lower section of the core layer 13.

The average thickness of the cladding layers 11, 12 is preferably about 0.05 to 1.5, and more preferably 0.1 to 1.25 times, the average thickness of the core layer 13. Specifically, the average thickness of the cladding layers 11, 12 is each preferably about 1 to 200 μm, more preferably about 3 to 100 μm, and further preferably about 5 to 60 μm. Thereby, it is possible to maintain the function as a cladding section while preventing increase in thickness of the optical waveguide 1 above what which is necessary. Also, moderate rigidity is given to the optical waveguide 1, and, for example, even if there is a space between the optical waveguide 1 and the motherboard 5, the optical waveguide 1 hardly warps, and thus deviation of the optical path in the optical coupling section can be suppressed.

Also, as the constituent material of the cladding layers 11, 12, for example, the same materials as the above-described materials of the core layer 13 can be used. In particular, at least one selected from the group consisting of (meth)acrylic-based resins, epoxy-based resins, silicone-based resins, polyimide-based resins, fluorine-based resins, and polyolefin-based resins is preferable, and a (meth)acrylic-based resin or an epoxy-based resin is more preferable.

Also, the refractive index distribution in the thickness direction of the transverse section of the optical waveguide 1 may be an Si-type or a GI-type distribution, or may be a distribution like shown in FIG. 4(c).

In addition, since the optical waveguide 1 is arranged by being superimposed on a motherboard 5 as described later, the size in the planar view thereof, for example, is preferably set to a size that can cover at least a part of the motherboard 5. Specifically, the long diameter is preferably set to about 50 mm to 300 mm.

Also, the planar view shape of the optical waveguide 1 is not particularly limited, and, in addition to a polygonal shape like a quadrangle and a hexagon, it may be circular, elliptical, and the like.

((Intersecting Section))

Figure 8:
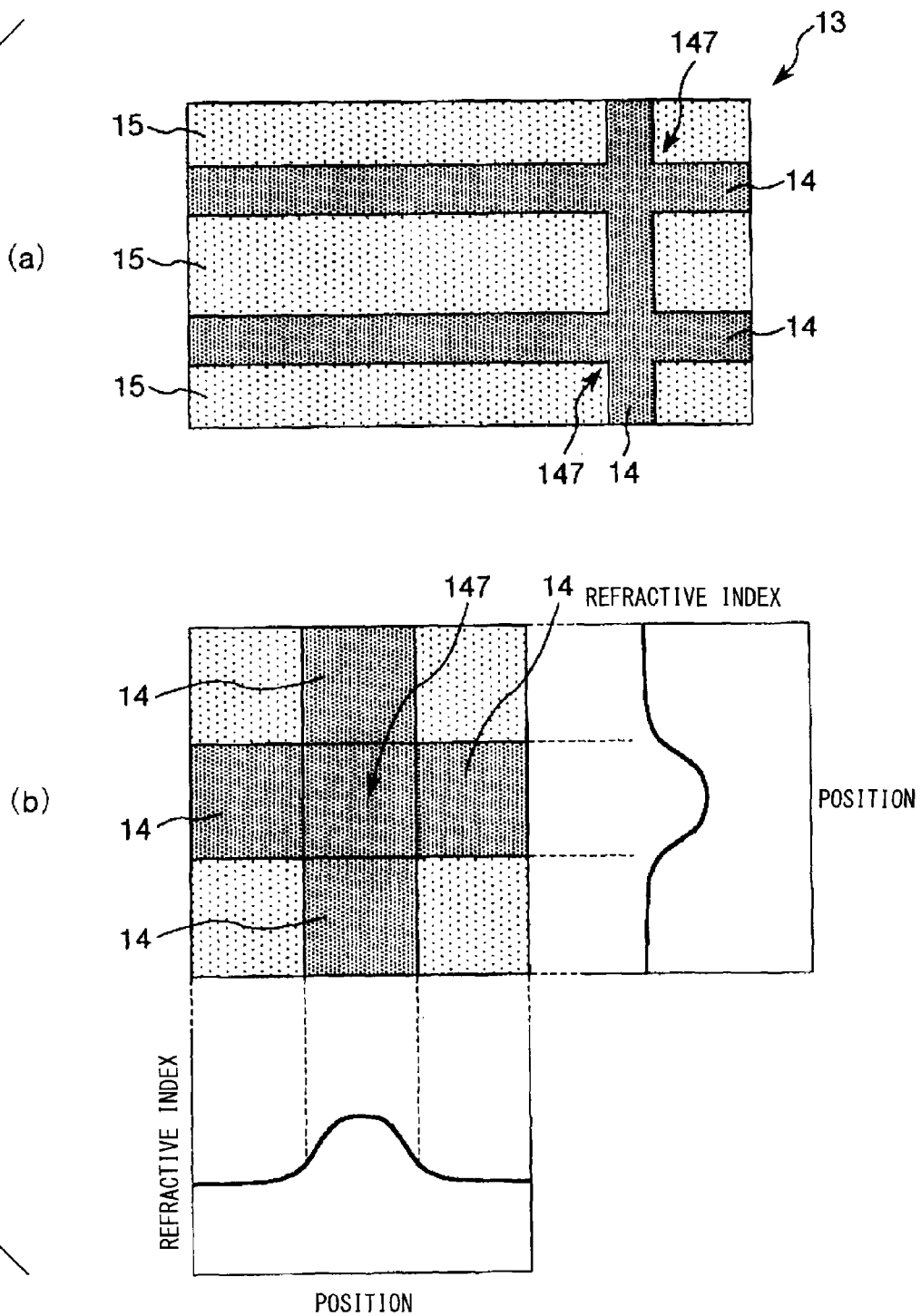
FIG. 8 is a plan view showing the refractive index distribution near the intersecting section of the optical waveguide shown in FIGS. 1 and 25 and a drawing showing the refractive index distribution near the intersecting section of the optical waveguide shown in FIGS. 1 and 25.

FIG. 8 is a plan view showing near the intersecting section of the optical waveguide 1 shown in FIG. 1 and is a drawing showing the refractive index distribution near the intersecting section.

An intersecting section 147 of core sections 14, as shown in FIG. 8, preferably has a refractive index distribution in which there is a local maximum value in the central section and then the refractive index gradually decreases sweeping down therefrom toward the periphery (side surface cladding sections 15). Thereby, since signal light easily gathers in the central section of the intersecting section 147, interference can be particularly suppressed in the intersecting section 147.

Also, the refractive index of the intersecting section 147 is preferably higher compared to the periphery thereof.

Based on this refractive index, it becomes difficult for the signal light that has entered the intersecting section 147 to enter the core section 14 intersecting with the core section 14 in which such signal light has been propagated. As a result, by the optical waveguide 1, interference of the light signal in the intersecting section 147 can be suppressed. Thereby, the intersection of light signals on same plane becomes possible without multi-level intersection. As a result, miniaturization, thinning, and high densification of a device (for example, opto-electric hybrid board 1000) mounted on the optical waveguide 1 can be easily attained.

The maximum refractive index of the intersecting section 147 is preferably about 0.001 to 0.05 higher, and more preferably about 0.002 to 0.03 higher, than the maximum refractive index in the core section 14 other than the intersecting section 147.

Here, the intersection angle of the optical axis of the intersecting core sections 14 is preferably 10 to 90° and more preferably 20 to 90°. If the intersecting angle is within these ranges, the occurrence of interference can be sufficiently suppressed. In addition, this intersection angle refers the interior angle having the smallest angle among the interior angles formed by intersecting optical axes.

In addition, in the intersecting section 147 like described above, interference is suppressed and the transmission loss of a light signal when passing one intersecting section 147 can be suppressed to 0.02 dB or below. For this reason, even if the pattern of core section 14 is set such that a plurality of core sections 14 intersect one core section 14, transmission loss can be suppressed to that which is small and optical wiring having a complex pattern can be constructed.

Figure 9:
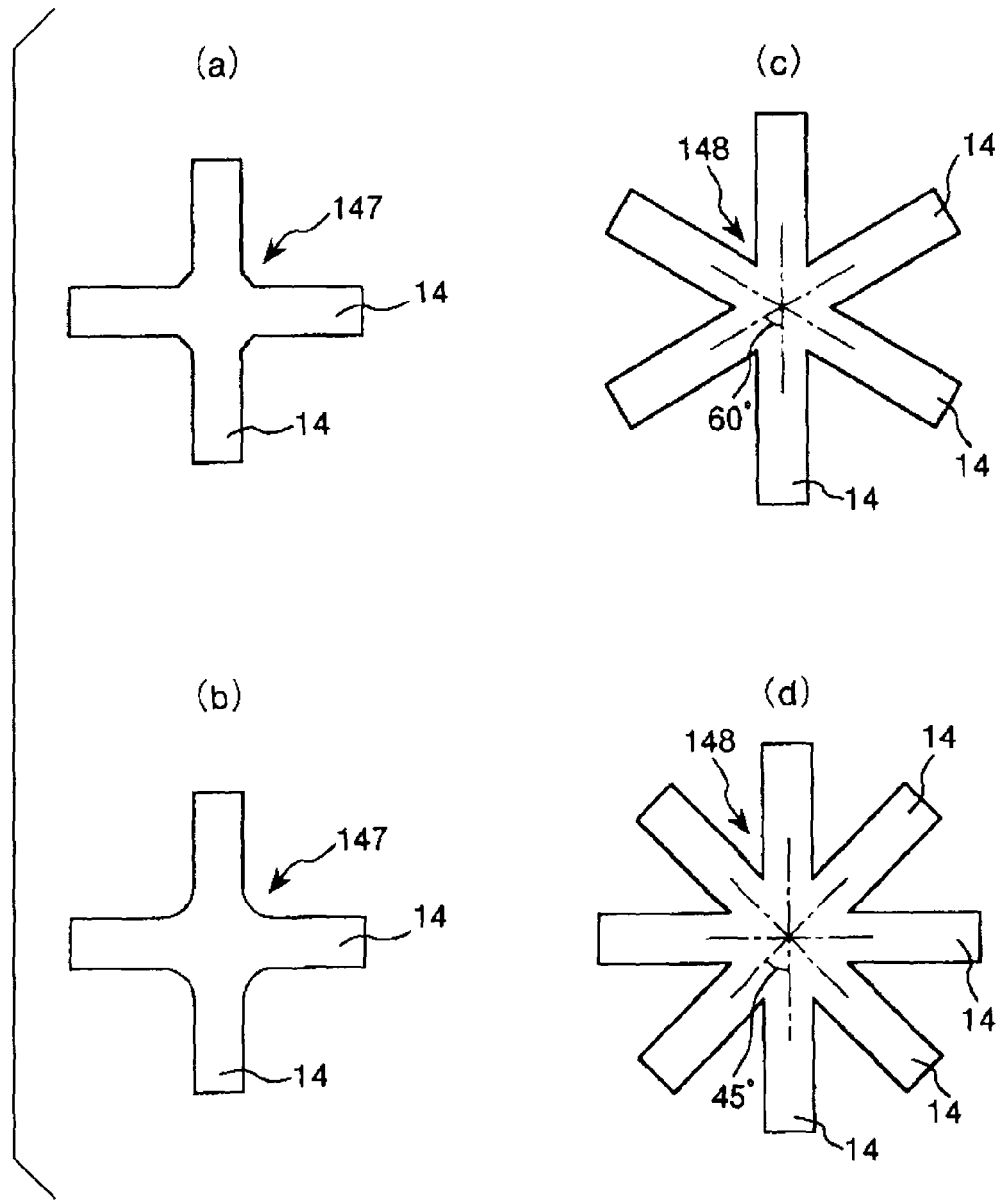
FIG. 9 is a partially enlarged view showing another constitutional example of near the intersecting section.

FIG. 9 is a partially enlarged view showing another constitutional example of near the intersecting section.

The optical waveguides shown in FIGS. 9(*a*) and (*b*) are configured such that, near the intersecting section 147, the width of the core section 14 gradually decreases toward the intersecting section 147. Of these, in the optical waveguide shown in FIG. 9(*a*), the width of the core section 14 gradually increases in a linear manner, and, in the optical waveguide shown in FIG. 9(*b*), the width of the core section 14 gradually increases in a curved manner. When it has such structures, interference in the intersecting section 147 is particularly suppressed and improvement of transmission efficiency in the intersecting section 147 is attained.

In an intersecting section 148 shown in FIG. 9(*c*), three core sections 14 are intersecting and the intersection angle thereof is set to 60°. On the other hand, in the intersecting section 148 shown in FIG. 9(*d*), four core sections 14 are intersecting and the intersection angle thereof is set to 45°.

In the intersecting section 148, the number of intersecting core sections 14 may be 5 or more. In this case, the number of intersections are appropriately set such that the intersection angle is within the above-mentioned range. Also, each intersection angle may be equal or different.

((Mirror))

A mirror 17 is disposed in the optical waveguide 1 shown in FIG. 2.

Figure 10:
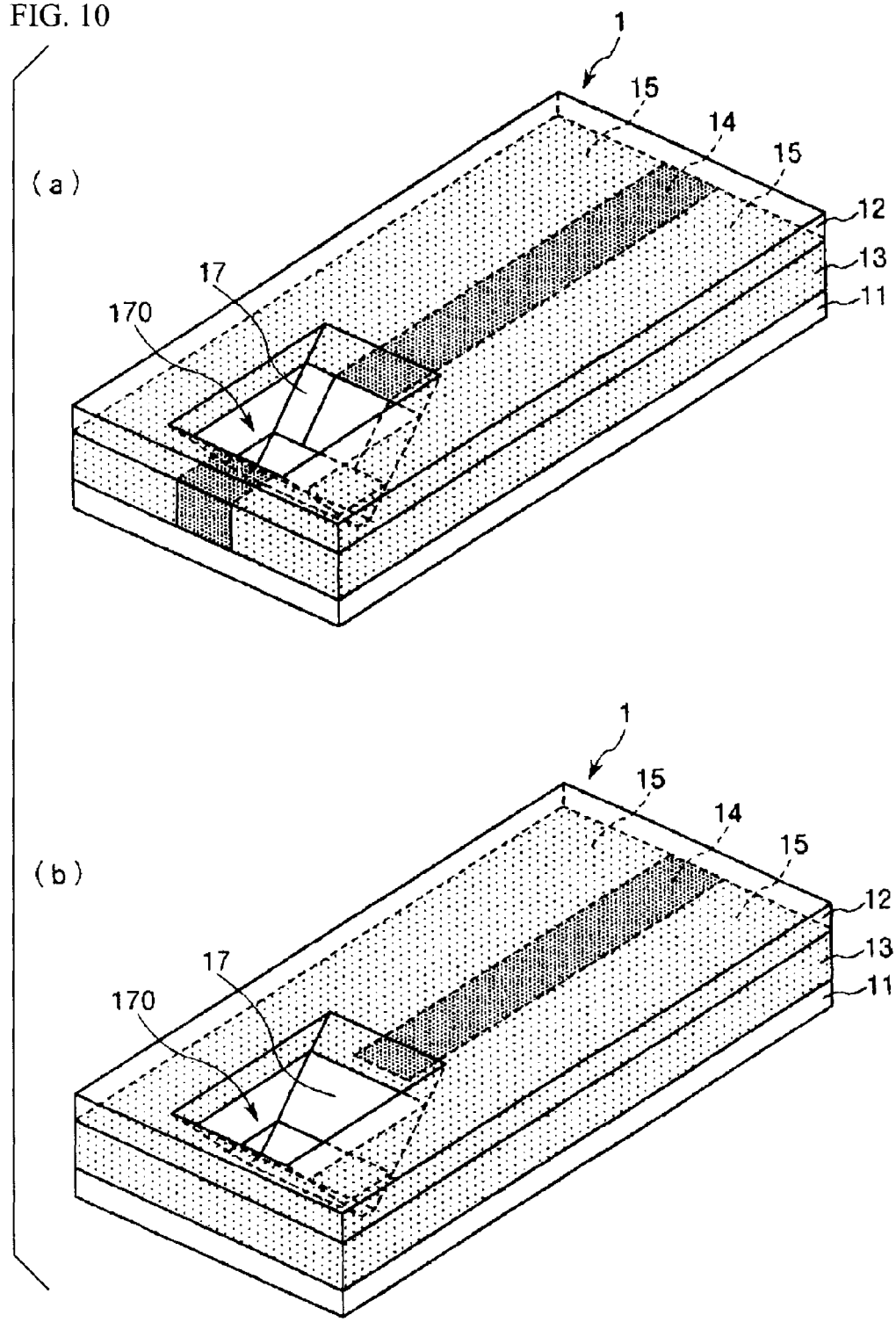
FIG. 10 is a perspective view showing an example in which a mirror (optical path conversion section) partway in, and on an extension line, of the core section of the optical waveguide shown in FIG. 2.

FIG. 10 (*a*) is a perspective view showing an example in which the mirror (optical path conversion section) 17 is formed partway and on the extension line of the core section 14 of the optical waveguide 1 shown in FIG. 2.

In the optical waveguide 1 shown in FIG. 10(*a*), a concave section (vacancy) 170 forming a V-shape in cross-section is formed partway in the optical waveguide 1. Also, the mirror 17 is formed in a part of the inner surface of this concave portion 170. The mirror 17 is planer and is inclined 45° with respect to an axis line (optical axis) of the core portion 14.

Light propagating through the core portion 14 is reflected by the mirror 17 and the optical path (traveling direction) of the light is changed by 90° downward in FIG. 10(*a*). Also, the light propagating from below in FIG. 10(*a*) is reflected by the mirror 17 and introduced into the core section 14. In other words, the mirror 17 has a function as an optical changing means for changing the optical path of the light propagating through the core section 14.

In addition, a reflective film may be formed on the worked surface constituting the mirror 17 as is necessary. As this reflective film, for example, metal films such as Au, Ag and Al, a film of a material having a refractive index lower than the core section 14, and the like can be mentioned. As the method for forming the metal film, for example, a physical vapor deposition method such as a vacuum vapor deposition method, a chemical vapor deposition such as CVD, a plating method, and can be mentioned.

Also, the mirror 17 may be disposed not partway in the core section 14, but, as shown in FIG. 10(*b*), in the side surface cladding section 15 on an extended line of the core section 14.

In addition, the mirror 17 may be replaced by, for example, another optical part conversion section such as a bent waveguide.

Also, as shown in FIG. 3, a support film 2 may be disposed on the bottom surface of the optical waveguide 1 as necessary and a cover film 3 may be disposed on a top surface of the optical waveguide 1 as necessary.

As the constituent material of the support film 2 and the cover film 3, for example, various resin materials such as polyolefins like polyethylene terephthalate (PET), polyethylene, and polypropylene, polyimide, polyamide, and the like can be mentioned.

Also, the average thickness of the support film 2 and the cover film 3 is not particularly limited, and is preferably about 5 to 500 µm and more preferably 10 to 400 µm. Thereby, the support film 2 and the cover film 3 have appropriate rigidity, and thus can be reliably support the optical waveguide 1, and can reliably protect the optical waveguide 1 from external forces and the external environment.

In the optical waveguide 1 shown in FIG. 2, the lens 16 is disposed on the lower surface of the cladding layer 11. The lens 16 converges the signal light passing between the mirror 17 and an optical element 6, to thereby contribute to increasing optical coupling efficiency.

As the constituent material of the lens 16, for example, various resin materials such as acrylic-based resins, various glass materials such as quartz glass, and the like can be mentioned.

Also, the lens 16 may be that which deforms a part of the cladding layer 11 and gives a function as a lens. In this deformation, for example, nanoinprint technology and the like can be used.

In addition, the size and shape of the optical waveguide 1 in planar view is appropriately set according to the size and shape, and the like of the motherboard 5, and is not particularly limited. As an example, the optical waveguide 1 is a quadrangle with one side of 20 mm to 2000 mm. Also, the shape may be circular, polygonal, and the like.

(Optical Connector)

The optical connector 101 is disposed at an end section of the optical waveguide 1 and is able to optically connect the core section 14 with other optical components. This optical connector 101 may be based on various connector standards, and, for example, Mini MT connector, MT connector specified by JIS C 5981, 16 MT connector, two-dimensional array-type MT connector, MPO connector, MPX connector, and the like can be mentioned.

FIG. 11(a) is an exploded perspective view of the optical connector 101 shown in FIG. 1, and FIG. 11(a) is a perspective view of the optical connector 101 shown in FIG. 1.

Figure 11:
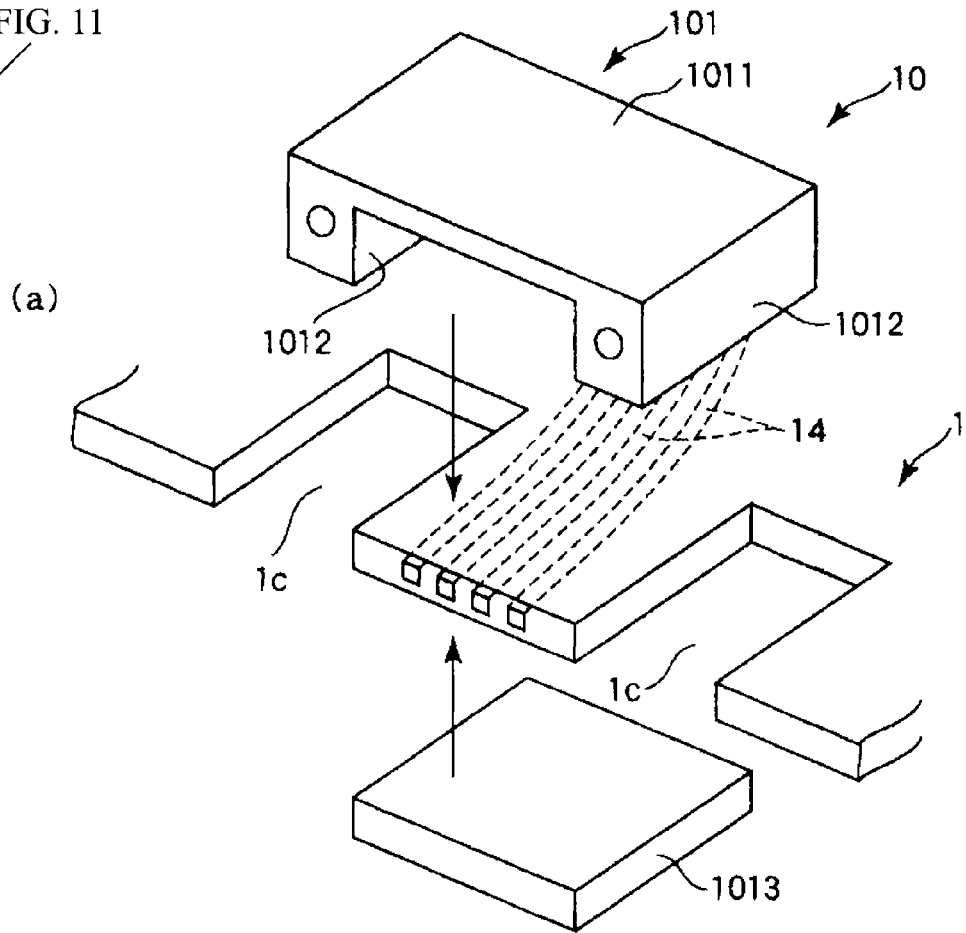
FIG. 11 is an exploded perspective view of the optical connector shown in FIGS. 1 and 25, and a perspective view of the optical connector shown in FIG. 1.
Figure 11:
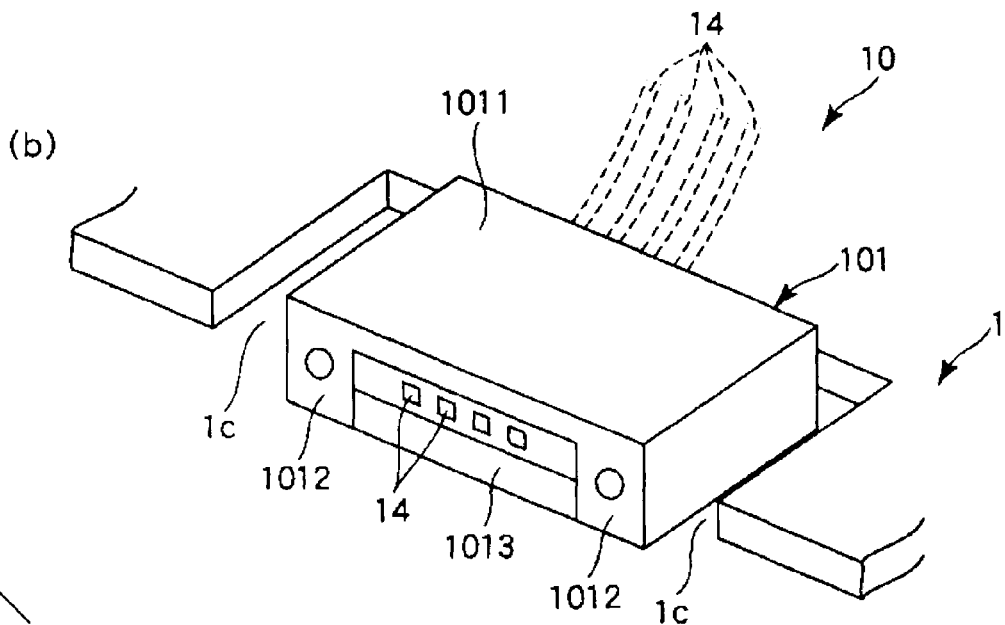

In the case of the optical connector 101 shown in FIG. 11, notches 1c are disposed on the core section 14 equipped with the optical connector 101. Specifically, a notch 1c equivalent to the length of the equipped optical connector 101 is formed in both side sections of the core section 14.

The optical connector shown in FIG. 11 has a connector body 1011 including two leg sections 1012 and a connector lid 1013 being able to mount to the connector body 1011. The two leg sections 1012 of the connector body 1011, as shown in FIG. 11(b), are disposed so as to be fitted into the respective notch 1c. As a result, the core section 14 becomes so as to be inserted between the two leg sections 1011 of the connector body 1011.

Also, the connector lid 1013 becomes so as to be inserted between the two leg sections 1012 of the connector body 1011 together with the core section 14. As a result, as shown in FIG. 11(b), it is constituted such that the core section is able to be sandwiched and fixed between the connector body 1011 and the connector lid 1013.

When the optical connector 101 is mounted on the optical waveguide 1, as shown in FIG. 11(b), an end section of the core section 14 becomes the state of being exposed from an end surface of the optical connector 101. By connecting another connector to the optical connector 101, for example, an optical component such as another optical waveguide or an optical fiber can be optical connected with the core section 14. As the connected optical component, in addition to the optical waveguide and the optical fiber, for example, a wavelength conversion element, a filter, a diffraction grating, a polarizer, a prism, a lens, and can be mentioned.

Also, as the constituent material of the optical connector 101, for example, resin materials, metal materials, ceramic materials, and the like can be mentioned.

Also, the structure of the optical connector 101 is not limited to the structure shown in FIG. 11. For example, it may be configured such that the optical connector 101 protrudes from an end surface of the optical waveguide 1. In such case, it is not necessary to provide the notches c in the optical waveguide 1. Furthermore, without protruding from the optical waveguide 1 and without providing the notches 1c, it may be an optical connector 101 of a structure in which simply the connector body 1011 is adhered on an end section of the optical waveguide 1.

In addition, the pattern of the core section 14 in the optical waveguide 1 is not limited to the pattern shown in FIG. 1, and may be any pattern (Opto-Electric Conversion Section)

The opto-electric conversion section 4 has the opto-electric conversion section substrate 41 disposed under the optical waveguide 1, the optical element 6 and an electrical element for an opto-electric conversion section 7 mounted on the lower surface of the opto-electric conversion section substrate 41, and the electrical connector (first terminal) 42. This opto-electric conversion section 4 is adhered to the lower surface of the optical waveguide 1 by a fixing member such as an adhesive. Hereinafter, each section of the opto-electric conversion section 4 is explained in detail.

((Opto-Electric Conversion Section Substrate))

An opto-electric conversion section substrate 41, as shown in FIG. 2, has the insulating substrate (second substrate) 411, electrical wiring 412 providing on both surfaces thereof, through wiring 413 connecting electrical wirings 412 on each surface, and a through-hole 414 penetrating an insulating substrate 411 and the like As the material forming the insulating substrate 411, for example, various resins materials such as a polyimide-based resin, a polyamide-based resin, an epoxy-based resin, various vinyl-based resins, polyester-based resins such as polyethylene terephthalate, and the like can be mentioned, and, among these, the insulating substrate 411 having a polyimide-based resin as the main material is preferably used. From a polyimide-based resin having high heat resistance, and superior translucency and flexibility, it is particularly suitable as the constituent material of the insulating substrate 411. In addition, as specific examples of the insulating substrate 411, film substrates used in polyester copper clad film substrates, polyimide copper clad film substrates, aramid copper clad film substrates, and the like can be mentioned.

Here, in the optical module 100 shown in FIG. 2, the insulating substrate 411 is disposed between the optical element 6 and the optical waveguide 1, and signal light passes though the through-hole 414 disposed in this insulating substrate 411. In addition, if a material having translucency is used as the insulating substrate 411, the through-hole is unnecessary.

Also, the average thickness of the insulating substrate 411 is preferably about 5 to 200 μm and more preferably about 10 to 150 μm. If the insulating substrate 411 has such thickness, thinning of the optical module 100 is attained and transmission loss of the insulating substrate 411 is suppressed. Furthermore, if the thickness of the insulating substrate 411 is within the above-mentioned ranges, since the distance between the mirror 17 and the optical element 6 can be sufficiently shortened, decrease in transmission efficiency by divergence of signal light can be prevented.

In addition, the insulating substrate 411 may be a one layer substrate or may be a multilayer substrate (build-up substrate) in which a plurality of layers is stacked. In this case, an optional electrical circuit may be formed between the layers of the multilayer substrate. Thereby, a highly-densified electrical circuit can be constructed in the insulating substrate 411.

In addition, the insulating substrate 411 can be replaced by an insulation layer that is formed as a film or stacked on the lower surface of the optical waveguide 1.

The insulation layer is formed from a silicon compound like silicon oxide and silicon nitride, a resin material like a polyimide-based resin and an epoxy-based resin, and the like. Also, as the film formation method, for example, a physical vapor deposition method such as a vacuum deposition method and sputtering, a chemical vapor deposition such as CVD, a liquid phase film-forming method such as a coating method and a printing method, and the like can be mentioned.

The electrical wiring 412 and the through wiring 413 are formed from a conductive material. As the conductive material, for example, metal materials such as elemental metals such as copper, aluminum, nickel, chromium, zinc, tin, gold, and silver or alloys including these metal elements can be mentioned.

The average thickness of the electrical wiring 412 is appropriately set according to the required conductivity and the like of the wiring, and, for example, is about 1 to 30 μm.

In addition, the mounting method of the optical element 6 and the electrical element for an opto-electric conversion section 7 to the opto-electric conversion section substrate 41 is not particularly limited, and a die bonding method, a wire bonding method, and the can be used.

((Optical Element))

The optical element 6 shown in FIG. 2 includes an element body 60, and a light receiving/emitting section 61 and a terminal 62 disposed on the upper surface of the element body 60. In addition, the light receiving/emitting section 61 indicates a light-receiving section or a light-emitting section, or that which has both of these properties. Also, between the light receiving/emitting section 61 of the optical element 6 and the mirror 17 of the optical waveguide 1 is optically connected.

As the optical element 6, for example, a light-emitting element such as a surface emission layer (VCSEL), a light-emitting diode (LED), and a light-receiving element such as a photodiode (PD, APD) can be mentioned.

Also, the terminal 62 of the optical element 6 and the electrical wiring 412 of the opto-electric conversion section 4 are electrically connected via a bump. This bump is formed from various materials.

((Electrical Element for Opto-Electric Conversion Section))

The electrical element for an opto-electric conversion section 7 shown in FIG. 2 includes an element body 70 and a terminal 72 disposed on the upper surface of the element body 70.

As the electrical element for an opto-electric conversion section 7, for example, a driver IC, transimpedance amplifier (TIA), a limiting amplifier (LA), or a combination IC, LSI, RAM, ROM, condenser, coil, resistor, diode in which these elements are compounded, and the can be mentioned.

Also, the terminal 72 of the electrical element for an opto-electric conversion section 7 and the electrical wiring 412 of the opto-electric conversion section 4 are electrically connected via a bump. By providing such opto-electric conversion section 4 including the optical element 6 and the electrical element for an opto-electric conversion section 7 in both end sections of the core section 14 of the optical waveguide 1, optical communication can be carried out in the core section 14 of the optical module 100.

In addition, the electrical connection between the optical element 6 or the electrical element for an opto-electric conversion section 7 and the electrical wiring 412, in addition to the above-described connection methods, may be carried out by a connection method using wire bonding, an anisotropic conductive film (ADF), an anisotropic conductive paste, and the like.

Also, a sealing material 45 may be disposed between the optical element 6 or the electrical element for an opto-electric conversion section 7 shown in FIG. 2 and the opto-electric conversion section substrate 41. As the sealing material 45, for example, epoxy-based resins, polyester-based resins, polyurethane-based resins, silicone-based resins, and the like can be mentioned.

((Electrical Connector))

The opto-electric conversion section 4 is electrically connected to the motherboard 5 via an electrical connector 42.

The electrical connector 42 may be a connector based on various connector standards or may be a general-purpose product, and, for example, a board to board connector, a FPC/FFC connector, a ZIF connector, NON-ZIF connector, and the like can be mentioned.

In addition, the optical waveguide 1 also may be mechanically connected to the motherboard 5 via this electrical connector 42. If it is such fixing method, the optical waveguide 1 can be made so as to be detachable from the motherboard 5. Thereby, there is the advantage that it is easy to replace the optical waveguide 1 for example since it becomes easier to separate the motherboard 5 and the optical waveguide 1.

(Motherboard)

The motherboard (electrical wiring board) 5 has an insulating substrate (first substrate) 51; electrical wiring 52 disposed on the upper surface thereof; a plurality of electrical elements for an electrical wiring board 50, such as a plurality of LSI 501, the condenser 502, and the chip resistor 503 mounted on the insulating substrate 51; and an electrical connector (second terminal) 53.

The electrical connector 53 is fit together with the electrical connector (first terminal) 42 of the optical conversion section 4. By this fitting together, the electrical wiring 52 on the motherboard 5 side and the electrical wiring 412 on the opto-electric conversion section 4 side are mechanically connected, and it becomes possible to control the operation of the optical element 6 and the electrical element for an opto-electric conversion section 7 on the opto-electric conversion section 4 from the motherboard 5 side. Also, transmission or reception of signals becomes possible.

As the material forming the insulating substrate 51, for example, various resin materials such as polyimide-based resins, polyamide-based resins, epoxy-based resins; various vinyl-based resins, and polyester-based resins such as polyethylene terephthalate can be mentioned. Among these, using a polyimide-based resin as the main material is preferable. In addition, may be a substrate in which paper, glass cloth, a resin film, or the like is the base material and a resin material such as a phenol-based resin, a polyester-based resin, an epoxy-based resin, a cyanate resin, a polyimide-based resin, or a fluorine-based resin is impregnated into this base material, for example, in addition to insulating substrates used in composite copper clad laminated plates such as glass cloth and epoxy copper clad laminated plates, glass nonwoven fabric and epoxy copper clad laminated plates polyimide copper clad film substrates, heat resistant and thermoplastic organic-based rigid substrates such as polyester imide resin substrates, polyether ketone resin substrates, polysulfone-based resin substrates, ceramic-based rigid substrates such as alumina substrates, aluminum nitride substrates, and silicon carbide substrates, and the like.

The electrical wiring 52 is formed from a conductive material. As the conductive material, for example, an elemental metal such as copper, aluminum, nickel, chromium, zinc, tin, gold, and silver or alloys including these metal elements can be mentioned.

Also, the average thickness of the electrical wiring 52 is appropriately set according to the conductivity and the like required of the wiring, and, for example, is about 1 to 30 µm.

By the motherboard 5 including such electrical wiring 52, in other words, the metal layer, the rigidity thereof is improved compared to when the motherboard 5 is only formed from the insulating substrate 51. Thereby, when the optical waveguide 1 is superimposed on the motherboard 5, not only the optical waveguide, but also the motherboard 5, hardly warp. As a result, arrangement of the optical waveguide 1 connected to the motherboard 5 can be maintained with higher precision. Thereby, transmission efficiency of signals between the optical waveguide 1 and the motherboard 5 can be more highly maintained.

Here, in the opto-electric hybrid board 1000 shown in FIG. 2, the electrical elements for an electrical wiring board 50 are gathered below the optical waveguide 1. For this reason, when the opto-electric hybrid board 1000 is view planarly, since the electrical element for an electrical wiring board 50 and the core section 14 can coexist like described above, the pattern of the core section 14 can be freely set. As a result, since the distance of the core section 14 for example can be minimized, optimization of the transmission efficiency of the light signal can be attained.

Also, since the optical waveguide 1 can be easily separated from the motherboard 5, repair such as separately replacing the optical waveguide 1 and the motherboard 5 can be easily carried out.

In addition, the optical element for an electrical wiring board 50 mounted on the motherboard 5 is not limited to those described above, and, for example, may be IC, CPU, RAM, ROM, a transistor, a coil, a diode, a condenser, an oscillator, a relay, an optical element, and the like.

Here, the distance between the optical waveguide 1 and the motherboard 5, for example, can be easily adjusted by changing the height of the electrical connector 42 on the opto-electric conversion section 4 and the electrical connector 53 on the motherboard side 5, and, as an example, is preferably set to about 1 to 100 mm and more preferably set to about 2 to 80 mm.

In addition, in the opto-electric hybrid board 1000 according to the present embodiment, by connecting the electrical connector 42 on the opto-electric conversion section 4 side and the electrical connector 53 on the motherboard 5 side, between both is fixed. By fixing by such method, since only a portion between the optical module 100 and the motherboard 5 is fixed, it becomes a state in which a large space exists between the optical waveguide 1 and the motherboard 5. In this state, for example, influence on thermal deformation of the motherboard 5 is hardly felt on the optical module 100 side and reliability of the opto-electric hybrid board 1000 is improved.

Also, when fixing the optical module 100 to the motherboard 5, mechanisms other than the electrical connectors 42, 53, for example, fixing by an adhesive and the like, may be added.

Figure 12:
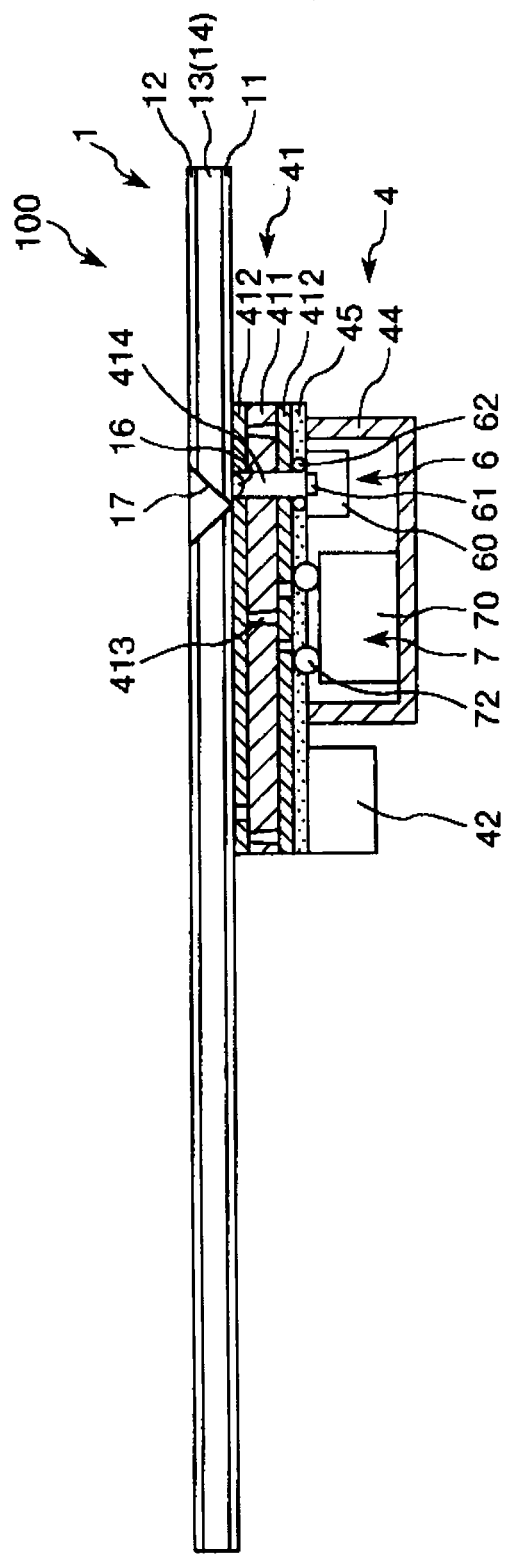
FIG. 12 is a cross-sectional view showing another constitutional example of the optical module according to the first embodiment.

FIG. 12 is a cross-sectional view showing another constitutional example of the optical module 100 according to the first embodiment.

The opto-electric conversion section 4 shown in FIG. 12 has a heat spreader 44 added to the opto-electric conversion section 4 in FIG. 1. The heat spreader 44 shown in FIG. 12 is a box shape covering the optical element 6 and the electrical element for an opto-electric conversion section 7 mounted on the lower surface of the opto-electric conversion substrate 41. Also, it is configured such that the bottom surface of the inside of the heat spreader 44 and the lower surface of the electrical element for an opto-electric conversion section 7 abut. Thereby, heat from the electrical element for an opto-electric conversion section 7 is effectively transmitted to the heat spreader 44 and dispersed. As a result, heat dissipation of the electrical element for an opto-electric conversion section 7 is particularly promoted.

As the constituent material of the heat spreader 44, materials having high heat conductivity, for example, a metal material, a carbon material, a ceramic material, or the like can be used. Also, particularly elemental copper, aluminum, iron, silver, gold, chromium, nickel, zinc, or tin, or an alloy thereof can be preferably used.

In addition, between the electrical element for an opto-electric conversion section 7 and the heat spreader 44 may be only simply in contact or may be in contact via a heat conduction material. As the heat conduction material, for example, a sheet, paste, or the like of a resin-based material like an acrylic-based resin or a silicone-based resin, a carbon-based material like graphite, a ceramic-based material like silica, alumina, or silicon nitride, or a metal-based material like aluminum or copper can be used. Also, a sheet or paste of a composite material in which two or more of these materials are mixed can be used.

Also, a concavo-convex shape increasing the surface area may be disposed on the heat spreader 44. As this concavo-convex shape, for example, a fin shape disposed on the lower surface of the heat spreader 44 shown in FIG. 12 and the like can be mentioned.

<<Second Embodiment>>

Next, the optical module according to a second embodiment of the opto-electric hybrid board of the present invention is explained.

Figure 13:
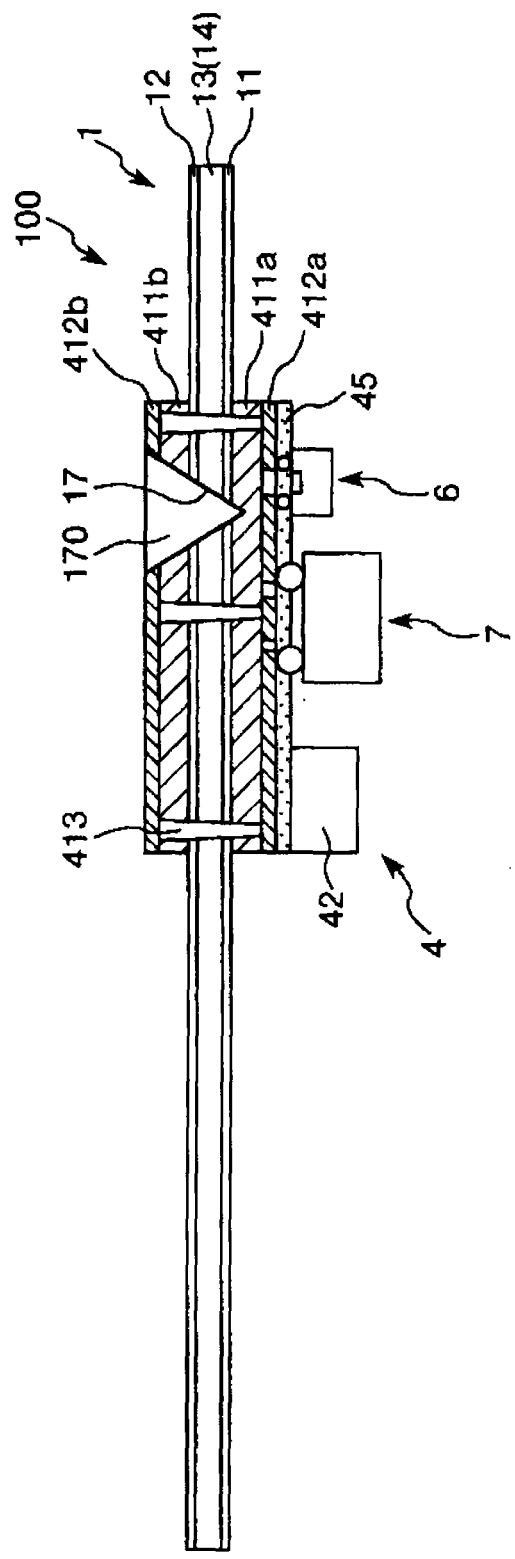
FIG. 13 is a cross-sectional view showing a part of a second embodiment of the opto-electric hybrid board of the present invention.

FIG. 13 is a cross-sectional view showing a part of the second embodiment of the opto-electric hybrid board of the present invention.

Hereinafter, although the second embodiment is explained, it is explained by placing emphasis on the points of difference with the first embodiment, and an explanation of the same matters is omitted. Also, in FIG. 13, the same constitutional parts as the first embodiment are labeled with the same reference numerals as those previously explained and a detailed explanation thereof is omitted.

Other than the constitution of the opto-electric conversion section 4 being different, the second embodiment is the same as the first embodiment.

The opto-electric conversion section 4 shown in FIG. 13 has an insulating substrate 411a disposed on the lower surface of the cladding layer 11 of the optical waveguide 1, an insulating substrate 411b disposed on the upper surface of the cladding layer 12, electrical wiring 412a disposed on the lower surface of the insulating substrate 411a, electrical wiring 412b disposed on the upper surface of the insulating substrate 411b, through wiring 413 that penetrates the optical waveguide 1 and that connects the electrical wiring 412a and the electrical wiring 412b, the sealing material 45, the electrical connector 42, the optical element 6, and the electrical element for an opto-electric conversion section 7. Also, the mirror 17 is formed in a part of the inner surface of a convex section 170 formed over the insulating substrate 411b, the optical waveguide 1, and the insulating substrate 411a from the electrical wiring 412b.

The structure of the opto-electric conversion section 4 shown in FIG. 13 is a structure in which the optical waveguide 1 is sandwiched between the two insulating substrates 411a, 411b. For this reason, rigidity of the opto-electric conversion section 4 can be maintained even if a thinner substrate is used as the insulating substrate 411a, and the distance between the optical element 6 and the mirror 17 can be further shortened. As a result, the optical coupling efficiency between the optical element 6 and the mirror 17 can be further increased.

The average thickness of the insulating substrates 411a, 411b is preferably about 5 to 50 μm and more preferably about 10 to 40 μm.

In addition, in the opto-electric conversion section 4 according to the present embodiment, it is also possible to mount the electrical element for an opto-electric conversion section 7 and the like on the upper surface side of the insulating substrate 411b. Thereby, further high-density mounting of the electrical element for an opto-electric conversion section 7 becomes possible.

Also, since the concave section 170 is a concave section opening to the upper surface of the electrical wiring 412b, it is possible to form the concave section 170 after the opto-electric conversion section 4 has been adhered to the optical waveguide 1. For this reason, it becomes possible to form the concave section 170 by aligning with the position of the light receiving/emitting section of the optical element 6, and thus optical axis alignment of the light receiving/emitting section and the mirror 17 can be strictly carried out.

<<Third Embodiment>>

Next, a third embodiment of the opto-electric hybrid board of the present invention is explained.

Figure 14:
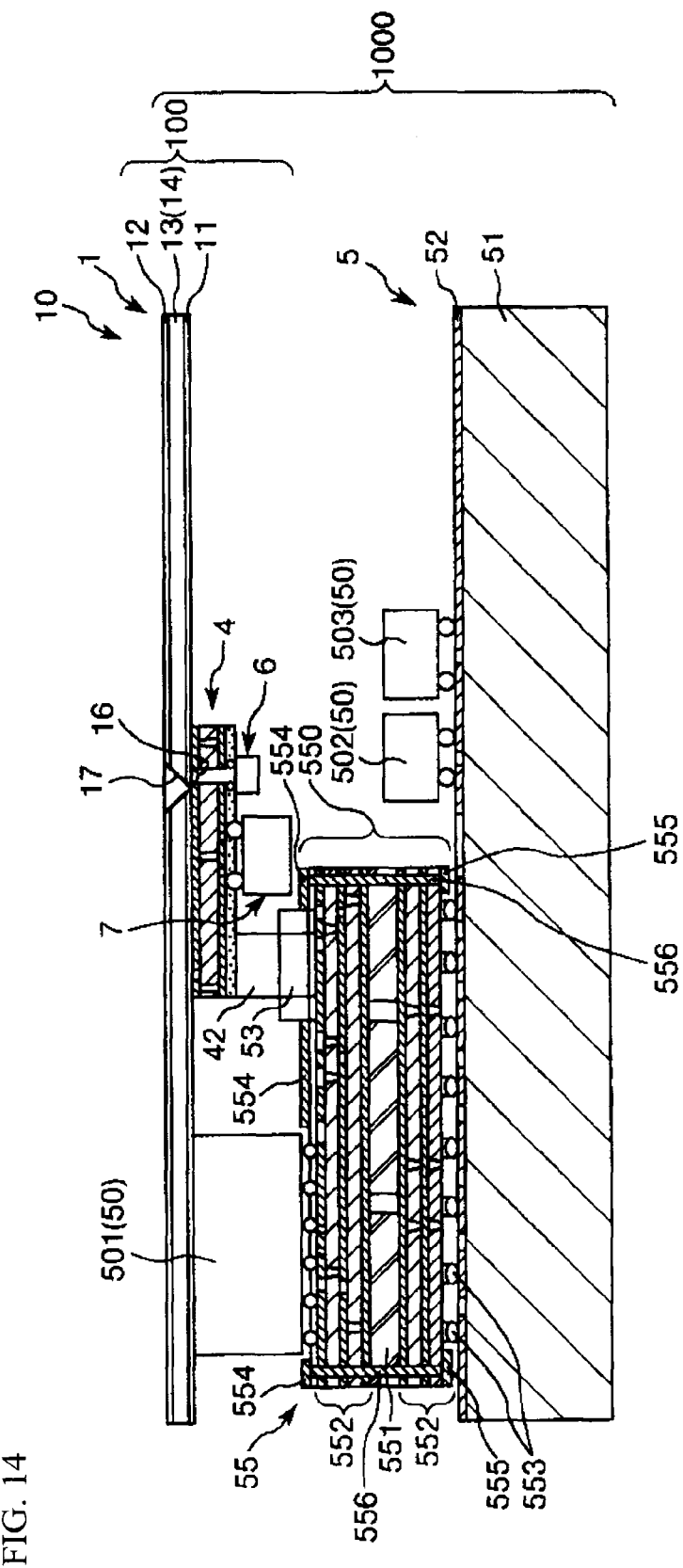
FIG. 14 is a cross-sectional view showing a part of a third embodiment of the opto-electric hybrid board of the present invention.

FIG. 14 is a cross-sectional view showing a part of the third embodiment of the opto-electric hybrid board of the present invention.

Hereinafter, although the third embodiment is explained, it is explained by placing emphasis on the points of difference with the first embodiment, and an explanation of the same matters is omitted. Also, in FIG. 14, the same constitutional components as each of the above-mentioned embodiments are labeled with the same reference numerals as those previously explained and a detailed explanation thereof is omitted.

Other than having an electrical interposer (electrical wiring board) 55 interposed between the opto-electric conversion section 4 and the motherboard 5, and the LSI 501 mounted on the electrical interposer 55, the third embodiment is the same as the first embodiment. In addition, different to the first and second embodiments, in the present embodiment, the electrical interposer 55 corresponds to the "electrical wiring board".

The electrical interposer 55 shown in FIG. 14 has a multilayer substrate 550 including a core substrate 551 and a build-up layer 552 stacked on both surfaces thereof, and a bump 553 disposed on the lower surface of the multilayer substrate 550. Also, the LSI 501 is mounted on the electrical interposer 55 as mentioned above, and the electrical wiring and the opto-electric conversion section 4 disposed on the surface of and inside the electrical interposer 55 are electrically connected via the electrical connector (second terminal) 53. By using such electrical interposer 55, high densification of the electrical wiring can be easily attained and the rate of signal transmission can be increased. As a result, increasing the speed and enlarging the capacity of information transmission between the LSI 501 and the opto-electric conversion section 4 can be attained, and thus full use can be made of the benefit of speed increase by optical communication. In other words, an opto-electric hybrid board 1000 making high-speed and large capacity information processing possible can be obtained.

Also, the electrical interposer 55 is electrically connected with the electrical wiring 52 of the motherboard 5 via the bump 553. Thereby, also in the case of mounting a plurality of electrical interposers 55 on the motherboard 5, these can be made to mutually cooperate with each other.

In addition, the multilayer substrate 550 may be a multilayer substrate including a core substrate like shown in FIG. 14, or may be a coreless multilayer substrate not including a core substrate.

Also, the build-up layer 552 can be formed by a build-up construction method like an additive method, a semi-additive method, or a subtractive method.

Also, other electrical elements like described above for example may be mounted on the electrical interposer 55.

Here, the electrical interposer 55 shown in FIG. 14 has a reinforcement member (stiffener) 554 joined to a region other than the region on which the electrical element for an electrical wiring board 50 like the LSI 501 and the like of the upper surface of the multilayer substrate 550, is mounted. Specifically, in the electrical interposer 55 shown in FIG. 14, the reinforcement member 554 is disposed in a region other than the LSI 501 and the electrical connector 53.

As the constituent material of the reinforcement member 554, a material having a smaller thermal expansion coefficient than the insulation layer of the build-up layer 552 can be used. By using such reinforcement member 554, thermal expansion of the build-up layer 552 can be suppressed and deformation of the multilayer substrate 550 can be suppressed. As the constituent material of the reinforcement member 554, specifically, for example, a metal material, a ceramic material, and the like can be mentioned, and using a metal material is preferable. Thereby, heat dissipation of the reinforcement member 554 can be increased and reliability of the electrical element for an electrical wiring board 50 can be increased.

In particular, the thermal expansion coefficient of the reinforcement member 554 is preferably 0.5 ppm/° C. or more and 10 ppm/° C. or less, more preferably 1 ppm/° C. or more and 7 ppm/° C. or less, and further preferably 1 ppm/° C. or more and 5 ppm/° C. or less. Thereby, deformation of the multilayer substrate 550 can be more effectively prevented.

As such metal material, there are no particular limitations, and various metal materials can be used. However, use an alloy including Fe is preferable from the viewpoint of realizing heat dissipation and low thermal expansion.

As such alloy including Fe, for example, Fe—Ni-based alloys, Fe—Co—Cr-based alloys, Fe—Co-based alloys, Fe—Pt-based alloys, Fe—Pd-based alloys, and the like can be mentioned. In particular, use of a Fe—Ni-based alloy is preferable.

Since such metal material has not only superior hear dissipation, but also a low thermal expansion coefficient, it is useful as the constituent material of the reinforcement member 554.

As the Fe—Ni-based alloy, there are no particular limitations as the long it includes Fe and Ni, and, the remainder (M) other than Fe and Ni, may include one or more metals among metals such as Co, Ti, Mo, Cr, Pd, and Pt.

More specifically, as Fe—Ni-based alloys, for example, Fe—Ni alloys such as Fe-36Ni alloy (isobar), Fe—Ni—Co alloys such as Fe-32Ni-5Co alloy (super isobar), Fe-29Ni-17Co alloy (kovar), and Fe-36Ni-12Co alloy (elinvar), and Ni—Mo—Fe alloys such as Fe—Ni—Cr-Tr alloy and Ni-28Mo-2Fe alloy can be mentioned. Also, Fe—Ni—Co alloys, for example, are sold under product names such as the KV series, such as KV-2, KV-4, KV-6, KV-15, and KV-25 (manufactured by NEOMAX Materials Co., Ltd.), and Nivarox. Also, Fe—Ni alloys are sold under product names such as NS-5 and D-1 (manufactured by NEOMAX Materials Co., Ltd.). Also, Fe—Ni—Cr—Ti alloys, for example, are sold under product names such as Ni-Span C-902 (manufactured by Daido-Special Metals Ltd.) and EL-3 (manufactured by NEOMAX Materials Co., Ltd.).

Also, as the Fe—Co—Cr-based alloy, there are no particular limitations as long as it includes Fe, Co, and Cr, and, for example, Fe—Co—Cr alloys such as Fe-54Co-9.5Cr (stainless isobar) can be mentioned. In addition, the Fe—Co—Cr-based alloy may include, other than Fe, Co, and Cr, one or more metals among metals such as Ni, Ti, Mo, Pd, and Pt.

Also, as the Fe—Co-based alloy, there are no particular limitations as long as it includes Fe, and Co, and, other than Fe and Co, may include one or more metals among metals such as Ni, Ti, Mo, Cr, Pd, and Pt.

Also, as the Fe—Pt-based alloy, there are no particular limitations as long as it includes Fe and Pt, and, other than Fe, and Co, may include one or more metals among metals such as Co, Ni, Ti, Mo, Cr, and Pd.

Also, as the Fe—Pd-based alloy, there are no particular limitations as long as it includes Fe, and Pd, and, other than Fe, and Co, may include one or more metals among metals such as Co, Ni, Ti, Mo, Cr, and Pt.

This reinforcement member 554 is joined to the upper surface of the multilayer substrate 550, and, as the joining method thereof, for example, an adhesive, a pressure-sensitive adhesive, and compression bonding can be mentioned. Among these, by using an adhesive, the reinforcement member 554 and the multilayer substrate 550 can be easily joined. As such adhesive, there are no particular limitations as long as it has an adhesive function, and various adhesives can be used. However, an adhesive that has superior thermal conductivity is preferable.

As adhesives having superior thermal conductivity, for example, adhesives including an inorganic filler can be mentioned. As inorganic fillers, for example, metals such as Au, Ag, and Pt; oxides such as silica, alumina, diatomaceous earth, titanium oxide, iron oxide, zinc oxide, magnesium oxide, and metal ferrites; nitrides such as boron nitride, silicon nitride, gallium nitride, and titanium nitride; hydroxides such as aluminum hydroxide and magnesium hydroxide; carbonates such as calcium carbonate (light, heavy), magnesium carbonate, dolomite, and dawsonite; sulfates or sulfites such as calcium sulfate, barium sulfate, ammonium sulfate, and calcium sulfite; silicates such as talc, mica, clay, glass fibers, calcium silicate, montmorillonite, and bentonite; borates such as zinc borate, barium metaborate, aluminum borate, calcium borate, and sodium borate; carbon such as carbon black, graphite, carbon fibers, and, in addition to these, iron powder, copper powder, aluminum powder, zinc white, molybdenum sulfide, boron fibers, potassium titanate, and lead zirconate titanate can be mentioned. One or two or more of these may be used. In addition, if an inorganic filler having conductivity is used as the inorganic filler, the part in contact with the adhesive is subjected to an insulation treatment according to necessity.

Also, a reinforcement member 555 having the same constitution as the reinforcement member 554 is disposed in a region other than the bump 553 of the lower surface of the multilayer surface 550 in the electrical interposer 55. By providing such reinforcement member 555, deformation of the electrical interposer 55 can be further suppressed.

Also, in the multilayer substrate 550 is formed a via hole penetrating the thickness direction thereof, and a heat transfer post 556 is disposed in this via hole.

This heat transfer post 556 penetrates the entirety of the multilayer substrate 550 in the thickness direction thereof, and the upper end is exposed on the upper surface of the multilayer substrate 550 and the lower end is exposed on the lower surface of the multilayer substrate 550. Also, the upper end of the transfer post 556 contacts the reinforcement member 554 and the lower end of the transfer post 556 contacts the reinforcement member 555. Thereby, the heat transfer post 556 connects the reinforcement member 554 and the reinforcement member 555.

This heat transfer post 556 has a heat transfer property higher than the above-described multilayer substrate 550. Thereby, heat can be effectively transmitted from the reinforcement member 554 to the reinforcement member 555 via the heat transfer post 556. As a result, the function of the reinforcement members 554, 555 as heat spreaders can be improved.

Also, since this heat transfer post 556 penetrates the multilayer substrate 550 in the thickness direction thereof, similar to well-known conductor posts, it can be formed easily and with high precision.

Also, the heat transfer post 556 may be hollow or may be solid. Also, as the transverse sectional shape of the transfer post 556, there are no particular limitations, and, for example, circular, elliptical, and polygonal, and the like can be mentioned. Also, the number of heat transfer posts 556 is not particularly limited, and, although arbitrary, it is preferable to provide as many as is possible to the extent that the mechanical strength of the multilayer substrate 550 is not impaired.

The heat transfer post 556 does not contribute to transmission of the electric signal. Thereby, heat can be more effectively transmitted from the reinforcement member 554 to the reinforcement member 555 via the transfer post 556.

In addition, in the present embodiment, the heat transfer post 556 is disposed on an outer periphery section when the multilayer substrate 550 is planarly viewed. Thereby, it is easy to make uniform the temperature distribution of the multilayer substrate 550.

Also, the heat transfer post 556 may be disposed so as not to contact the electrical wiring formed on the surface of or inside the multilayer substrate 550. Thereby, shorting between the heat transfer post 556 and the electrical wiring can be prevented.

As the material of such heat transfer post 556, there are no particular limitations as long as it has a heat transfer property higher than the multilayer substrate 550, and use of a metal material is preferable.

As such metal material, for example, various metals and various alloys such as copper, copper-based alloys, aluminum, and aluminum-based alloys can be mentioned. Among these, use of copper, a copper-based alloy, aluminum, or an aluminum-based alloy is preferable since they have a superior heat transfer property. Since copper and copper-based alloys having superior thermal conductivity, heat dissipation of the electrical element for an electrical wiring board 50 can be further improved.

<<Fourth Embodiment>>

Next, a fourth embodiment of the opto-electric hybrid board of the present invention is explained.

Figure 15:
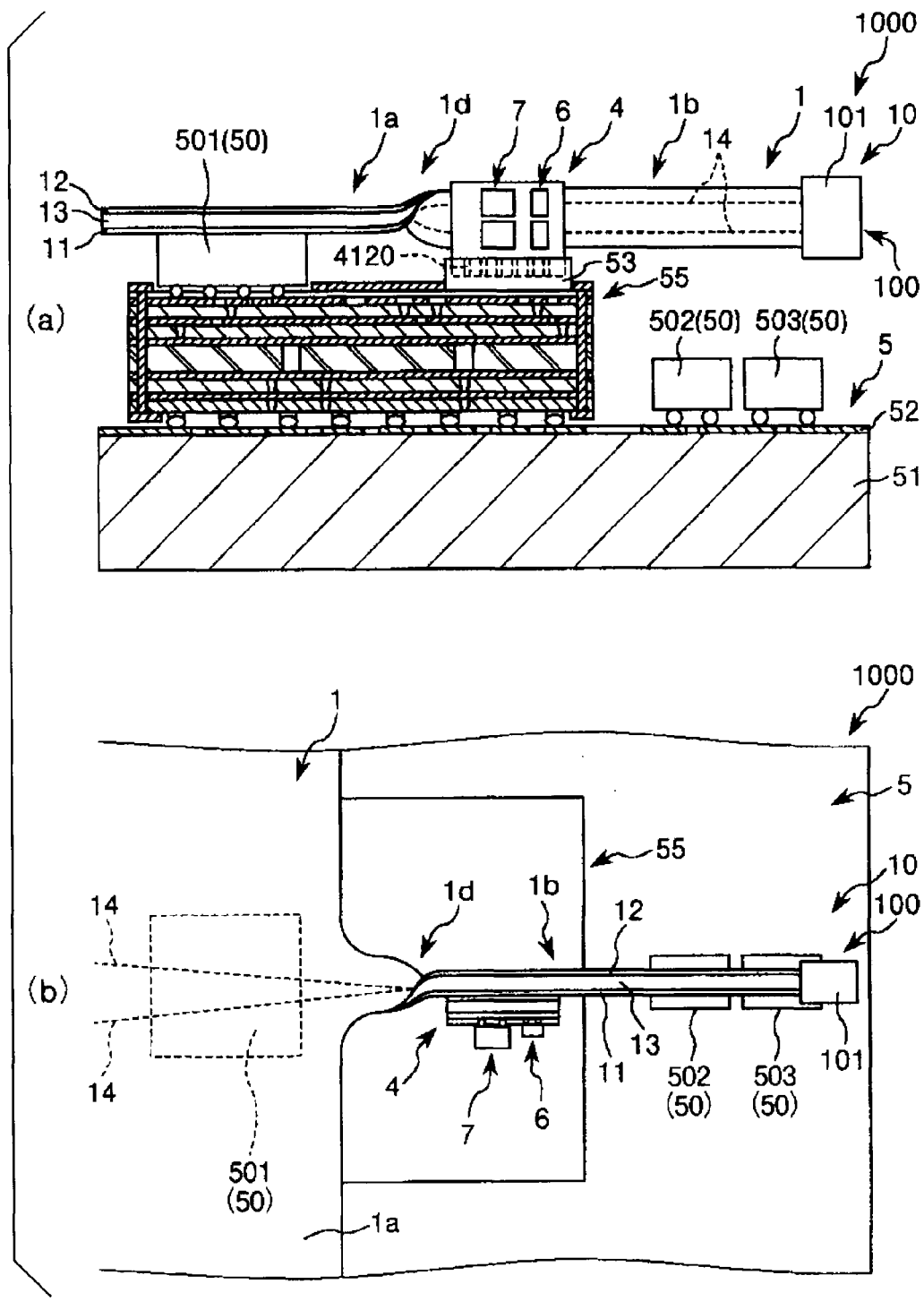
FIG. 15 is a cross-sectional view showing a part of a fourth embodiment of the opto-electric hybrid board of the present invention.

FIG. 15(*a*) is a cross-sectional view showing a part of a fourth embodiment of the opto-electric hybrid board of the present invention and FIG. 15(*b*) is a top view of FIG. 15(*a*).

Hereinafter, although the fourth embodiment is explained, it is explained by placing emphasis on the points of difference with the third embodiment, and an explanation of the same matters is omitted. Also, in FIG. 15, the same constitutional components as each of the above-mentioned embodiments are labeled with the same reference numerals as those previously explained and a detailed explanation thereof is omitted.

Other than the optical waveguide 1 having a shape comprising a sheet-like part 1*a* widening so as to cover a part of the motherboard 5 and a belt-like 1*b* part extending from the sheet-like part 1*a*, and the belt-like part 1*b* in a connection section 1*d* between the sheet-like part 1*a* and the belt-like part 1*b* being twisted 90°, the fourth embodiment is the same as the third embodiment.

In other words, the optical waveguide 1 shown in FIG. 15, similar to the third embodiment, has the sheet-like part 1*a* covering the motherboard 5 and the electrical interposer 55.

Also, the optical waveguide 1 shown in FIG. 15 has the belt-like part 1*b*, and the opto-electric conversion section 4 is disposed in this belt-like part 1*b*. Here, since the belt-like part 1*b* is twisted 90° in the above-mentioned connection section 1*d*, in association with this, the arrangement of the opto-electric conversion section 4 also becomes an arrangement rotated 90° with respect to the arrangement of the third embodiment. Thereby, the flat opto-electric conversion section 4 becomes arranged such that the surface direction thereof intersects perpendicularly with the upper surface of the electrical interposer 55.

At an end section of the insulating substrate 411 of the opto-electric conversion section 4 is arranged side by side a plurality of contact points 4120 connected to the electrical wiring 412. By the opto-electric conversion section 4 being arranged like mentioned above, it is possible for these contact points 4120 to be directly inserted into the electrical connector (socket) 53 of the electrical interposer 55. If it has such a connection structure, it is not necessary to provide the electrical connector 42 in the opto-electric conversion section 4, and instead a so-called edge connector in which only the contact points 4120 are formed can be used. Thereby, reduction in cost and simplification of the opto-electric conversion section 4 is possible. Also, since it becomes so that the electrical connector 53 can be directly viewed from above the optical waveguide 1 by the belt-like part 1b being twisted 90°, there is also the advantage that the connection operation between the contact points 4120 and the electrical connector 53 can be easily carried out.

In addition, in this case, the electrical connector 53, in addition to those mentioned above, may be a card socket-type connector.

Also, in FIG. 15, although a belt-like part 1b is disposed at an end section of the optical waveguide 1 and the optical connector 101 is mounted on such end section, the arrangement of the belt-like part 1b is not limited thereto. For example, the belt-like part 1b may be arranged in a position surrounded by the sheet-like part 1a.

Furthermore, the twisted angle in the connection section 1d is not limited to 90° and is arbitrarily set within the scope of about 10 to 90° according to the acceptance angle of the electrical connector 53.

<<Fifth Embodiment>>

Next, a fifth embodiment of the opto-electric hybrid board of the present invention is explained.

Figure 16:
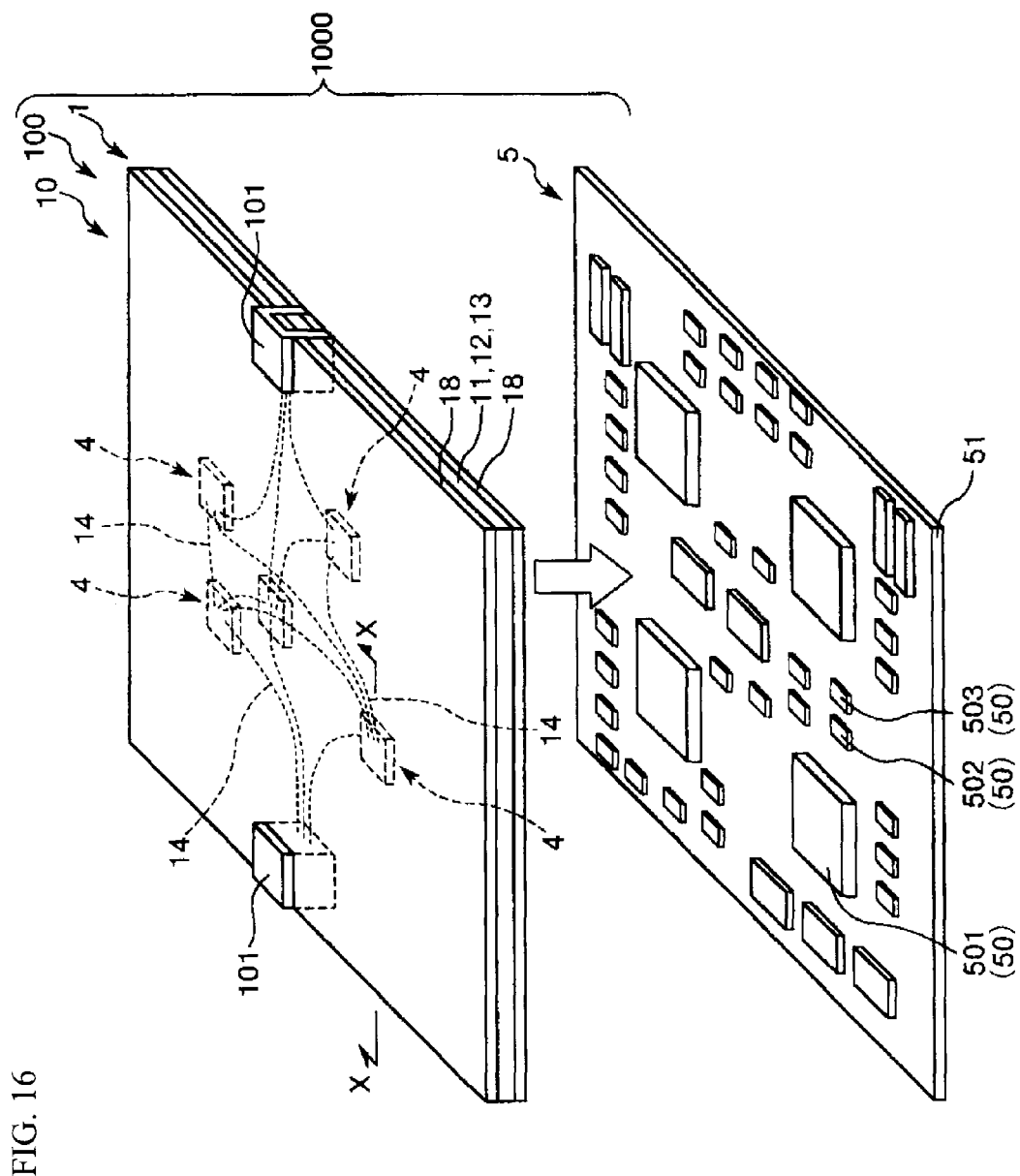
FIG. 16 is an exploded cross-sectional view (shown partially see-through) showing a fifth embodiment of the opto-electric hybrid board of the present invention.

FIG. 16 is an exploded cross-sectional view (shown partially see-through) showing the fifth embodiment of the opto-electric hybrid board of the present invention.

Figure 17:
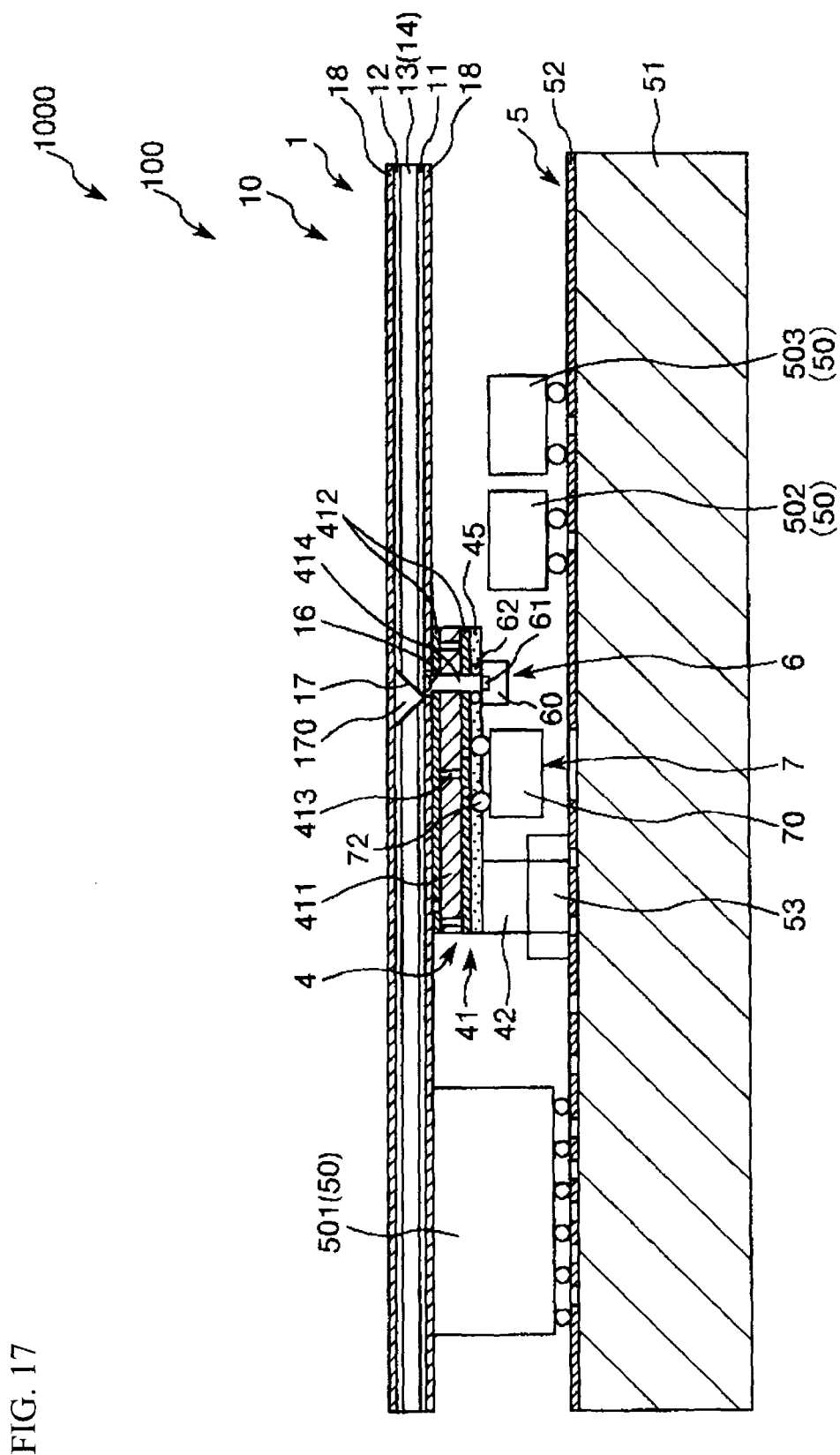
FIG. 17 is a line X-X cross-sectional view in the state in which the optical waveguide is superimposed as shown by the void arrow in FIG. 16.

FIG. 17 is a line X-X cross-sectional view in the state in which the optical waveguide is superimposed as shown by the void arrow in FIG. 16.

Hereinafter, although the fifth embodiment is explained, it is explained by placing emphasis on the points of difference with the first embodiment, and an explanation of the same matters omitted. In addition, in FIG. 16, the same constitutional components as each of the above-mentioned embodiments are labeled with the same reference numerals as those previously explained and a detailed explanation thereof is omitted.

Other than the optical waveguide 1 further including a metal layer 18, the fifth embodiment is the same as the first embodiment.

The optical waveguide 1 shown in FIGS. 16 and 17 has the metal layer 18 disposed on the upper surface of the cladding layer 12 and the lower surface of the cladding layer 11. By providing the metal layer 18, rigidity of the optical waveguide 1 can be increased. Thereby, when the optical waveguide 1 is superimposed on the motherboard 5, since warping of the optical waveguide 1 becomes difficult, and thus the shape thereof can be easily maintained, arrangement of the optical waveguide 1 and the motherboard 5 is maintained with higher precision. Thereby, transmission or reception efficiency of signals between the optical waveguide 1 and the motherboard 5 can be more highly maintained. As a result, an opto-electric hybrid board 1000 particularly having high internal signal transmission efficiency (reliability) can be obtained.

(Optical Waveguide)

Figure 18:
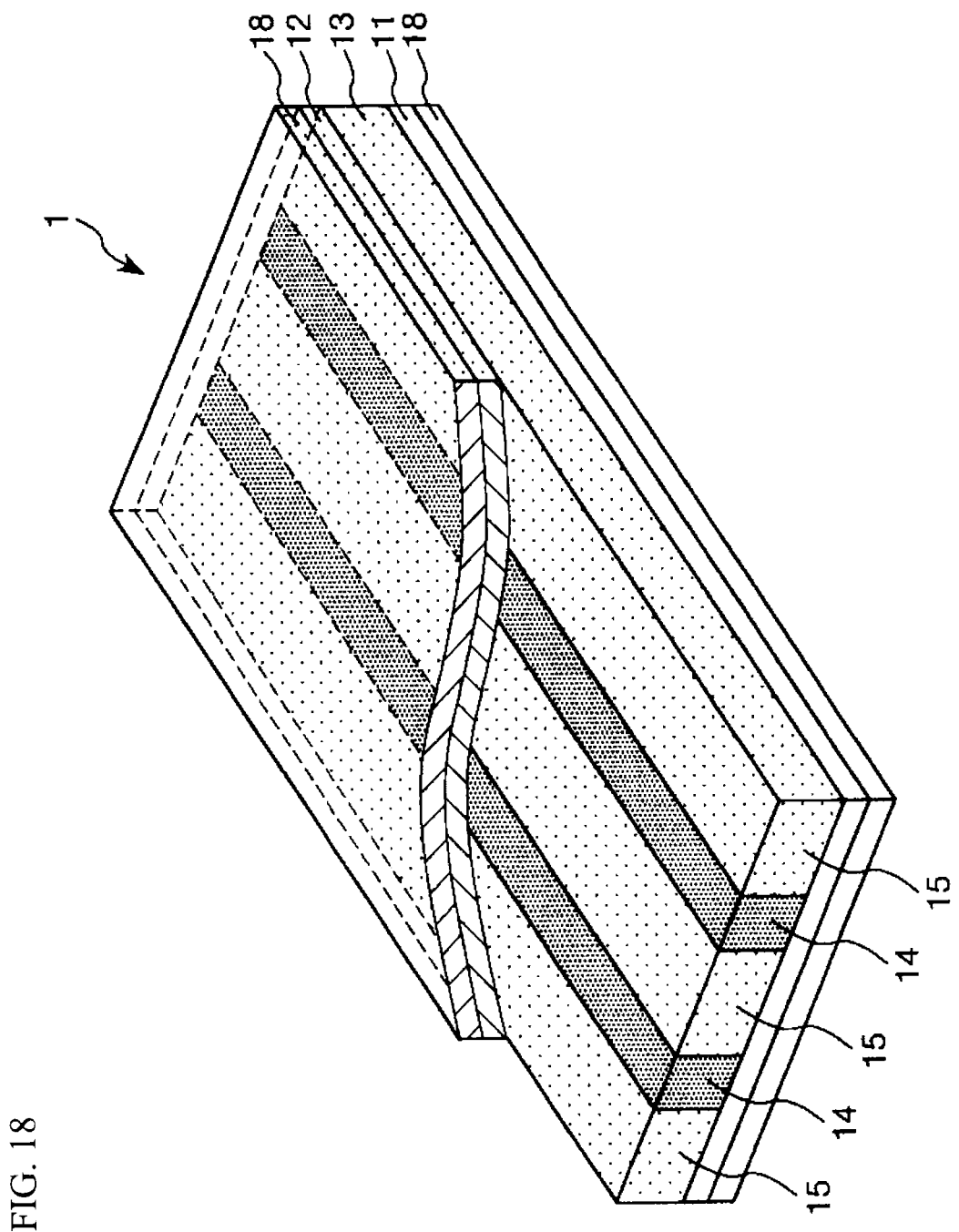
FIG. 18 is a perspective view showing (shown partially cutaway and see-through) a part of the optical waveguide shown in FIG. 16 enlarged.

FIG. 18 is a perspective view showing (shown partially cutaway and see-through) a part of the optical waveguide 1 shown in FIG. 16 enlarged.

The optical waveguide 1 shown in FIGS. 17 and 18 has the metal layer 18 disposed on the upper surface of the cladding layer 12 and the lower surface of the cladding layer 11. Also, the upper surface of the LSI 501 abuts (directly contacts) the metal layer 18 disposed on the lower surface of the cladding layer 11. Thereby, heat from the LSI 501 is easily transmitted to the metal layer 18 and dispersed. As a result, heat dissipation of the LSI 501 is particularly promoted. In other words, the metal layer 18 functions as a heat spreader dissipating heat from the LSI 501.

Also, another not shown heat dissipation member may be connected to the metal layer 18. Heat from the LSI 501 is conducted to this heat dissipation member via the metal layer 18, and thus heat dissipation can be carried out. As the heat dissipation member, for example, a heat dissipation fin, a heat exchanger, and the like can be mentioned.

In addition, the upper surface of the LSI 501 may be in contact with the metal layer 18 via a heat conduction material. As the heat conduction material, for example, a sheet, paste, or the like of a resin-based material like an acrylic-based resin or a silicone-based resin, a carbon-based material like graphite, a ceramic-based material like silica, alumina, or silicon nitride, or a metal-based material like aluminum or copper can be used. Also, a sheet or paste of a composite material in which two or more of these materials are mixed can be used.

Also, by providing the metal layer 18, rigidity of the optical waveguide 1 can be increased. Thereby, when the optical waveguide 1 is superimposed on the motherboard 5, since the optical waveguide 1 hardly warps, and thus the shape thereof can be easily maintained, arrangement of the optical waveguide 1 and the motherboard 5 is maintained with higher precision. Thereby, transmission or reception efficiency of signals between the optical waveguide 1 and the motherboard 5 can be more highly maintained. As a result, an opto-electric hybrid board 1000 particularly having high internal signal transmission efficiency (reliability) can be obtained.

The average thickness of the metal layer 18 is not particularly limited, and is preferably about 1 to 1,000 μm and more preferably about 3 to 800 μm. Thereby, while increasing heat dissipation, sufficient rigidity can be given to the optical waveguide 1 and warping can be prevented by its own weight. In other words, if the average thickness of the metal layer 18 is below the above-mentioned lower limit, there is the possibility that sufficient heat dissipation cannot be obtained and also, there is the possibility that sufficient rigidity is not given to the optical waveguide 1. On the other hand, if the average thickness of the metal layer 18 is above the above-mentioned upper limit, there is the possibility that the weight of the metal layer 18 increases, the optical waveguide 1 warps by its own weight and signal transmission efficiency decreases.

Also, the total average thickness of the metal layer 18 is preferably about 0.01 to 20 times, and more preferably about 0.05 to 15 times, the average thickness of the optical waveguide 1. Thereby, while securing sufficient heat dissipation and rigidity, increasing the mass of the optical waveguide 1 more than is necessary can be prevented.

As the constituent material of the metal layer 18, for example, various metal materials can be mentioned, and particularly elementary copper, aluminum, iron, silver, gold, chromium, nickel, zinc and tin or an alloy including these metal elements is preferably used. More preferably, elemental aluminum, iron and copper or an alloy based on these as the main material is used. Since these materials have particularly high dissipation and give particularly sufficient rigidity to the optical waveguide 1, arrangement of the optical waveguide 1 and the motherboard 5 can be maintained with further higher precision.

Also, although described in detail later, a via hole penetrating the optical waveguide 1 may be disposed and a heat transfer post may be disposed therein. By connecting the metal layer 18 disposed on the upper surface of the cladding layer 12 and the metal layer 18 disposed on the lower surface of the cladding layer 11 via this heat transfer post, the function as a heat spreader is further strengthened. As the constituent material of this heat transfer post, for example, various metal materials such elemental metals such as copper, aluminum, nickel, chromium, zinc, tin, gold, and silver or alloys including these metal elements can be mentioned.

In addition, a through-hole is disposed in the metal layer 18 disposed on the lower surface of the lower cladding layer 11 in the part that overlaps with the optical path. Therefore, obstruction of signal light propagation by the metal layer 18 can be prevented.

Also, patterning can be carried out on the metal layer 18 according to necessity and a part used as electrical wiring may be included.

Figure 19:
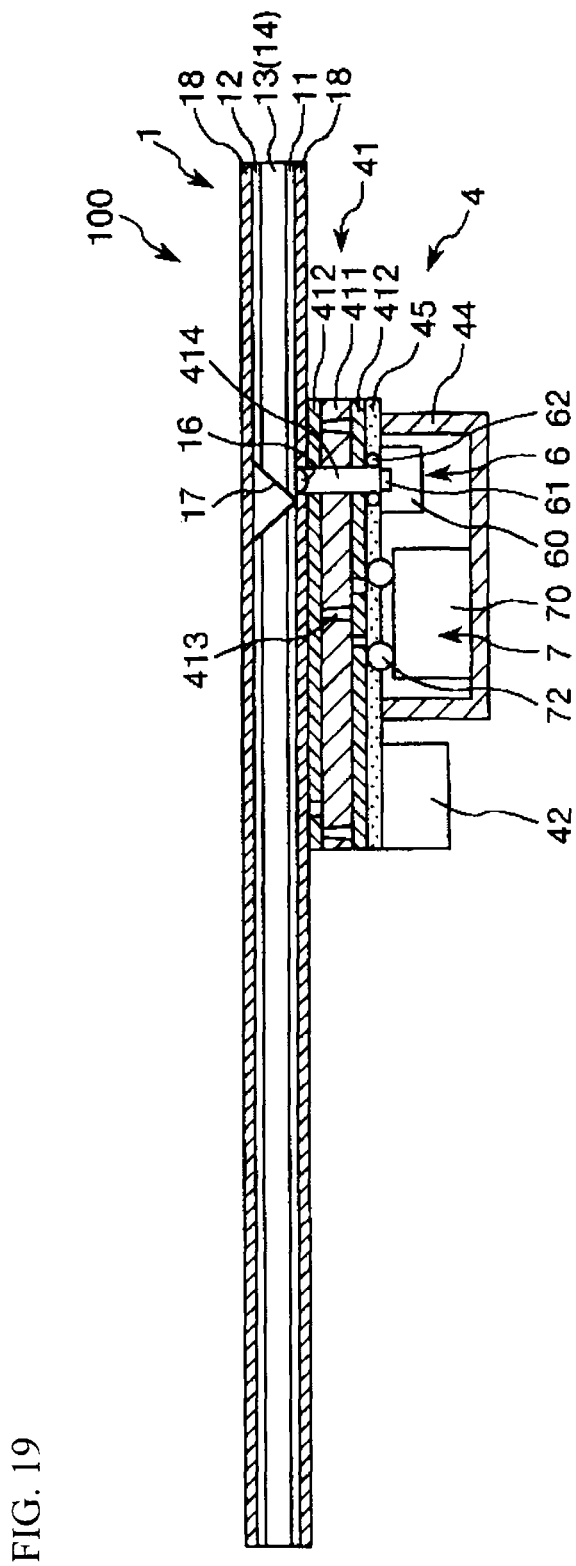
FIG. 19 is a cross-sectional view showing another constitutional example of the optical module according to the fifth embodiment.

FIG. 19 is a cross-sectional view showing a constitutional example of the optical module 100 according to the present embodiment.

The opto-electric conversion section 4 shown in FIG. 19 has the heat spreader (heat dissipation body) 44 added to the opto-electric conversion section 4 in FIG. 16. The heat spreader 44 shown in FIG. 19 is a box shape covering the optical element 6 and the electrical element for an opto-electric conversion section 7 mounted on the lower surface of the opto-electric conversion substrate 41. Also, it is configured such that the bottom surface of the inside of the heat spreader 44 and the lower surface of the electrical element for an opto-electric conversion section 7 abut. Thereby, heat from the electrical element for an opto-electric conversion section 7 is effectively transmitted to the heat spreader 44 and dispersed. As a result, heat dissipation of the electrical element for an opto-electric conversion section 7 is particularly promoted.

As the constituent material of the heat spreader 44, the same materials as explained above can be used.

In addition, between the electrical element for an opto-electric conversion section 7 and the heat spreader 44 may be only simply in contact or may be in contact via a heat conduction material. As the heat conduction material, those described above can be used.

Also, a concavo-convex shape increasing the surface area may be disposed on the heat spreader 44. As this concavo-convex shape, for example, a fin shape disposed on the lower surface of the heat spreader 44 shown in FIG. 19 and the like can be mentioned.

<<Sixth Embodiment>>

Next, the optical module according to a sixth embodiment of the opto-electric hybrid board of the present invention is explained.

Figure 20:
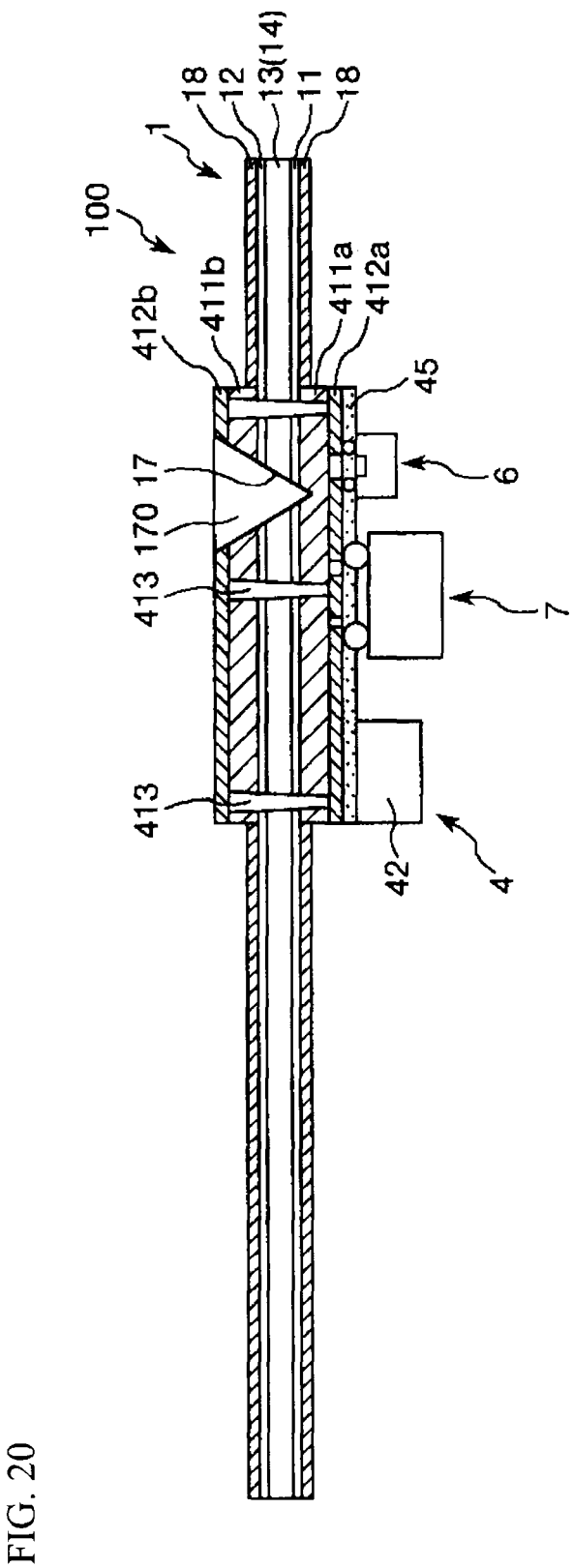
FIG. 20 is a cross-sectional view showing a part of a sixth embodiment of the opto-electric hybrid board of the present invention.

FIG. 20 is a cross-sectional showing a part of the sixth embodiment of the opto-electric hybrid board of the present invention.

Hereinafter, although the sixth embodiment is explained, it is explained by placing emphasis on the points of difference with the fifth embodiment, and an explanation of the same matters is omitted. Also, in FIG. 20, the same constitutional components as each of the above-mentioned embodiments are labeled with the same reference numerals as those previously explained and a detailed explanation thereof is omitted.

Other than the configuration of the opto-electric conversion section 4 being different, the sixth embodiment is the same as the fifth embodiment.

The opto-electric conversion section 4 shown in FIG. 20 has the insulating substrate 411*a* disposed on the lower surface of the cladding layer 11 of the optical waveguide 1, the insulating substrate 411*b* disposed on the upper surface of the cladding layer 12, the electrical wiring 412*a* disposed on the lower surface of the insulating substrate 411*a*, the electrical wiring 412*b* disposed on the upper surface of the insulating substrate 411*b*, the through wiring 413 that penetrates the optical waveguide 1 and that connects the electrical wiring 412*a* and the electrical wiring 412*b*, the sealing material 45, the electrical connector 42, the optical element 6, and the electrical element for an opto-electric conversion section 7. Also, the mirror 17 is configured by a part of the inner surface of a concave section 170 over the insulating substrate 411*b*, the optical waveguide 1, and the insulating substrate 411*a* from the electrical wiring 412*b*.

The structure of the opto-electric conversion section 4 shown in FIG. 20 is a structure in which the optical waveguide 1 is sandwiched between the two insulating substrates 411*a*, 411*b*. For this reason, rigidity of the opto-electric conversion section 4 can be maintained even if a thinner substrate is used as the insulating substrate 411*a*, and the distance between the optical element 6 and the mirror 17 can be further shortened. As a result, the optical coupling efficiency between the optical element 6 and the mirror 17 can be further increased.

The average thickness of the insulating substrates 411*a*, 411*b* is preferably about 5 to 50 μm and more preferably about 10 to 40 μm.

In addition, in the opto-electric conversion section 4 according to the present embodiment, it is also possible to mount the electrical element for an opto-electric conversion section 7 and the like on the upper surface side of the insulating substrate 411*b*. Thereby, further high-density mounting of the electrical element for an opto-electric conversion section 7 becomes possible.

Also, since the concave section 170 is a concave section opening to the upper surface of the electrical wiring 412*b*, it is possible to form the concave section 170 after the opto-electric conversion section 4 has been adhered to the optical waveguide. For this reason, it becomes possible to form the concave section 170 by aligning with the position of the light receiving/emitting section of the optical element 6, and thus optical axis alignment of the light receiving/emitting section and the mirror 17 can be strictly carried out.

Figure 21:
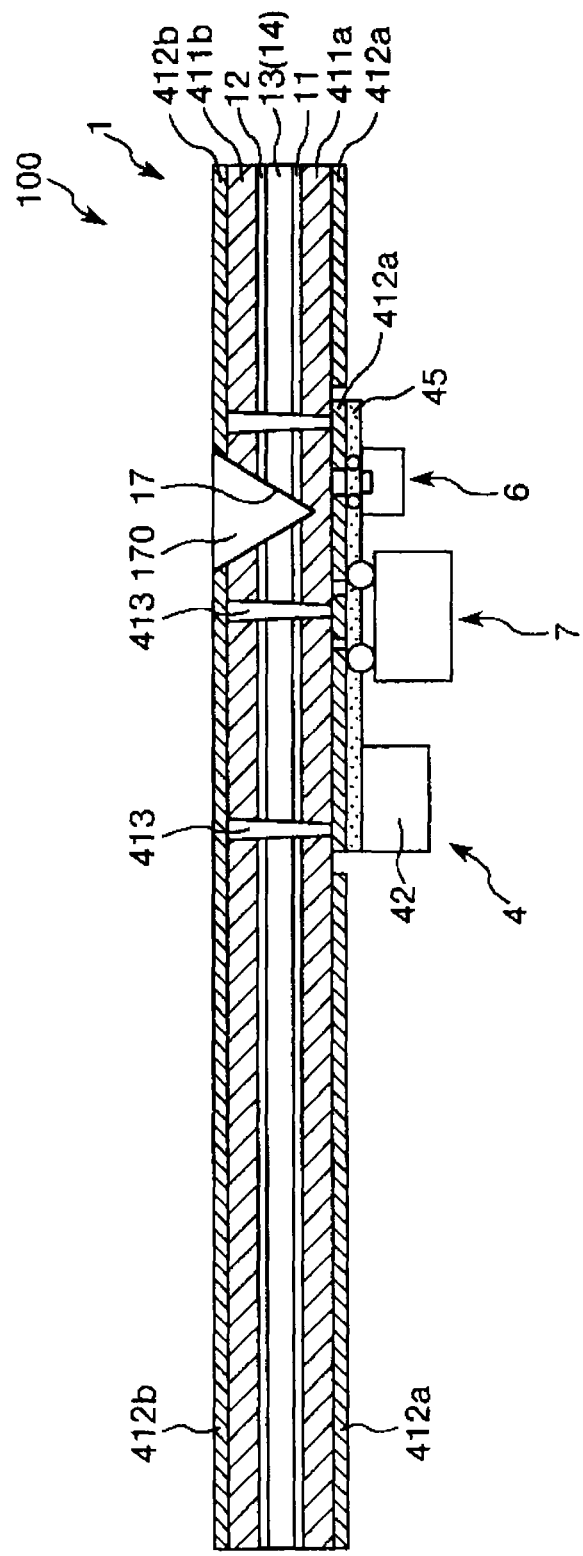
FIG. 21 is a cross-sectional view showing another constitutional example of the optical module according to the sixth embodiment.

FIG. 21 is a cross-sectional view showing another constitutional example of the optical module 100 according to the present embodiment.

In the opto-electric conversion section 4 shown in FIG. 21, each insulating substrate 411*a*, 411*b* and the electrical wirings 412*a*, 412*b* of the opto-electric conversion section 4 shown in FIG. 20 extend along the entirety of the optical waveguide 1. Here, the electrical wirings 412*a*, 412*b* are each constituted from a metal material, and have the same function as the metal layer 18 according to the above-mentioned first embodiment. For this reason, in the optical module 100 shown in FIG. 21, the rigidity of the optical waveguide 1 is strengthened over the entirety and the optical waveguide 1 becomes protected from external forces, external light, and the external environment.

<<Seventh Embodiment>>

Next, the optical module according to a seventh embodiment of the opto-electric hybrid board of the present invention is explained.

Figure 22:
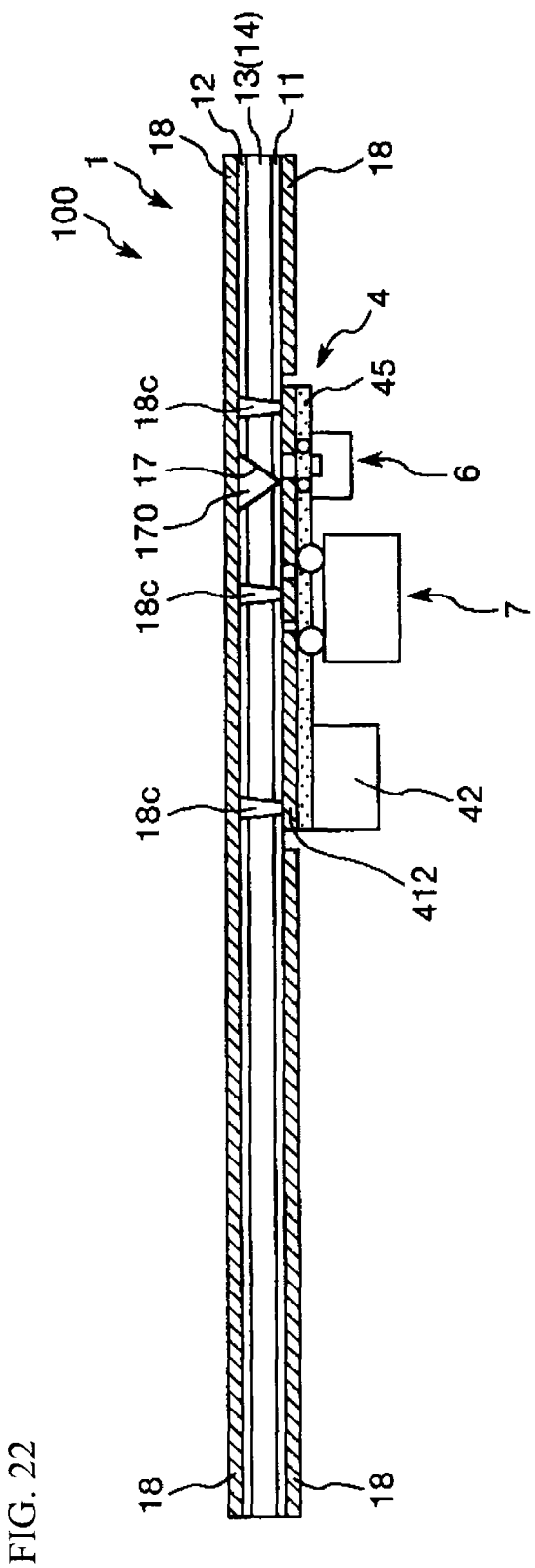
FIG. 22 is a cross-sectional view showing a part of a seventh embodiment of the opto-electric hybrid board of the present invention.

FIG. 22 is a cross-sectional view showing a part of the seventh embodiment of the opto-electric hybrid board of the present invention.

Hereinafter, although the seventh embodiment is explained, it is explained by placing emphasis on the points of difference with the fifth embodiment, and an explanation of the same matters is omitted. Also, in FIG. 22, the same constitutional components as each of the above-mentioned embodiments are labeled with the same reference numerals as those previously explained and a detailed explanation thereof is omitted.

Other than having the insulating substrate 411 and the electrical wiring 412 disposed on the upper surface thereof of the opto-electric conversion section 4 and the metal layer 18 positioned thereabove omitted, and, on the other hand, having through wiring 18c connecting the metal layer 18 penetrating the optical waveguide 1 and the electrical wiring 412 formed, the optical module 100 according to the seventh embodiment is the same as the optical module 100 according to the fifth embodiment. In other words, the opto-electric conversion section 4 shown in FIG. 22 is configured such that the optical waveguide 1 and the electrical wiring 412 are in contact. If it is such structure, the distance between the optical element 6 and the mirror 17 can be further shortened by the amount of the omitted insulating substrate 411 and the like. As a result, optical coupling efficiency between the optical element 6 and the mirror 17 can be further increased. Also, since the above-mentioned distance can be shortened, the lens 16 can also be omitted like shown in FIG. 22.

Also, the electric circuit can be constructed in a wider range by fabricating the electrical wiring by patterning the metal layer 18 and by connecting with the electrical wiring 412 via the through wiring 18c. Furthermore, it is possible to disperse and dissipate heat from the optical element 6 and the electrical element for an opto-electric conversion section 7 also in the metal layer 18 via the through wiring 18c.

<<Eighth Embodiment>>

Next, the eighth embodiment of the opto-electric hybrid board of the present invention is explained.

Figure 23:
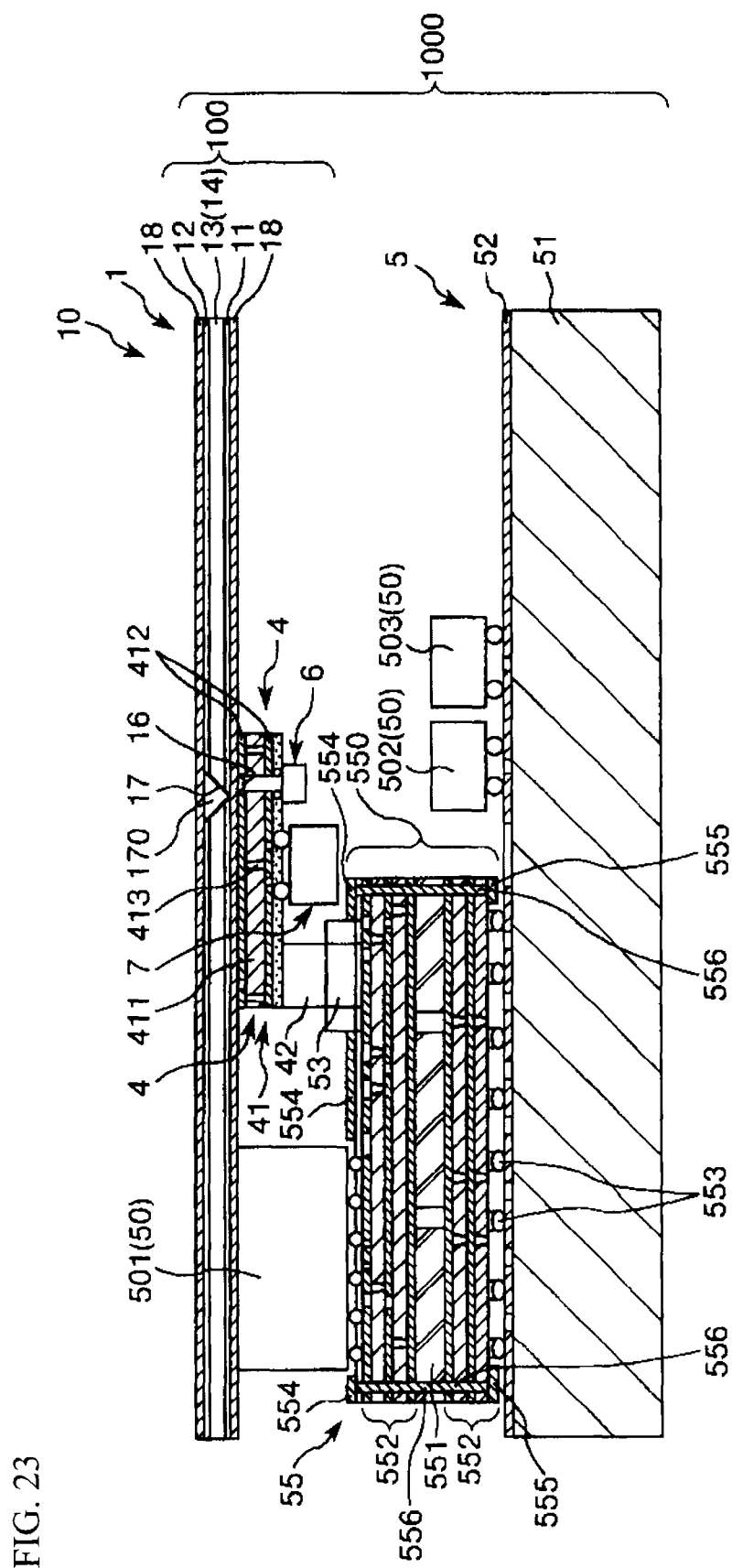
FIG. 23 is a cross-sectional view showing a part of an eighth embodiment of the opto-electric hybrid board of the present invention.

FIG. 23 is a cross-sectional view showing a part of the eighth embodiment of the opto-electric hybrid board of the present invention.

Hereinafter, although the eighth embodiment is explained, it is explained by placing emphasis on the points of difference with the third and fifth embodiments, and an explanation of the same matters is omitted. Also, In FIG. 23, the same constitutional components as each of the above-mentioned embodiments are labeled with the same reference numerals as those previously explained and a detailed explanation thereof is omitted.

Other than having the electrical interposer (electrical wiring board) 55 interposed between the opto-electric conversion section 4 and the motherboard 5, and the LSI 501 mounted on the electrical interposer 55, the eighth embodiment is the same as the fifth embodiment. In addition, in the present embodiment, different to the fifth embodiment and the like, the electrical interposer 55 corresponds to the electrical wiring board.

The electrical interposer shown in FIG. 23 has a multilayer substrate 550 including the core substrate 551 and the build-up layer 552 laminated on both surfaces thereof, and the bump 553 disposed on the lower surface of the multilayer substrate 550. Also, the LSI 501 is mounted on the electrical interposer 55 as described above, and the electrical wiring and opto-electric conversion section 4 disposed on the surface of and inside the electrical interposer 55 are electrically connected via the electrical connector 53. By using such electrical interposer 55, high densification of the electrical wiring can be easily attained and the rate of signal transmission can be increased. As a result, increasing the speed and enlarging the capacity of information transmission between the LSI 501 and the opto-electric conversion section 4 can be attained, and full use can be made of the benefit of speed increase by optical communication. In other words, an opto-electric hybrid board 1000 making high-speed and large capacity information processing possible can be obtained.

Also, the electrical interposer 55 is electrically with the electrical wiring 52 of the motherboard 5 via the bump 553. Thereby, even if a plurality of electrical interposers 55 is mounted on the motherboard 5, these can be made to mutually cooperate with each other.

In addition, although the multilayer substrate 550 may be a multilayer substrate including a core substrate like shown in FIG. 23, it may be a coreless multilayer substrate not including a core substrate.

Also, the build-up layer 552 can be formed by a build-up construction method like an additive method, a semi-additive method, or a subtractive method.

Also, other electrical elements like described above for example may be mounted on the electrical interposer 55.

Here, the electrical interposer 55 shown in FIG. 23 has the reinforcement member (stiffener) 554 joined to a region other than the region on which the electrical element for an electrical wiring board 50 like the LSI 501 and the like of the upper surface of the multilayer substrate 550, is mounted. Specifically, in the electrical interposer 55 shown in FIG. 23, the reinforcement member 554 is disposed in a region other than the LSI 501 and the electrical connector 53.

As mentioned above, by the electrical interposer 55 including such reinforcement members 554, 555, in other words, metal layers, and these being connected via a heat transfer post 556, the rigidity thereof is improved compared to when the electrical interposer 55 does not include a metal layer. Thereby, when the optical waveguide 1 is superimposed on the electrical interposer 55, warping of not only the optical waveguide 1, but also the electrical interposer 55, becomes difficult. As a result, the arrangement of the optical waveguide 1 connected to the electrical interposer 55 can be maintained at higher precision. Thereby, transmission or reception efficiency of signal between the optical waveguide 1 and the electrical interposer 55 can be more highly maintained.

<<Ninth Embodiment>>

Next, a ninth embodiment of the opto-electric hybrid board of the present invention is explained.

FIG. 24(a) is a cross-sectional view showing a part of the ninth embodiment of the opto-electric hybrid board of the present invention and FIG. 24(b) is a top view of FIG. 24(a).

Hereinafter, although the ninth embodiment is explained, it is explained by placing emphasis on the points of difference with the fourth and eighth embodiments, and an explanation of the same matters is omitted. Also, in FIG. 24, the same constitutional components as each of the above-mentioned embodiments are labeled with the same reference numerals as those previously explained and a detailed explanation thereof is omitted.

Other than the optical waveguide 1 having the shape including a sheet-like part 1a extending so as to cover a part of the motherboard 5 and a belt-like part 1b extending from the sheet-like part 1a, and the belt-like part 1b in the connection section 1d between the sheet-like part 1a and the belt-like part 1b being twisted 90°, the ninth embodiment is the same as the eighth embodiment.

Figure 24:
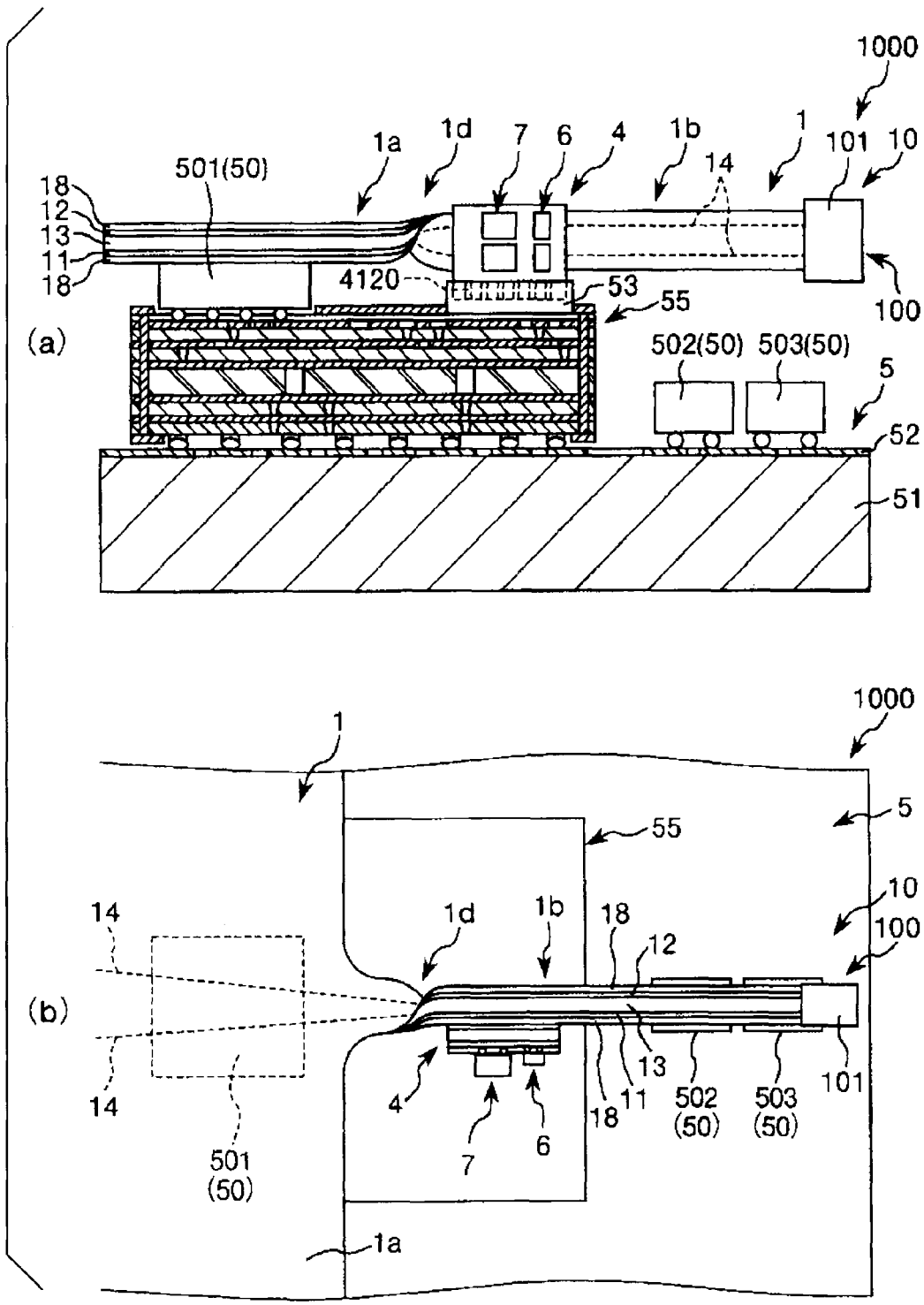
FIG. 24 is a cross-sectional view showing a part of a ninth embodiment of the opto-electric hybrid board of the present invention.

In other words, the optical waveguide 1 shown in FIG. 24, similar to the third embodiment, has the sheet-like part 1a covering the motherboard 5 and the electrical interposer 55.

Also, the optical waveguide 1 shown in FIG. 24 has the belt-like part 1b, and the opto-electric conversion section 4 is disposed in this belt-like part 1b. Here, since the belt-like part 1b is twisted 90° in the above-mentioned connection section 1d, in association with this, the arrangement of the opto-electric conversion section 4 also becomes an arrangement rotated 90° with respect to the arrangement of the fourth embodiment. Thereby, the flat opto-electric conversion section 4 becomes arranged such that the surface direction thereof intersects perpendicularly with the upper surface of the electrical interposer 55.

At an end section of the insulating substrate 411 of the opto-electric conversion section 4 is arranged side by side a plurality of contact points 4120 connected to the electrical wiring 412. By the opto-electric conversion section 4 being arranged like mentioned above, it is possible for these contact points 4120 to be directly inserted into the electrical connector (socket) 53 of the electrical interposer 55. If it has such a connection structure, it is not necessary to provide the electrical connector 42 in the opto-electric conversion section 4, and instead a so-called edge connector in which only the contact points 4120 are formed can be used. Thereby, reduction in cost and simplification of the opto-electric conversion section 4 is possible. Also, since it becomes such that the electrical connector 53 can be directly viewed from above the optical waveguide 1 by the belt-like part 1b being twisted 90°, there is also the advantage that the connection operation between the contact points 4120 and the electrical connector 53 can be easily carried out.

In addition, in this case, the electrical connector 53, in addition to those mentioned above, may be a card socket-type connector.

Also, in FIG. 24, although a belt-like part 1b is disposed in an end section of the optical waveguide 1 and the optical connector 101 is mounted on such end section, the arrangement of the belt-like part 1b is not limited thereto. For example, the belt-like part 1b may be arranged in a position surrounded by the sheet-like part 1a.

Furthermore, the twisted angle in the connection section 1d is not limited to 90° and is arbitrarily set within the scope of about 10 to 90° according to the acceptance angle of the electrical connector 53.

<<Tenth Embodiment>>

The tenth embodiment of the opto-electric hybrid board of the present invention, and the optical module of the present invention, the optical interconnection component of the present invention, and the optical waveguide of the present invention included therein are explained.

Figure 25:
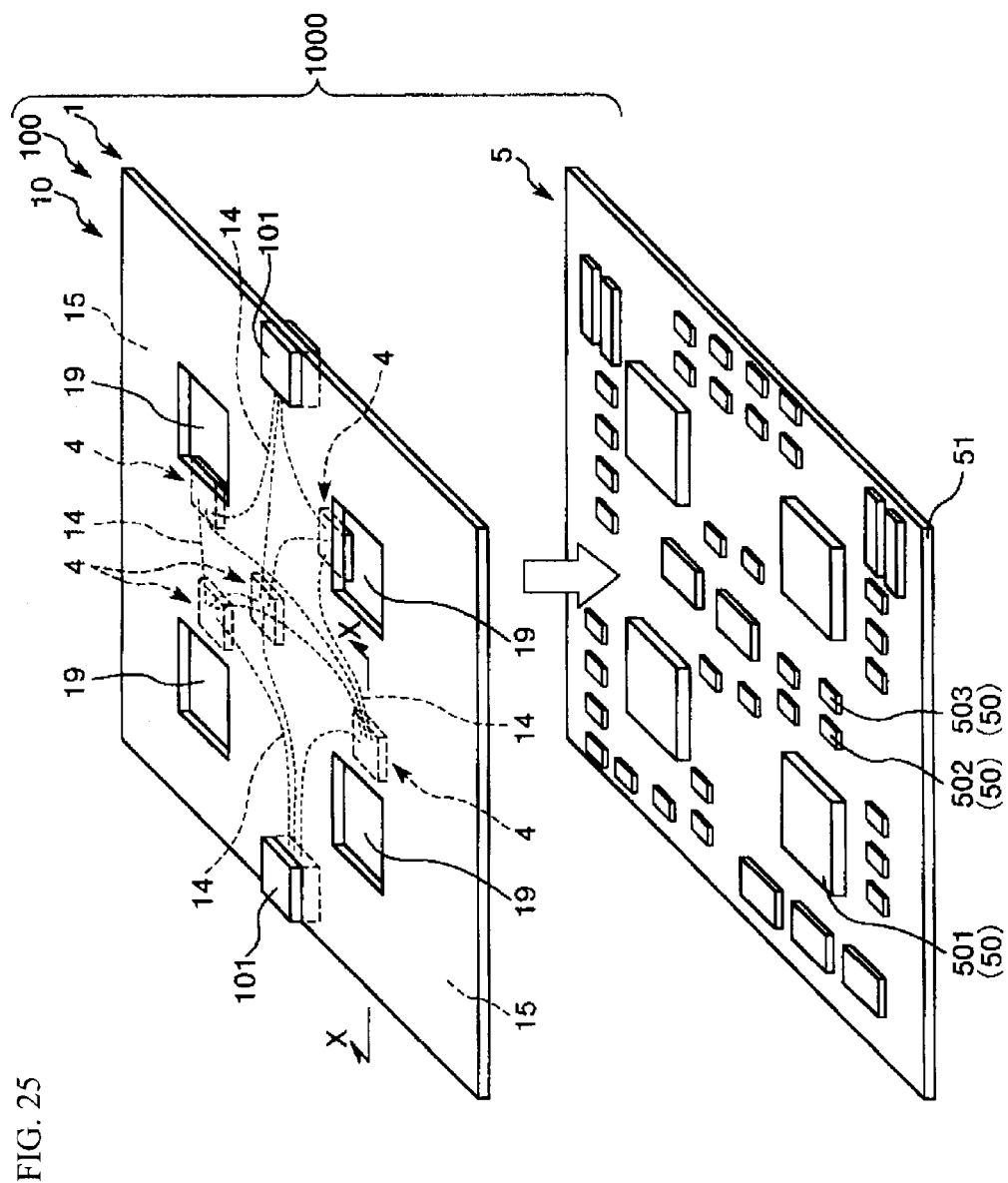
FIG. 25 is an exploded perspective view (shown partially cutaway and see-through) showing a tenth embodiment of the opto-electric hybrid board of the present invention.
Figure 26:
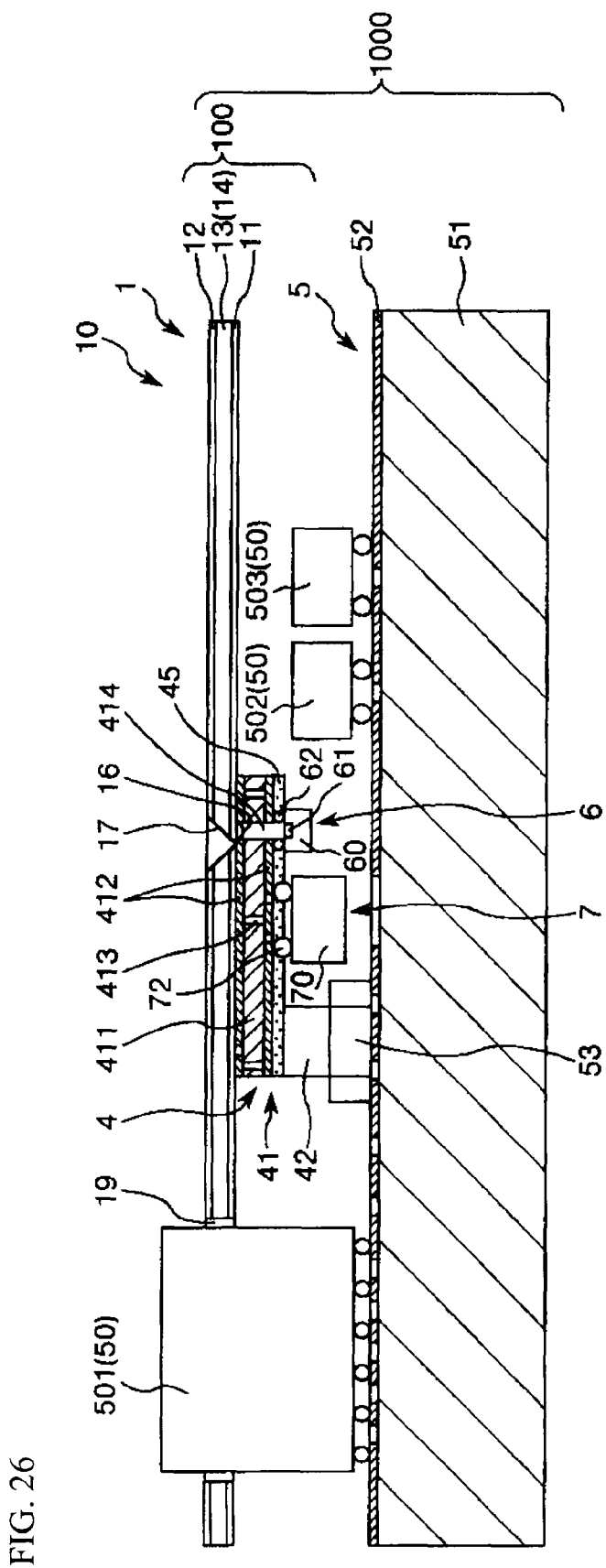
FIG. 26 is a line X-X cross-sectional view in the state in which the optical waveguide is superimposed as shown by the arrow in FIG. 25.

FIG. 25 is an exploded perspective view (shown partially cutaway and see-through) showing the tenth embodiment of the opto-electric hybrid board of the present invention. FIG. 26 is a line X-X cross-sectional view in the state in which the optical waveguide is superimposed as shown by the arrow in FIG. 25.

Hereinafter, although the tenth embodiment is explained, it is explained by placing emphasis on the points of difference with the first embodiment, and an explanation of the same matters is omitted. Also, in FIGS. 25 and 26, the same constitutional components as the first embodiment are labeled with the same reference numerals as those previously explained and a detailed explanation thereof is omitted.

The optical module 100 shown in FIG. 25 has the optical waveguide 1, the electrical connector 101 disposed on an end section thereof, and the opto-electric conversion section 4 disposed below the optical waveguide 1. Also, the opto-electric hybrid board 1000 shown in FIG. 25 has the optical module 100 and the motherboard (electrical wiring board) 5 disposed below the opto-electric conversion section 4.

Of these, the optical waveguide is a quadrangular sheet-like member in planar view. The optical waveguide 1, as shown in FIG. 26, has the cladding layer 11, the core layer 13, and the cladding layer 12 laminated in this order from below, and the core section 14 propagating the optical signal is formed with a desired pattern on the core layer 13. Also, in FIG. 25, the core sections 14 formed on the core layer 13 are shown by broken lines together with the opto-electric conversion section 4 hidden by the optical waveguide 1.

In the present embodiment, in addition to the same content and configuration as the first embodiment, a through-hole 19 is disposed in the waveguide 1 so as to penetrate therethrough.

On the other hand, since it becomes so that the electrical element for an electrical wiring board 50 is covered by the optical waveguide 1 when such through-hole does not exist, in the case of an electrical element for an electrical wiring board 50 having a large calorific value like the LSI 501, there is the possibility that heat dissipation decreases.

Thus, in the present embodiment, when the through-hole 19 is disposed in the optical waveguide 1 like mentioned above and the optical waveguide 1 is superimposed on the motherboard 5, it is configured such that the LSI 501 is inserted into the through-hole 19. Thereby, the LSI 501 is not covered by the optical waveguide 1 and heat dissipation is secured. Also, decrease in the operation characteristics of the LSI 501 by heat can be prevented.

Also, the core section 14 may be linear or curved in planar view. Furthermore, the core section 14 partway may branch or intersect. In particular, since it is possible to intersect optical signals in the same plane by core sections 14 partway intersecting like shown in FIG. 25, a core section 14 having a pattern of the shortest distance without three-dimensional intersection and diversion can be formed. As a result, decrease of transmission efficiency, pulse signal bluntness, and the like in the optical waveguide 1 can be minimized. Also, in this case, the refractive index distribution is preferably a distribution like shown in FIG. 4(b), FIG. 4(c), FIG. 5(b), or FIG. 6(b). Thereby, interference of optical signals in the intersecting section can be particularly suppressed.

Here, in the opto-electric hybrid board 1000 shown in FIG. 26, of the electrical elements for an electrical wiring board 50, whereas low profile components for which the height when mounted is relatively low such as the condenser 502 and the chip resistor 503 are gathered below the optical waveguide 1, the LSI 501, for which the height when mounted is relatively high, is inserted in the through-hole 19 disposed in the optical waveguide 1 as mentioned above and the upper part projects from the optical waveguide 1.

Thereby, heat dissipation of the LSI 501 is maintained. In addition, that inserted into the through-hole 19 is not limited to the LSI, and may be another electrical element for an electrical wiring board 50, and, for example, an electrolytic condenser, a transformer, a reactor, and the like can be mentioned.

Also, an electrical element for an electrical wiring board 50 may not be inserted into all of the through-holes 19 disposed in the optical waveguide 1. For example, in the case where, even if it is a low profile component, an electrical element for an electrical wiring board 50 have a large calorific value is mounted, it suffices that the through-hole 19 be disposed in the part of the optical waveguide 1 positioned above such.

Also, the shape of the through-hole 19, as long as it is a shape for which insertion of the LSI 501 is possible, is not particularly limited, and is preferably set such that the inner dimension of the through-hole 19 becomes about 0.1 to 20 mm larger than the outer dimension of the LSI 501 in planar view and more preferably set so as to become about 0.2 to 15 mm larger. Thereby, since the arrangement of the optical waveguide 1 with respect to the motherboard 5 is roughly uniquely determined by only inserting the LSI 501 into the through-hole 19, positioning of the electrical connector 42 on the opto-electric conversion 4, which is adhered to the optical waveguide 1, side and the electrical connector 53 on the motherboard 5 side can be easily carried out. Furthermore, if there is a dimension difference of this level, since sufficient ventilation between the upper surface side and the lower surface side of the optical waveguide 1 via the gap of the LSI 501 can be carried out, there is the advantage that it is easy to dissipate heat collected in the space on the lower surface side.

In addition, although the upper part of the LSI 501 may be set so as to become the same height as the upper surface of the optical waveguide 1, preferably it projects from the upper surface of the optical waveguide 1. Thereby, the air flow flowing on the upper surface side of the optical waveguide 1 hits the projecting part of the LSI 501 and flowing into the lower surface side of the optical waveguide 1 via the through-hole 19 becomes easier. As a result, ventilation of the space on the lower surface side particularly becomes promoted.

The projection amount of the LSI 501 is not particularly limited, and is preferably about 5 to 90%, and more preferably about 10 to 80% to the height of LSI 501.

Figure 27:
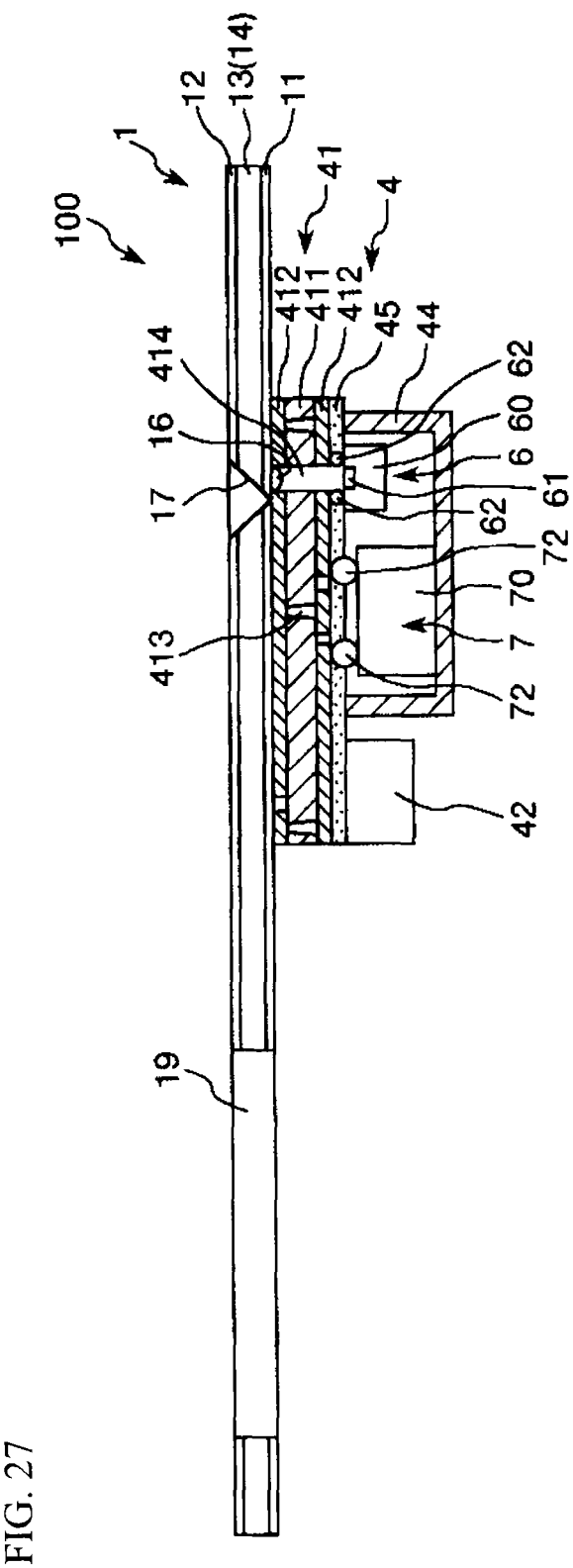
FIG. 27 is a cross-sectional view showing another constitutional example of the optical module according to the tenth embodiment.

FIG. 27 is a cross-sectional view showing another constitutional example of the optical module 100 according to the present embodiment.

The opto-electric conversion section 4 shown in FIG. 27 has the heat spreader 44 added to the opto-electric conversion section 4 shown in FIG. 25. The heat spreader 44 shown in FIG. 27 is a box shape covering the optical element 6 and the electrical element for an opto-electric conversion section 7 mounted below the insulating substrate 411 of the optical waveguide 4. Also, it is configured such that the bottom surface of the inside of the heat spreader 44 and the lower surface of the electrical element for an opto-electric conversion section 7 abut. Thereby, heat from the electrical element for an opto-electric conversion section 7 is effectively transmitted and dispersed in the heat spreader 44. As a result, heat dissipation of the electrical element for an opto-electric conversion section 7 is particularly promoted.

<<Eleventh Embodiment>>

Next, the optical module according to the eleventh embodiment of the opto-electric hybrid board of the present invention, and the optical interconnection component of the present invention and the optical waveguide of the present invention included therein are explained.

Figure 28:
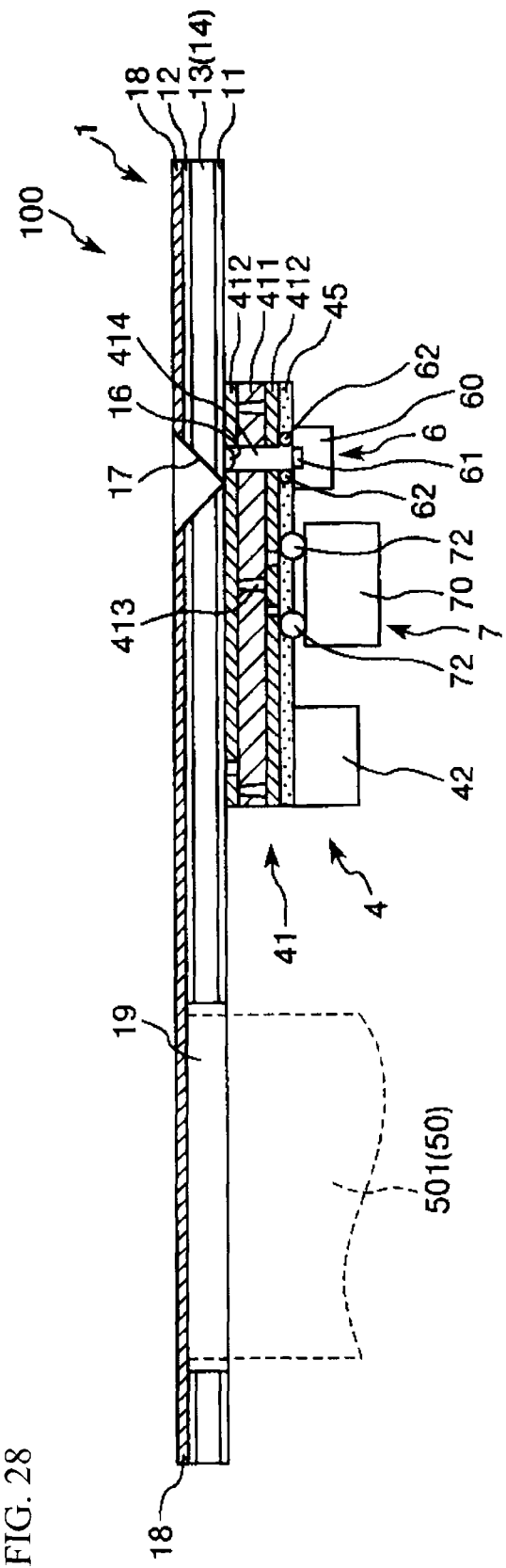
FIG. 28 is a cross-sectional view showing another constitutional example of the optical module according to the eleventh embodiment.

FIG. 28 is a cross-sectional view showing a part of the eleventh embodiment of the opto-electric hybrid board of the present invention.

Hereinafter, although the eleventh embodiment is explained, it is explained by placing emphasis on the points of difference with the tenth embodiment, and an explanation of the same matters is omitted. Also, in FIG. 28, the same constitutional components as the tenth embodiment are labeled with the same reference numerals as those previously explained and a detailed explanation thereof is omitted.

Other than the configuration of the optical waveguide 1 being different, the eleventh embodiment is the same as the tenth embodiment.

The optical module 100 shown in FIG. 28 has the metal layer 18 disposed on the cladding layer 12 of the optical waveguide 1. In other words, the optical waveguide of the present invention has the optical waveguide 1 and the metal layer 18. The metal layer 18 shown in FIG. 28 covers over the entire surface above the cladding layer 12 and is configured so as to cover the opening of the through-hole 19. On the other hand, the upper surface of the LSI 501 inserted into the through-hole 19 abuts the metal layer 18 blocking the opening of the through-hole 19.

In the optical module 100 shown in FIG. 28, heat from the LSI 501 is easily transferred to the metal layer 18 and dispersed. Thereby, heat dissipation of the LSI 501 is particularly promoted. In other words, the metal layer 18 functions as a heat spreader dissipating heat from the LSI 501.

The average thickness of the metal layer 18 is not particularly limited, and is preferably about 1 to 1,000 μm and more preferably about 3 to 800 μm. Thereby, while increasing heat dissipation, warping of the optical waveguide 1 by its own weight can be prevented.

As the constituent material of the metal layer 18, the constituent materials of the above-described heat spreader 44 can be used, and preferably has particularly any of elemental copper, a copper alloy, elemental aluminum, and an aluminum alloy as the main component. Since the thermal conductivity of these materials is particularly high, heat dissipation in the metal layer 18 can be particularly increased.

Also, a thermal conduction material like described above may be interposed between the LSI 501 and the metal layer 18 according to necessity.

In addition, the metal layer 18 may be configured so as to block only a part of the opening of the through-hole 19, for example, only the part in which the calorific value is particularly large of the upper surface of the LSI 501, and may be configured so as so to cover not the entirety, but only a part, of the cladding layer 12.

<<Twelfth Embodiment>>

Next, the optical module according to the twelfth embodiment of the opto-electric hybrid board of the present invention, and the optical interconnection component of the present invention and the optical waveguide of the present invention included therein are explained.

Figure 29:
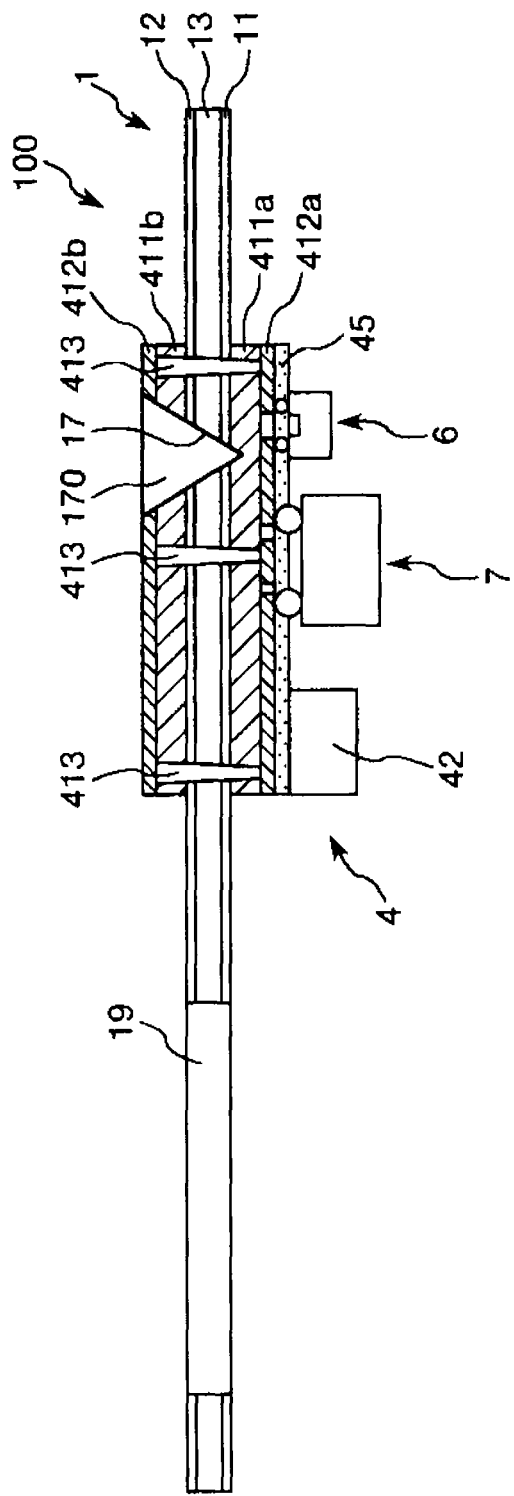
FIG. 29 is a cross-sectional view showing a part of a twelfth embodiment of the opto-electric hybrid board of the present invention.

FIG. 29 is a cross-sectional view showing a part of the twelfth embodiment of the opto-electric hybrid board of the present invention.

Hereinafter, although the twelfth embodiment is explained, it is explained by placing emphasis on the points of difference with the tenth embodiment, and an explanation of the same matters is omitted. Also, in FIG. 29, the same constitutional components as each of the above-mentioned embodiments are labeled with the same reference numerals as those previously explained and a detailed explanation thereof is omitted.

Other than the configuration of the opto-electric conversion section 4 being different, the twelfth embodiment is the same as the tenth embodiment.

The opto-electric conversion section shown in FIG. 29 has the insulating substrate 411a disposed on the lower surface of the cladding layer 11 of the optical waveguide 1, the insulating substrate 411b disposed on the upper surface of the cladding layer 12, the electrical wiring 412a disposed on the lower surface of the insulating substrate 411a, the electrical wiring 412b disposed on the upper surface of the insulating substrate 411b, the through wiring 413 connecting the electrical wiring 412a and the electrical wiring 412b, the sealing material 45, the electrical connector 42, the optical element 6, and the electrical element for an opto-electric conversion section 7. Also, the mirror 17 is configured in a part of the inner surface of the convex section 170 formed over the insulating substrate 411b, the optical waveguide 1, and the insulating substrate 411a from the electrical wiring 412b.

Figure 30:
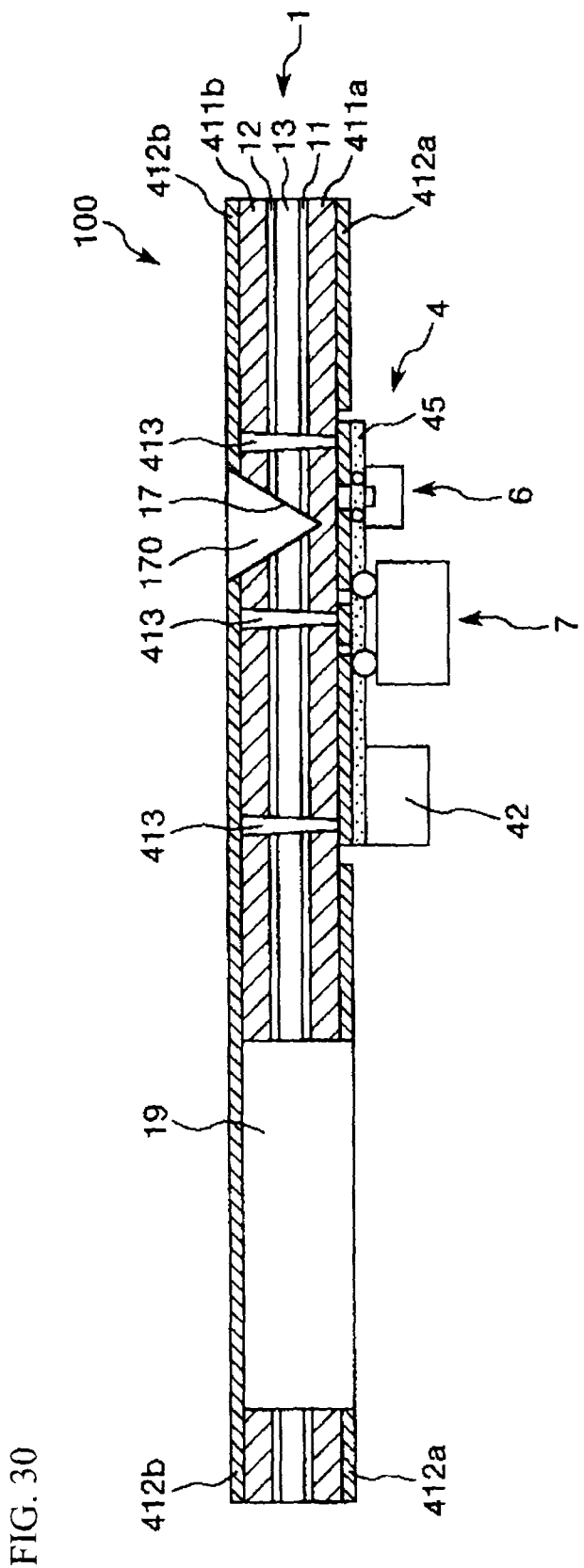
FIG. 30 is a cross-sectional view showing another constitutional example of the optical module according to the twelfth embodiment.

FIG. 30 is a cross-sectional view showing another constitutional example of the optical module 100 according to the present embodiment.

In the opto-electric conversion section 4 shown in FIG. 30, each of the insulating substrates 411a, 411b and the electrical wirings 412a, 412b of the opto-electric conversion section 4 shown in FIG. 29 extend along the entirety of the optical waveguide 1. Thereby, rigidity of the optical waveguide 1 over the entirety is strengthened and the optical waveguide 1 is protected from external forces, external light, and the external environment.

<<Thirteenth Embodiment>>

Next, the optical module according to the thirteenth embodiment of the opto-electric hybrid board of the present invention, and the optical interconnection component of the present invention and the optical waveguide of the present invention included therein are explained.

Figure 31:
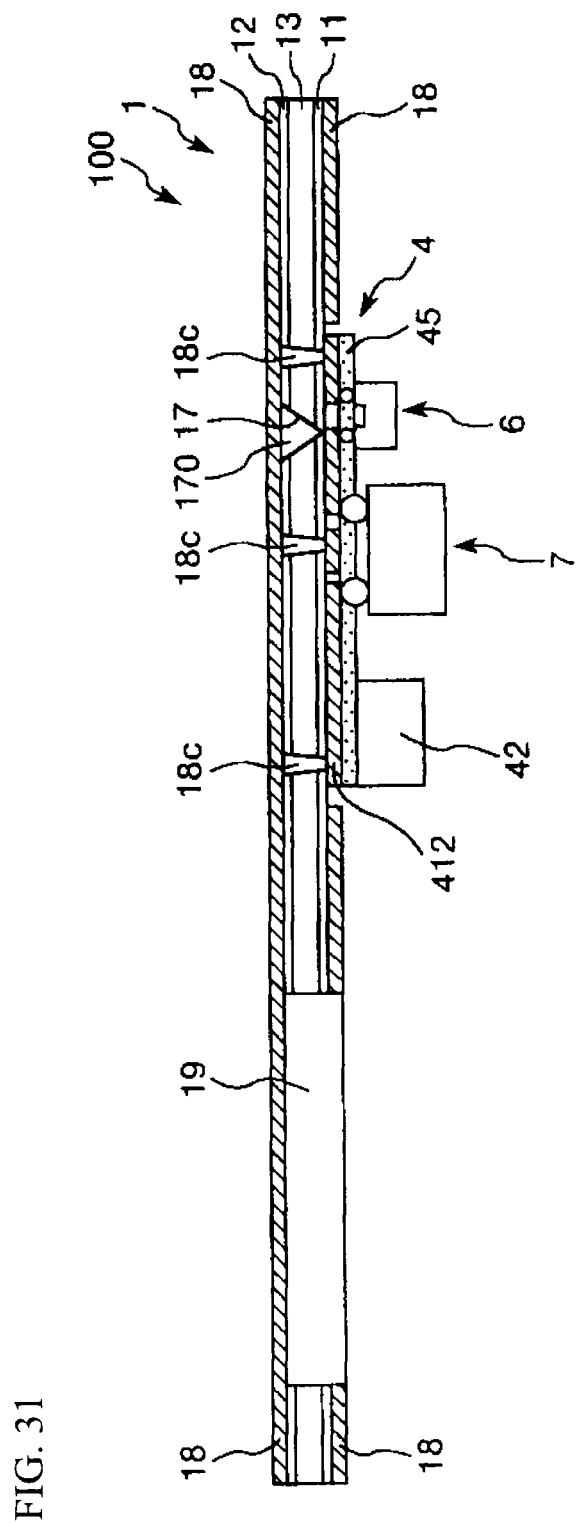
FIG. 31 is a cross-sectional view showing a part of a thirteenth embodiment of the opto-electric hybrid board of the present invention.

FIG. 31 is a cross-sectional view showing a part of the thirteenth embodiment of the opto-electric hybrid board of the present invention.

Hereinafter, although the thirteenth embodiment is explained, it is explained by placing emphasis on the points of difference with the eleventh embodiment, and an explanation of the same matters is omitted. In addition, in FIG. 31, the same constitutional components as each of the above-mentioned embodiments are labeled with the same reference numerals as those previously explained and a detailed explanation thereof is omitted.

Other than the insulating substrate 411 and the electrical wiring 412 disposed on the upper surface thereof of the opto-electric conversion section 4 being omitted, and, on the other hand, a through wiring 18c that penetrates the metal layer 18 positioned on the lower surface of the cladding layer 11 and that connects the metal layers 18 and the electrical wiring 412 being formed, it is the same as the eleventh embodiment (FIG. 28). In other words, the opto-electric conversion section 4 shown in FIG. 31 is configured such that the cladding layer 11 and the electrical wiring 412 are in contact. If it is such structure, the distance between the optical element 6 and the mirror 17 can be further shortened by amount of the omitted insulating substrate 411 and the like. As a result, optical coupling efficiency between the optical element 6 and the mirror 17 can be further increased.

<<Fourteenth Embodiment>>

Next the opto-electric hybrid board of the present invention, and the optical module of the present invention, the optical interconnection component of the present invention, and the optical waveguide of the present invention included therein are explained.

Figure 32:
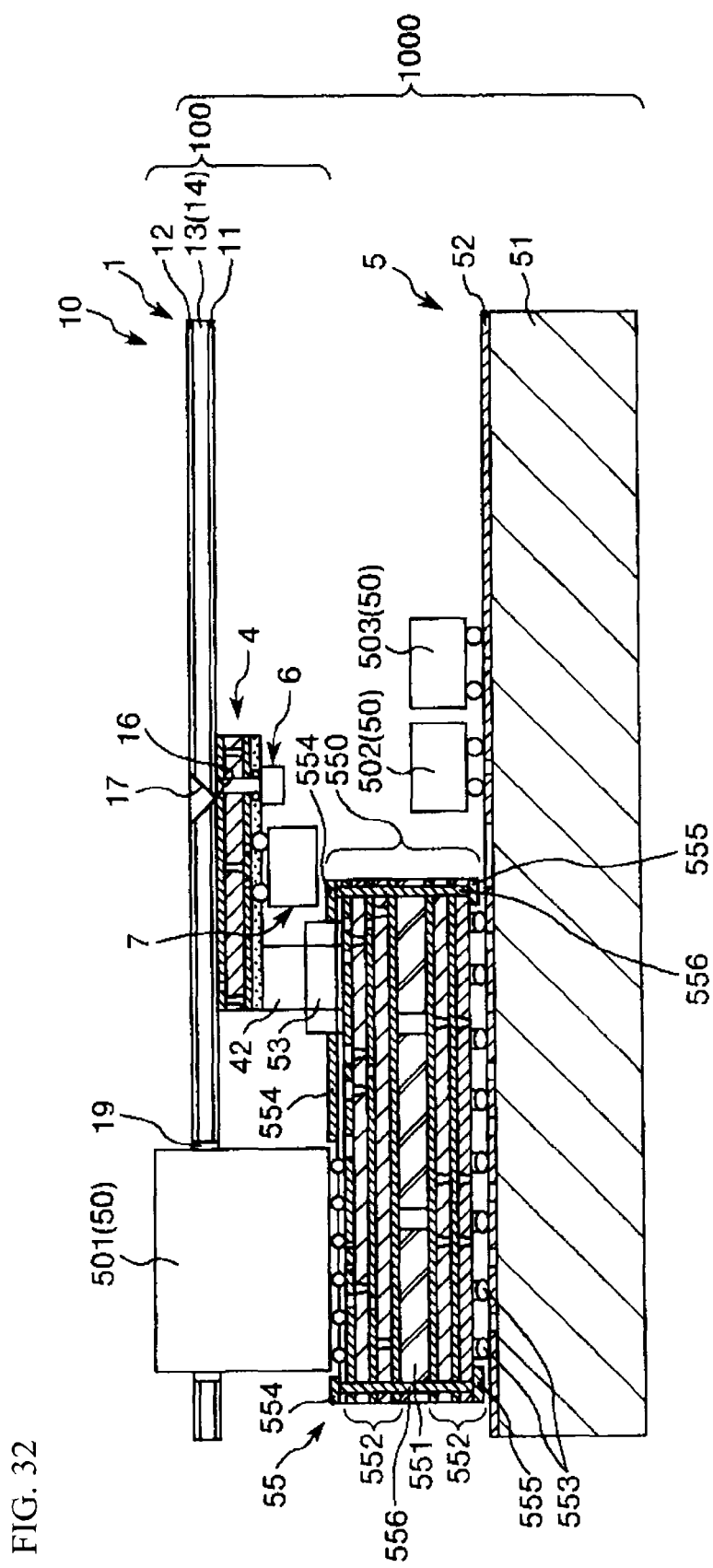
FIG. 32 is a cross-sectional view showing a part of a fourteenth embodiment of the opto-electric hybrid board of the present invention.

FIG. 32 is a cross-sectional view showing a part of the fourteenth embodiment of the opto-electric hybrid board of the present invention.

Hereinafter, although the fourteenth embodiment is explained, it is explained by placing emphasis on the points of difference with the third and tenth embodiments, and an explanation of the same matters is omitted. In addition, in FIG. 32, the same constitutional components as each of the above-mentioned embodiments are labeled with the same reference numerals as those previously explained and a detailed explanation thereof is omitted.

Other than the electrical interposer (electrical wiring board) 55 being interposed between the opto-electric conversion section 4 and the motherboard 5 as well as the LSI 501 being mounted on the electric interposer 55, the fourteenth embodiment is the same as the tenth embodiment. In addition, in the present embodiment, different to each of the above-mentioned embodiments, the electrical interposer 55 corresponds to the "electrical wiring board".

The electrical interposer 55 shown in FIG. 32 has a multilayer substrate 550 including a core substrate 551 and a build-up layer 552 stacked on both surfaces thereof, and the bump 553 disposed on the lower surface of the multilayer substrate 550. Also, the LSI 501 is mounted on the electrical interposer 55 as mentioned above, and the electrical wiring and the opto-electric conversion section 4 disposed on the surface of and inside the electrical interposer 55 are electrically connected via an electrical connector (second terminal) 53. By using such electrical interposer 55, high densification of the electrical wiring can be easily attained and the rate of signal transmission can be increased. As a result, increasing the speed and enlarging the capacity of information transmission between the LSI 501 and the opto-electric conversion section 4 can be attained, and thus full use can be made of the benefit of speed increase by optical communication. In other words, an opto-electric hybrid board 1000 making high-speed and large capacity information processing possible can be obtained.

<<Fifteenth Embodiment>>

Next the fifteenth embodiment of the opto-electric hybrid board of the present invention, and the optical module of the present invention, the optical interconnection component of the present invention, and the optical waveguide of the present invention included therein are explained.

FIG. 33(a) is a cross-sectional view showing a part of the fifteenth embodiment of the opto-electric hybrid board of the present invention and FIG. 33(b) is a top view of FIG. 33(a).

Hereinafter, although the fifteenth embodiment is explained, it is explained by placing emphasis on the points of difference with the fourth and tenth embodiments, and an explanation of the same matters is omitted. In addition, in FIG. 33, the same constitutional components as each of the above-mentioned embodiments are labeled with the same reference numerals as those previously explained and a detailed explanation thereof is omitted.

Other than the optical waveguide 1 having a shape comprising a sheet-like part 1a widening so as to cover a part of the motherboard 5 and a belt-like 1b part extending from the sheet-like part 1a, and the belt-like part 1b in a connection section 1d between the sheet-like part 1a and the belt-like part 1b being twisted 90°, the fifteenth embodiment is the same as the fourteenth embodiment.

Figure 33:
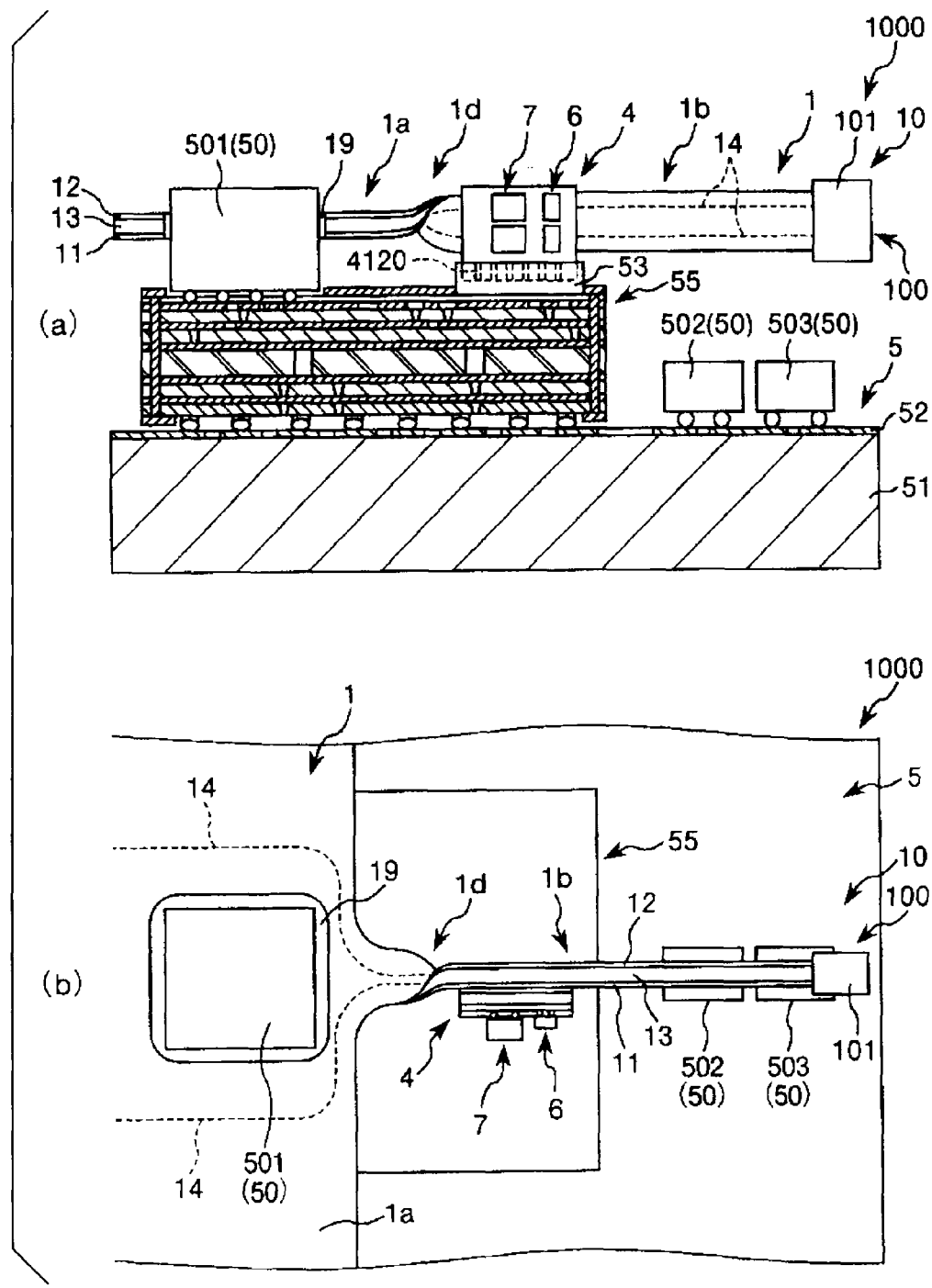
FIG. 33(a) is a cross-sectional view showing a part of the fifteenth embodiment of the opto-electric hybrid board of the present invention and FIG. 33(b) is a top view showing a part of the fifteenth embodiment of the opto-electric hybrid board of the present invention.

In other words, the optical waveguide 1 shown in FIG. 33, similarly to the fourteenth embodiment, has the sheet-like part 1a covering the motherboard 5 and the electrical interposer 55, and the through-hole 19 formed in this sheet-like part 1a. By the upper part of the LSI 501 being inserted in this through-hole 19, hindrance of the heat dissipation of the LSI 501 by the optical waveguide 1 can be prevented.

<Production Method of Opto-Electric Hybrid Board>

Next, the method for producing the opto-electric hybrid board of the present invention is explained.

Firstly, the optical waveguide is produced. The optical waveguide 1 is formed by the cladding 11, the core layer 13, and the cladding layer 12 being stacked in this order. Of these, in order to form the core section 14 and the side surface cladding section 15 in the core layer 13, for example, a nanoinprint method, a direct drawing method, a direct exposure self-forming method, or the like can be used. Also, in the direct drawing method, by locally irradiating radiation toward a film having refractive index modulation ability that can form a refractive index difference between an irradiated region and a non-irradiated region by irradiation of radiation such as light, and forming a refractive index difference, the core section 14 and the side surface cladding section 15 are formed.

In the principles of refractive index modulation, for example, monomer diffusion, photobridging, photoisomerization, and photodimerization can be mentioned. Of these, one or a combination of two or more can be used. Among these, as the principle of refractive index modulation, particularly monomer diffusion is preferably used. In monomer diffusion, light is partially irradiated on a layer formed, in a polymer, by a material in which a photopolymerizable monomer having a different refractive index to this polymer is dispersed and polymerization of the photopolymerizable polymer is caused, and, by the monomer being moved and unevenly distributing in association with this, a bias is generated in the refractive index in the layer, to thereby form the core section 14 and the side surface cladding section 15. In refractive index modulation by such principle, since the core section 14 of any shape can be simply formed by only selecting the region for irradiating light, the optical waveguide 1 can be manufactured very efficiently. Also, since the refractive index distribution formed by such principle, is formed corresponding to the concentration of the photopolymerizable monomer, the refractive index distribution in the transverse section of the formed core section 14 follows a smooth refractive index change. As a result, the manufactured optical waveguide 1 has a GI-type refractive index distribution, and has high transmission characteristics and can reliability suppress interference in the intersecting section.

As a material generating such monomer diffusion, for example, the photosensitive resin compositions and the like disclosed in Japanese Unexamined Patent Application, First Publication No. 2010-090328 can be mentioned.

On the other hand, in the case of refractive index modulation by principles such as photobridging, photoisomerization, and photodimerization, the amount of change of the refractive index can be adjusted according to the irradiated amount of the irradiated light (irradiated amount of radiation). In photobridging, by irradiation of light, the molecular structure in the material is cut and the eliminatable group is eliminated from the main chain. Thereby, the refractive index of the material changes and the core section 14 is formed. Also, in photoisomerization and photodimerization, photoisomerization or photodimerization of the material is generated by irradiation of light, and the refractive index of the material changes. Thereby, the core section 14 is formed.

As the material generating photobridging, for example, the core film materials and the like disclosed in Japanese Unexamined Patent Application, First Publication No. 2009-145867 can be mentioned.

Also, as the material generating photoisomerization, for example, the norbornene-based resins and the like disclosed in Japanese Unexamined Patent Application, First Publication No. 2005-164650 can be mentioned.

As the material generating photodimerization, for example, the photosensitive resin compositions and the like disclosed in Japanese Unexamined Patent Application, First Publication No. 2011-105791 can be mentioned.

In addition, by gradually changing the irradiated amount of irradiated light, the formed refractive index distribution also follows a smooth refractive index change. As the method for gradually changing the irradiated amount of the irradiated light, for example, a method using a multi-graduation mask such as a grey tone mask or a half tone mask, a method scanning a light beam having distribution in the light intensity, a method irradiating while changing the irradiation time for each region, and the like can be mentioned.

Also, a refractive index adjusting agent is dispersed in the polymer and when doing so, the refractive index difference is formed by continuously changing the concentration of the refractive index adjustment agent. As the method for supplying the refractive index adjusting agent in the polymer, for example, methods such as coating, spraying, adhesion, immersion, and the like can be mentioned. By such supply method, when the refractive index adjusting agent is supplied, an arbitrary refractive index distribution can be formed by adjusting the supplied amount for each region. In addition, as the refractive index adjusting agent, for example, those disclosed in Japanese Unexamined Patent Application, First Publication No. 2006-276735 can be mentioned.

Also, the mirror 17 is formed, as well as lens 16 is disposed, on the obtained optical waveguide 1. In formation of the mirror 17, dicing processing, machine processing such as molding die transfer, laser processing, electron beam processing, or the like can be used.

Next, the metal layer 18 is formed as a film on the lower surface of the cladding layer 11 and the lower surface of the cladding layer 12 according to necessity. The film formation method of the metal layer 18 is not particularly limited, and, for example, a physical vapor deposition method such as a vacuum deposition method, a chemical vapor deposition such as CVD, a plating method, a printing method, and the like can be mentioned.

Also, the metal layer 18 may be attached to the lower surface of the cladding layer 11 and the lower surface of the cladding layer 12. In this attachment, an adhesive, a pressure-sensitive adhesive, an adhesive sheet, or the like can be used. Also, the metal layer 18 may be formed by forming a film of a metal material on the lower surface of the cladding layer 11 and the lower surface of the cladding layer 12.

Also, the through-hole 19 is formed in the optical waveguide 1 according to necessity. In formation of the through-hole 19, for example, the various fabrication methods described above can be used.

Next, the optical connector 101 is attached to an end section of the optical waveguide 1. The optical interconnection components 10 can thereby be obtained.

Next, the opto-electric conversion section 4 is adhered to the lower surface of the optical waveguide 1. The optical module 100 can thereby be obtained.

On the other hand, the electrical element for an electrical wiring board 50 such as the LSI 501 is mounted on the insulating substrate and the motherboard 5 produced. Also, the optical waveguide 1 is superimposed so as to cover the motherboard 5, and the electrical connector 42 of the opto-electric conversion section 4 and the electrical connector 53 of the motherboard 5 are connected.

Also, if the through-hole 19 is formed in the optical waveguide 1, the LSI 501 is inserted in the through-hole 19 disposed in the optical waveguide 1.

The opto-electric hybrid board 1000 can thereby be obtained as above.

<Electronic Device>

Since the opto-electric hybrid board 1000 of the present invention like described above minimizes the length and highly densifies the core section 14 of the optical waveguide 1, improvement in internal optical coupling efficiency, transmission efficiency of optical signals is high. Accordingly, by including the opto-electric hybrid board of the present invention, an electronic device that has high reliability and that can carry out high-quality communication (electronic device of the present invention) can be obtained.

As, as described above, since minimization of the length and high densification of the core section 14 of the optical waveguide 1 are attained, transmission efficiency is high and heat dissipation of the LSI 501 is high, and thus has high reliability. Accordingly, by including the optical waveguide of the present invention, an electronic device having high reliability and that can carry out high-quality communication (electronic device of the present invention) can be obtained.

As the electronic device including the optical waveguide of the present invention incorporated therein, for example, electronic devices such as mobile phones, game machines, router devices, WDM devices, computers, televisions, home servers and the like can be mentioned. In all of these electronic devices, rapid transfer of a large volume of data between, for example, a processor such as LSI and a memory device such as RAM is required. Accordingly, such electronic device, by having the opto-electric hybrid board of the present invention incorporated therein, can be expected to solve any nonconformities specific to electrical wiring, such as noise and signal degradation, and to dramatically improve the performance thereof.

Furthermore, heat generation is largely reduced in the optical waveguide portion compared to the electrical wiring. For this reason, power necessary for cooling can be saved, and thus total power consumption of the electronic device can be saved.

Also, since the opto-electric hybrid board and the optical waveguide of the present invention are mountable on the motherboard 5 via a connector or the like, detachment from the motherboard 5 can be carried out easily according to necessity. For this reason, separately extracting, and replacing or repairing the optical waveguide 1 and the motherboard 5 can be carried out.

Although the optical waveguide, the optical interconnection component, the optical module, the opto-electric hybrid board, and the electronic device of the present invention were explained above based on the embodiments shown in the drawings, the present invention is not limited thereto.

For example, the optical waveguide 1 may be superimposed so to not cover the whole surface, but only a part, of the motherboard 5. Furthermore, the optical waveguide 1 may be superimposed so as to stick out from the end section of the motherboard 5.

Also, the opto-electric conversion substrate 41 that the opto-electric conversion section 4 includes may be a multilayer substrate including a build-up layer.

Also, the through-hole 19 may not only be a closed hole, but may be a partially open hole, in planer view.

EXAMPLES

Next, examples of the present invention are explained. However, the present invention is not limited to only these examples. Changes, additions, omissions, and the like of position, number, amount, type, and the like may be made to the extent that there are no particular problems.

1. Production of the Optical Waveguide Having the Refractive Index Distribution Shown in FIG. 5

Figure 5:
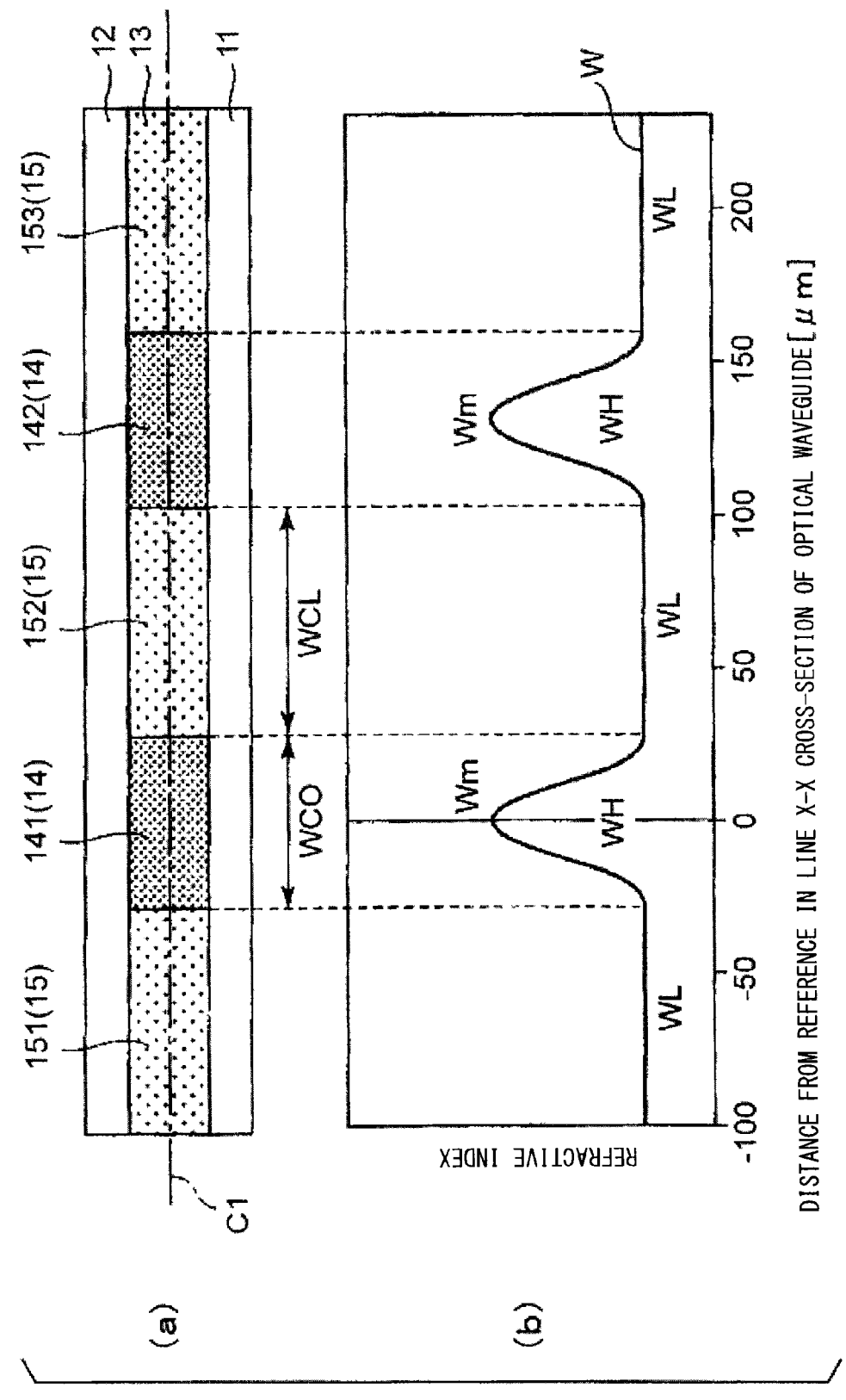
FIG. 5(a) is an example of a transverse sectional view cut so as to transect the core section of the optical waveguide shown in FIG. 3
FIG. 5(b) is a drawing schematically showing an example of the refractive index distribution W on a center line C1 passing the center of the thickness direction of the core layer of the transverse sectional view shown in FIG. 5(a).

Firstly, waveguides having a linear core section having the refractive index distribution shown in FIG. 5 were manufactured by changing the respective conditions (Examples 1 to 18). Also, the optical waveguides of Comparative Example 1 and Reference Examples 1 to 4 were manufactured for comparison. Furthermore, evaluation of these optical waveguides was carried out in 3. shown below.

Example 1

(1) Production of Resin Composition for Forming Cladding Layer 20 g of the alicyclic epoxy resin CELLOXIDE 2081 manufactured by Daicel Chemical Industries, Ltd., 0.6 g of the cationic polymerization initiator ADEKA OPTOMER SP-170 manufactured by Adeka Corporation, and 80 g of methyl isobutyl ketone were mixed by stirring, to thereby prepare a solution.

Next, the obtained solution was filtered with a PTFE filter having a pore size of 0.2 µm, to thereby obtain a pure colorless and transparent resin composition E1 for forming a cladding layer.

(2) Production of Photosensitive Resin Composition 20 g of the phenoxy resin YP-50S manufactured by Nippon Steel Chemical Co., Ltd. as an epoxy-based resin, 5 g of CELLOXIDE 2021P manufacture by Daicel Chemical Industries, Ltd. as a monomer, and 0.2 g of ADEKA OPTOMER SP-170 manufactured by Adeka Corporation as a polymerization initiator were charged into 80 g of methyl isobutyl ketone, and dissolved by stirring, to thereby prepare a solution.

Next, the obtained solution was filtered with a PTFE filter having a pore size of 0.2 µm pore, to thereby obtain a pure colorless and transparent photosensitive resin composition F1.

(3) Production of Lower Side Cladding Layer

The resin composition E1 for forming a cladding layer was uniformly applied by a doctor blade onto a polyimide film having a thickness of 25 µm. Thereafter, this polyimide film was put into a 50° C. dryer for 10 minutes. After completely removing the solvent, ultraviolet light was irradiated onto the entire surface by a UV exposure machine, to thereby cure the applied resin composition E1. Thereby, a colorless and transparent lower side cladding layer having a thickness of 10 µm was obtained. The ultraviolet accumulated amount of light was 500 mJ/cm².

(4) Production of Core Layer

The photosensitive resin composition F1 was uniformly applied by a doctor blade onto the produced lower side cladding layer. Thereafter, this lower side cladding layer was put into a 40° C. dryer for 5 minutes. After forming a film by completely removing the solution, a photomask having a linear line and space pattern drawn on the entire surface was compression-bonded onto the top of the obtained film. Then, ultraviolet light was irradiated by a parallel exposure machine from above the photomask. In addition, the ultraviolet accumulated amount of light was 1,000 mJ/cm$^2$.

Next, the photomask was removed and the film was put into an oven at 150° C. for 30 minutes. When removed from the oven, it was confirmed that a clear waveguide pattern appears on the film. The average width WCO of a core section and the average width WCL of a side surface cladding section are shown in Table 1. Also, the thickness of the obtained core layer was 50 m and the number of core sections was eight.

(5) Production of Upper Side Cladding Layer

The resin composition E1 for forming a cladding layer was, similar to (3), applied onto the produced core layer, to thereby obtain a colorless and transparent upper cladding layer having a thickness of 10 µm. An optical waveguide was obtained thereby.

(6) Evaluation of Refractive Index Distribution

Then, the refractive index distribution W in the width direction was obtained by an interference microscope for the transverse section of the core layer of the obtained optical waveguide. As a result, the refractive index refraction W had a plurality of low refractive index regions and high refractive index regions, and the refractive index continuously changed.

Examples 2 to 8

Other than setting the constitution of the polymer, the constitution and percentage of the monomer, and the ultraviolet accumulated amount of light as shown in Table 1, as well as setting the photomask pattern such that the average width WCO of a core section and the average width WCL of a side surface cladding section become the values shown in Table 1, the optical waveguides of Examples 2 to 8 were obtained in the same manner as Example 1.

Example 9

(1) Synthesis of the (Meth)Acrylic-Based Polymer 20.0 g of methyl methacrylate (MMA), 30.0 g of benzyl methacrylate (BzMA), and 450 g of methyl isobutyl ketone were charged into a separable flask. After these were mixed by stirring, the inside of the separable flask was replaced with nitrogen gas, to thereby prepare a monomer solution.

On the other hand, after 0.25 of azobisisobutyronitrile as a polymerization initiator was dissolved in 10 g of methyl isobutyl ketone, the atmosphere was replaced with nitrogen, to thereby prepare an initiator solution.

Then, while stirring the monomer solution in the state of being heated to 80° C., the initiator solution was added to the monomer solution using a syringe. The resulting solution, after stirring at 80° C. for 1 hour as is, was cooled, to thereby prepare a polymer solution. Thereafter, 5 L of isopropanol was prepared in a beaker, and while stirring the isopropanol below normal temperature with a stirrer, the polymer solution was added dropwise to the beaker. Stirring was continued for 30 minutes after completion of the dropwise addition, and the polymer that precipitated thereafter was extracted and dried under reduced pressure at 60° C. for 8 hours with a vacuum dryer. Thereby, an acrylic-based polymer A1 was obtained.

(2) Production of Resin Composition for Forming Cladding Layer 20 g of the aqueous acrylate resin solution RD-180 produced by Goo Chemical Co., Ltd., 20 g of isopropanol, and 0.4 g of CARBODILITE V-02-L2 produced by Nisshinbo Chemical Inc. as a polymerization initiator were mixed by stirring, to thereby prepare a solution.

Next, the obtained solution was filtered with a PTFE filter having a pore size of 0.2 µm, to thereby obtain a pure colorless and transparent resin composition B1 for forming a cladding layer.

(3) Production of the Photosensitive Resin Composition 20 g of the synthesized acrylic-based polymer A1, 5 g of cyclohexyl methacrylate as a monomer, and 0.2 g of IRGACURE 651 manufactured by BASF Japan Ltd. as a polymerization initiator were charged into 80 g of methyl isobutyl ketone, and dissolved by stirring, to thereby prepare a solution.

Next, the obtained solution was filtered with a PTFE filter having a pore size of 0.2 µm, to thereby obtain a pure colorless and transparent photosensitive resin composition C1.

(4) Production of Lower Side Cladding Layer

The resin composition B1 for forming a cladding layer was uniformly applied by a doctor blade onto a polyimide film having a thickness of 25 µm. Thereafter, this polyimide film was put into an 80° C. dryer for 10 minutes. After completely removing the solvent, the polyimide film was further being put into a 150° C. oven for 10 minutes and thus cured, to thereby obtain a colorless and transparent lower side cladding layer having a thickness of 10 µm.

(5) Production of Core Layer

The photosensitive resin composition C1 was uniformly applied by a doctor blade onto the produced lower side cladding layer. Thereafter, this lower side cladding layer was put into a 40° C. dryer for 5 minutes. After the solvent was completely removed to form a film, a photomask having a linear line and space pattern drawn on the entire surface was compression-bonded onto the top of the obtained film. Then, ultraviolet was irradiated by a parallel exposure machine from above the photomask. In addition, the ultraviolet accumulated amount of light was 800 mJ/cm$^2$.

Next, the photomask was removed and the film was put into an oven at 150° C. for 30 minutes. When removed from the oven, it was confirmed that a clear waveguide pattern having a rectangular cross-section appears on the film. The average width WCO of a core section and the average width WCL of a side surface cladding section are shown in Table 2. Also, the thickness of the obtained core layer was 50 µm and the number of core sections was eight.

(6) Production of Upper Side Cladding Layer

The resin composition B1 for forming a cladding layer was, similar to (4), applied onto the produced core layer, to thereby obtain a colorless and transparent upper cladding layer having a thickness of 10 µm. An optical waveguide was obtained thereby.

(7) Evaluation of Refractive Index Distribution

Then, the refractive index distribution W in the width direction was obtained by an interference microscope for the transverse section of the core layer of the obtained optical waveguide. As a result, the refractive index refraction W had a plurality of low refractive index regions and high refractive index regions, and the refractive index continuously changed.

Examples 10 to 12

Other than setting the constitution and percentage of the monomer, and the ultraviolet accumulated amount of light as shown in Table 2, as well as setting the photomask pattern such that the average width WCO of a core section and the average width WCL of a side surface cladding section become the values shown in Table 2, the optical waveguides of Examples 10 to 12 were obtained in the same way as Example 9.

Example 13

(1) Synthesis of Polyolefin-Based Resin Having Eliminatable Group

In a glove box that has both of moisture and oxygen concentration controlled to 1 ppm or lower, and that is filled with dry nitrogen, 7.2 g (40.1 mmol) of hexylnorbornene (HxNB), and 12.9 g (40.1 mmol) of diphenylmethyl norbornene methoxysilane were weighed in a 500 mL vial, and 60 g of dehydrated toluene and 11 g of ethyl acetate were added. This glove box was covered with a silicone sealer, to thereby tightly seal the upper section.

Next, 1.56 g (3.2 mmol) of a Ni catalyst and 10 mL of dehydrated toluene were weighed in a 100 mL vial. A stirrer chip was inserted therein and the vial sealed tightly, and the catalyst was completely dissolved by thorough stirring.

1 mL of this solution of the Ni catalyst was accurately measured using a syringe and quantitatively injected into the vial containing the above-mentioned two norbornenes, and stirred at room temperature for one hour. As a result, a distinct increase in the viscosity was confirmed. The seal was removed at this point of time, and 60 g of tetrahydrofuran (THF) was added and stirred, to thereby obtain a reaction solution.

In a 100 mL beaker, 9.5 g of acetic anhydride, 18 g (30% concentration) of aqueous hydrogen peroxide, and 30 g of deionized water were added and stirred, to thereby prepare an aqueous peracetic acid in situ. Next, the total amount of the aqueous solution was added to the above-described reaction solution, and stirred for 12 hours, to thereby carry out a Ni reduction treatment.

Next, the reaction solution after the treatment was transferred into a separating funnel, and the lower aqueous layer was discarded. 100 mL of a 30% aqueous solution of isopropanol was added, and vigorously shaken. After allowing this to stand still so as to completely separate into two layers, the aqueous layer was discarded. This water washing process was repeated a total of three times. Thereafter, the oil layer was added dropwise into a large excess of acetone so as to re-precipitate the produced polymer, and the polymer was separated by filtration from the filtrate and then dried under heating in a vacuum dryer set to 60° C. for 12 hours, to thereby obtain Polymer #1. The molecular weight distribution of Polymer #1 measured by GPC was Mw=100,000 and Mn=40,000. Also, by NMR identification, the molar ratio of each structural unit in Polymer #1 was 50 mol % of hexylnorbornene structural unit, and 50 mol % of diphenylmethyl norbornene methoxysilane structural unit.

(2) Production of Composition for Forming Core Layer 10 g of purified polymer #1 above was weighed in a 100 mL glass container, to which 40 g of mesitylene, 0.01 g of the antioxidant Irganox 1076 (manufactured by Ciba Geigy), 2 g of a cyclohexyloxetane monomer (CHOX manufactured TOAGOSEI Co. Ltd., CAS #483303-25-9, molecular weight of 186, boiling point of 125° C./1.33 kPa), and the polymerization initiator (photoacid generator) Rhodorsil Photoinitiator 2074 (manufactured by Rhodia, CAS #178233-72-2) (0.0125 g, in 0.1 mL of ethyl acetate) were added and dissolved. Thereafter, this was filtered with a PTFE filter having a pore size of 0.2 μm, to thereby obtain a clean composition for forming a core layer. In addition, this composition differs with the photosensitive resin composition described in each example on the point that a monomer is not included in this composition. On the other hand, Polymer #1 has the function of eliminating an eliminatable group by irradiation of active radiation and the so-called photobleaching phenomenon occurs. Also, the above-mentioned polymerization initiator is written as PI 2074 in Table 1.

(3) Production of Composition for Forming Cladding Layer

Other than using a polymer in which the molar ratio of each structural unit of the purified above-mentioned polymer #1 was changed to 80 mol % of hexylnorbornene structural unit and 20 mol % of diphenylmethyl norbornene methoxysilane structural unit instead of the above-mentioned Polymer #1, a composition for forming a cladding layer was obtained in the same way as the composition for forming a core layer.

(4) Production of Lower Side Cladding Layer

The composition for forming a cladding layer was uniformly applied by a doctor blade onto a polyimide film having a thickness of 25 μm. Thereafter, this polyimide film was put into a 50° C. dryer for 10 minutes. After completely removing the solvent, ultraviolet light was irradiated onto the entire surface by a UV exposure machine, to thereby cure the applied composition. Thereby, a colorless and transparent lower side cladding layer having a thickness of 10 μm was obtained. In addition, the ultraviolet accumulated amount of light was 500 mJ/cm$^2$.

(5) Production of Core Layer

The core layer resin composition was uniformly applied by a doctor blade onto the produced lower side cladding layer. Thereafter, this lower side cladding layer was put into a 40° C. dryer for 5 minutes. After the solvent was completely removed to form a film, a photomask having a linear line and space pattern drawn on the entire surface was compression-bonded onto the top of the obtained film. Then, ultraviolet was irradiated by a parallel exposure machine from above the photomask. In addition, the ultraviolet accumulated amount of light was 1,300 mJ/cm$^2$.

Next, the photomask was removed and the film was placed in an oven at 150° for 30 minutes. Upon removal from the oven, it was confirmed that a clear waveguide pattern having a rectangular cross-section appears on the film. The thickness of the obtained core layer was 50 μm. Also, the number of core sections was eight.

(6) Production of Upper Side Cladding Layer

The resin composition E1 for forming a cladding layer was, similar to (3), applied onto the produced core layer, to thereby obtain a colorless and transparent upper side cladding layer having a thickness of 10 μm. An optical waveguide was obtained thereby.

(7) Evaluation of Refractive Index Distribution

Then, the refractive index distribution W in the width direction was obtained by an interference microscope for the transverse section of the core layer of the obtained optical waveguide. As a result, the refractive index refraction W had a plurality of low refractive index regions and high refractive index regions, and the refractive index continuously changed.

Examples 14 and 15

Other than setting the constitution and percentage of the monomer, and the ultraviolet accumulated amount of light as shown in Table 3, as well as setting the photomask pattern such that the average width WCO of a core section and the average width WCL of a side surface cladding section become the values shown in Table 3, the optical waveguides were obtained in the same way as Example 13.

Example 16

(1) Production of Optical Waveguide

Using the composition for forming an optical waveguide used in Example 13, multicolored extrusion molding (co-extrusion molding) was carried out on a polyether sulfone (PES) film with a die coater. Thereby, a three-layer extruded multicolored molding having the composition for forming a core layer as the intermediate layer, and the composition for forming a cladding layer as the lower layer and the upper layer was obtained. This molding was put into a 55° C. dryer for 10 minutes, to thereby completely remove the solvent. Thereafter, a photomask was compression-bonded and ultraviolet was selectively irradiated at 1,300 mJ/cm$^2$. The mask was removed, and the molding was heated in a dryer at 150° C. for 1.5 hours. After the heating, it was confirmed that a clear waveguide pattern appeared, and that the core section and the side surface cladding sections were formed. Thereafter, a length of 10 cm was cut from the obtained optical waveguide. In addition, the formed optical waveguide had eight core sections formed in parallel. Also, the entire thickness of the optical waveguide was 100 μm.

(2) Evaluation of Refractive Index Distribution

Then, the refractive index distribution W in the width direction was obtained by an interference microscope for the transverse section of the core layer of the obtained optical waveguide. As a result, the refractive index refraction W had a plurality of low refractive index regions and high refractive index regions, and the refractive index continuously changed.

On the other hand, for the transverse cross-section of the optical waveguide, the refractive index distribution T in the thickness direction was obtained by an interference microscope along a center line passing through, in the vertical direction, the width of the core section thereof. As a result, the refractive index distribution T had, in the central section thereof, a region in which the refractive index changed continuously, and in both sides thereof, regions that have a refractive index lower than the above-mentioned region and that was almost a constant value. In other words, the refractive index distribution T in the thickness direction of the obtained optical waveguide had become the so-called graded index type.

Examples 17 and 18

Other than setting the constitution and percentage of the monomer, and the ultraviolet accumulated amount of light as shown in Table 3, as well as setting the photomask pattern so that the average width WCO of a core section and the average width WCL of a side surface cladding section become the values shown in Table 3, the optical waveguides of Examples 17 and 18 were obtained in the same way as Example 16.

Comparative Example 1

Regarding the composition for forming a core and the composition for forming a cladding, other than not adding CHOX and making the added amount of PI 2074 0.01 g, the optical waveguide of Comparative Example 1 was obtained in the same way as Example 13.

Also, in the obtained optical waveguide, the refractive index of the core section was constant, the refractive index of the side surface cladding section was also constant, and the refractive index between the core section and the cladding section was discontinuous. In other words, the refractive index distribution of the core layer of the obtained optical waveguide had become a so-called step index-(SI) type distribution.

Reference Examples 1 and 2

Other than changing the pattern of the photomask such that the core section average width WCO and the side surface cladding section WCL became the values in Table 1, the optical waveguides of Reference Examples 1 and 2 were obtained in the same way as Examples 1 and 2 respectively.

Reference Examples 3 and 4

Other than changing the pattern of the photomask such that the core section average width WCO and the side surface cladding section WCL became the values in Table 2, the optical waveguides of Reference Examples 3 and 4 were obtained in the same way as Examples 9 and 10 respectively.

The production conditions of each example, example comparative example, and each reference example above are shown in Tables 1, 2, and 3.

TABLE 1

(epoxy-based polymer)

| | Composition for Forming Core Layer | | | | | | | Dimensions of Core Layer | | |
| --- | --- | --- | --- | --- | --- | --- | --- | --- | --- | --- |
| | Epoxy-Based Polymer | | | | | Refractive Index | | Core Section | Cladding Section | |
| | | Softening | | | Polym- | | Distribution | | Average | Average | |
| | Con-stitution | Point (° C.) | Shore D Hardness | Monomer (phr) | erization Initiator (phr) | Amount of Exposure (mJ/cm$^2$) | Width Direction | Thickness Direction | Width WCO (μm) | Width WCL (μm) | WCO/WCL |
| Example 1 | YP-50S | 100 | 55 | CELLOXIDE 202IP (25) | SP-170 (I) | 1000 | GI type | SI type | 45 | 20 | 2.25 |
| Example 2 | ↑ | ↑ | ↑ | ↑ | ↑ | ↑ | ↑ | ↑ | 35 | 200 | 0.18 |
| Example 3 | ↑ | ↑ | ↑ | ↑ | ↑ | ↑ | ↑ | ↑ | 50 | 75 | 0.67 |
| Example 4 | ↑ | ↑ | ↑ | CELLOXIDE 202IP (35) | ↑ | ↑ | ↑ | ↑ | 40 | 25 | 1.60 |

TABLE 1-continued (epoxy-based polymer)

| | Composition for Forming Core Layer | | | | | Refractive Index | | Dimensions of Core Layer | | |
|---|---|---|---|---|---|---|---|---|---|---|
| | Epoxy-Based Polymer | | | Polym- | | | | Core Section | Cladding Section | |
| | | Softening | | erization | Amount of | Distribution | | Average | Average | |
| | Con-stitution | Point (° C.) | Shore D Hardness | Monomer (phr) | Initiator (phr) | Exposure (mJ/cm$^2$) | Width Direction | Thickness Direction | Width WCO (μm) | Width WCL (μm) | WCO/ WCL |
| Example 5 | OGSOL EG | 115 | 70 | CELLOXIDE 2021P (25) | ↑ | 500 | ↑ | ↑ | 45 | 20 | 2.25 |
| Example 6 | ↑ | ↑ | ↑ | ↑ | ↑ | ↑ | ↑ | ↑ | 35 | 200 | 0.18 |
| Example 7 | ↑ | ↑ | ↑ | ↑ | ↑ | ↑ | ↑ | ↑ | 50 | 75 | 0.67 |
| Example 8 | ↑ | ↑ | ↑ | CELLOXIDE 2021P (35) | ↑ | ↑ | ↑ | ↑ | 35 | 30 | 1.17 |
| Reference Example 1 | YP-50S | 100 | 55 | CELLOXIDE 2021P (25) | SP-170 (I) | 1000 | GI type | ↑ | 20 | 300 | 0.07 |
| Reference Example 2 | ↑ | ↑ | ↑ | ↑ | ↑ | ↑ | ↑ | ↑ | 50 | 4 | 12.50 |

Note:
"↑" in the table means it is the same as the description directly above.

TABLE 2

(acrylic-based polymer)

| | Composition for Forming Core Layer | | | | | Refractive Index | | Dimensions of Core Layer | | |
|---|---|---|---|---|---|---|---|---|---|---|
| | Acrylic-Based Polymer | | | | | | | Core Section | Cladding Section | |
| | | Softening | | Polymerization | Amount of | Distribution | | Average | Average | |
| | Con-stitution | Point (° C.) | Shore D Hardness | Monomer (phr) | Initiator (phr) | Exposure (mJ/cm$^2$) | Width Direction | Thickness Direction | Width WCO (μm) | Width WCL (μm) | WCO/ WCL |
| Example 9 | MMA + BzMA | 95 | 60 | Cyclohexyl methacrylate (25) | IRGACURE 651 (1) | 800 | GI type | SI type | 50 | 15 | 3.33 |
| Example 10 | ↑ | ↑ | ↑ | ↑ | ↑ | ↑ | ↑ | ↑ | 40 | 85 | 0.47 |
| Example 11 | ↑ | ↑ | ↑ | ↑ | ↑ | ↑ | ↑ | ↑ | 45 | 205 | 0.22 |
| Example 12 | ↑ | ↑ | ↑ | Cyclohexyl methacrylate (40) | ↑ | 1000 | ↑ | ↑ | 40 | 25 | 1.60 |
| Reference Example 3 | MMA + BzMA | 95 | 60 | Cyclohexyl methacrylate (25) | IRGACURE 651 (1) | 800 | ↑ | ↑ | 20 | 300 | 0.07 |
| Reference Example 4 | ↑ | ↑ | ↑ | ↑ | ↑ | ↑ | ↑ | ↑ | 80 | 4 | 20.00 |

Note:
"↑" in the table means it is the same as the disclosure directly above.

TABLE 3

(polyolefin-based polymer)

| | Composition for Forming Core Layer | | | | | | | Dimensions of Core Layer | | |
| --- | --- | --- | --- | --- | --- | --- | --- | --- | --- | --- |
| | Polyolefin-Based Polymer | | | Polymerization | | Refractive Index | | Core Section | Cladding Section | |
| | | Softening | | | | Amount of | Distribution | Average | Average | |
| | Con-stitution | Point (° C.) | Shore D Hardness | Monomer (phr) | Initiator (phr) | Exposure (mJ/cm$^2$) | Width Direction | Thickness Direction | Width WCO (μm) | Width WCL (μm) | WCO/WCL |
| Example 13 | Polymer #1 | 235 | 45 | CHOX 20 | PI 2074 (0.125) | 1300 | GI type | SI-type | 40 | 20 | 2.00 |
| Example 14 | ↑ | ↑ | ↑ | ↑ | ↑ | ↑ | ↑ | ↑ | 40 | 200 | 0.20 |
| Example 15 | ↑ | ↑ | ↑ | ↑ | ↑ | ↑ | ↑ | ↑ | 50 | 75 | 0.67 |
| Example 16 | ↑ | ↑ | ↑ | ↑ | ↑ | 1300 | ↑ | GI type | 50 | 75 | 0.67 |
| Example 17 | ↑ | ↑ | ↑ | ↑ | ↑ | 1500 | ↑ | ↑ | 50 | 75 | 0.67 |
| Example 18 | ↑ | ↑ | ↑ | ↑ | ↑ | 500 | ↑ | ↑ | 50 | 75 | 0.67 |
| Comparative Example 1 | ↑ | ↑ | ↑ | None | PI 2074 (0.1) | 1300 | SI type | SI type | 45 | 80 | 0.56 |

Note:
"↑" in the table means it is the same as the disclosure directly above.

2. Production of Optical Waveguide Having Refractive Index Distribution Shown in FIG. 6

Firstly, an optical waveguide having a linear core section having the refractive index distribution shown in FIG. 6 was produced and evaluation thereof was carried out by 3.

Examples 19 to 37, Comparative Example 2, and Reference Examples 5 to 10

Together with changing the production conditions as shown in Tables 4, 5, and 6, other than changing the drying conditions at the time of core layer formation in Examples 19 to 31 and Reference Examples 5 to 8 at 50° C. for 10 minutes and the drying conditions at the time of core layer formation in Examples 32 to 37, Comparative Example 2, and Reference Examples 9 and 10 at 60° C. for 15 minutes, an optical waveguide was obtained the same as Example 1. Also, in Examples 35 to 37, after obtaining a multicolored molding by co-extrusion molding the same as Example 16, it was irradiated with ultraviolet light.

TABLE 4

(epoxy-based polymer)

| | Composition for Forming Core Layer | | | | | | | Dimensions of Core Layer | | |
| --- | --- | --- | --- | --- | --- | --- | --- | --- | --- | --- |
| | Epoxy-Based Polymer | | | Polymer-ization | | Refractive Index | | Core Section | Cladding Section | |
| | | Softening | | | | Amount of | Distribution | Average | Average | |
| | Con-stitution | Point (° C.) | Shore D Hardness | Monomer (phr) | Initiator (phr) | Exposure (mJ/cm$^2$) | Width Direction | Thickness Direction | Width WCO (μm) | Width WCL (μm) | WCO/WCL |
| Example 19 | YP-50S | 100 | 55 | CELLOXIDE 2021P (25) | SP-170 (2) | 800 | W type | SI type | 45 | 20 | 2.25 |
| Example 20 | ↑ | ↑ | ↑ | ↑ | ↑ | ↑ | ↑ | ↑ | 40 | 200 | 0.20 |
| Example 21 | ↑ | ↑ | ↑ | ↑ | ↑ | ↑ | ↑ | ↑ | 50 | 75 | 0.67 |
| Example 22 | ↑ | ↑ | ↑ | ↑ | ↑ | 1200 | ↑ | ↑ | 30 | 12 | 2.50 |
| Example 23 | ↑ | ↑ | ↑ | CELLOXIDE 2021P (35) | ↑ | 1000 | ↑ | ↑ | 35 | 15 | 2.33 |
| Example 24 | OGSOL EG | 115 | 70 | CELLOXIDE 2021P (25) | ↑ | 600 | ↑ | ↑ | 50 | 30 | 1.67 |
| Example 25 | ↑ | ↑ | ↑ | ↑ | ↑ | ↑ | ↑ | ↑ | 40 | 210 | 0.19 |
| Example 26 | ↑ | ↑ | ↑ | ↑ | ↑ | ↑ | ↑ | ↑ | 50 | 12 | 4.17 |
| Example 27 | ↑ | ↑ | ↑ | CELLOXIDE 2081 (25) | ↑ | ↑ | ↑ | ↑ | 40 | 85 | 0.47 |
| Reference Example 5 | YP-50S | 100 | 55 | ↑ | ↑ | 500 | ↑ | ↑ | 12 | 150 | 0.08 |
| Reference Example 6 | ↑ | ↑ | ↑ | CELLOXIDE 2021P (25) | SP-170 (2) | 1500 | ↑ | ↑ | 50 | 4 | 12.50 |

Note:
"W type" in the refractive index distribution indicates the refractive index distribution including the regions arranged in the order of second local maximum value, local minimum value, first local maximum value, local minimum value, second local maximum value.

Note:
"↑" in the table means it is the same as the description directly above.

TABLE 5

(acrylic-based polymer)

| | Composition for Forming Core Layer | | | | | Refractive Index | | Dimensions of Core Layer | | |
|---|---|---|---|---|---|---|---|---|---|---|
| | Acrylic-Based Polymer | | | Polymer-ization | | Distribution | | Core Section Average | Cladding Section Average | |
| | Con-stitution | Softening Point (° C.) | Shore D Hardness | Monomer (phr) | Initiator (phr) | Exposure (mJ/cm²) | Width Direction | Thickness Direction | Width WCO (μm) | Width WCL (μm) | WCO/WCL |
| Example 28 | MMA + BzMA | 95 | 60 | Cyclohexyl methacrylate (25) | IRGACURE 651 (2) | 700 | W type | SI type | 50 | 15 | 3.33 |
| Example 29 | ↑ | ↑ | ↑ | ↑ | ↑ | ↑ | ↑ | ↑ | 40 | 85 | 0.47 |
| Example 30 | ↑ | ↑ | ↑ | ↑ | ↑ | ↑ | ↑ | ↑ | 40 | 210 | 0.19 |
| Example 31 | ↑ | ↑ | ↑ | Cyclohexyl methacrylate (40) | ↑ | 1200 | ↑ | ↑ | 40 | 25 | 1.60 |
| Reference Example 7 | MMA + BzMA | 95 | 60 | Cyclohexyl methacrylate (25) | IRGACURE 651 (2) | 700 | ↑ | ↑ | 12 | 150 | 0.08 |
| Reference Example 8 | ↑ | ↑ | ↑ | ↑ | ↑ | ↑ | ↑ | ↑ | 120 | 10 | 12.00 |

Note:
"W type" in the refractive index distribution indicates the refractive index distribution including the regions arranged in the order of second local maximum value, local minimum value, first local maximum value, local minimum value, and second local maximum value.
Note:
"↑" in the table means it is the same as the description directly above.

TABLE 6

(polyolefin-based polymer)

| | Composition for Forming Core Layer | | | | | Refractive Index Distribution | | Dimensions of Core Layer | | |
|---|---|---|---|---|---|---|---|---|---|---|
| | Polyolefin-Based Polymer | | | Polymerization | | | | Core Section Average Width | Cladding Section Average Width | |
| | Constitution | Softening Point (° C.) | Shore D Hardness | Monomer (phr) | Initiator (phr) | Exposure (mJ/cm²) | Width Direction | Thickness Direction | WCO (μm) | WCL (μm) | WCO/WCL |
| Example 32 | Polymer #1 | 235 | 45 | CHOX 20 | PI 2074 (0.25) | 1300 | W type | SI type | 40 | 20 | 2.00 |
| Example 33 | ↑ | ↑ | ↑ | ↑ | ↑ | ↑ | ↑ | ↑ | 40 | 200 | 0.20 |
| Example 34 | ↑ | ↑ | ↑ | ↑ | ↑ | ↑ | ↑ | ↑ | 50 | 75 | 0.67 |
| Example 35 | ↑ | ↑ | ↑ | ↑ | ↑ | 1500 | ↑ | GI type | 50 | 75 | 0.67 |
| Example 36 | ↑ | ↑ | ↑ | ↑ | ↑ | 1800 | ↑ | ↑ | 50 | 75 | 0.67 |
| Example 37 | ↑ | ↑ | ↑ | ↑ | ↑ | 700 | ↑ | ↑ | 50 | 75 | 0.67 |
| Comparative Example 2 | ↑ | ↑ | ↑ | None | PI 2074 (0.1) | 1300 | SI type | SI type | 40 | 20 | 2.00 |
| Reference Example 9 | ↑ | ↑ | ↑ | ↑ | ↑ | Graded exposure | GI type | ↑ | 40 | 20 | 2.00 |
| Reference Example 10 | ↑ | ↑ | ↑ | ↑ | ↑ | ↑ | W type | ↑ | 40 | 20 | 2.00 |

Note:
"W type" in the refractive index distribution indicates the refractive index distribution including the regions arranged in the order of second local maximum value, local minimum value, first local maximum value, local minimum value, and second local maximum value.
Note:
"↑" in the table means it is the same as the description directly above.

3. Evaluation of Optical Waveguide 3.1 Refractive Index Distribution of Optical Waveguide The refractive index distribution in the transverse cross-section of the core layer of the obtained optical waveguide was measured along the center line in the thickness direction thereof by an interference microscope, to thereby obtain the refractive index distribution in the width direction of the transverse cross-section of the core layer. In addition, since the obtained refractive index distribution has the same refractive index distribution pattern repeated for each core section, a part from the obtained refractive index distribution was extracted and denoted as the refractive index distribution W. Also, the refractive index distribution T was similarly obtained.

Of the refractive index distribution W, the shape of the distribution denoted as "GI type" in Tables 1 to 3 was a shape in which the high refractive index region WH including the local maximum value Wm and the low refractive index region WL are alternatively arranged like shown in FIG. 5.

Also, of the refractive index distribution W, the shape of the distribution denoted as "W type" in Tables 4 to 6 was a shape in which four local minimum values and five local maximum values are alternatively arranged like shown in FIG. 6. Each local minimum value Ws1, Ws2, Ws3, and Ws4 and each local maximum value Wm1, Wm2, Wm3, Wm4, and Wm5, as well as the average refractive index WA in the cladding section, were determined from this W-type refractive index distribution W. In addition, the change in refractive index was continuous over the entirety thereof for the refractive index distribution W in the width direction of the optical waveguide obtained in each example and each reference example.

Also, in this W-type refractive index distribution W, a width a [μm] of a part in which the refractive index near the local maximum values Wm2, Wm4 formed in the core layer was equal to or higher than the average refractive index WA, and a width b [μm] of a part in which the refractive index near each local minimum value Ws1, Ws2, Ws3, Ws4 formed in the core layer was less than the average refractive index WA were measured.

Also, in each optical waveguide, the maximum rate of change of the refractive index in the gradually decreasing section was within the range of 0.008 to 0.025. Also, the local maximum values of the refractive index of the intersecting section were all higher than the local maximum value Wm, and the difference thereof was within the range of 0.003 to 0.015.

The measured results above are shown in Tables 7 to 13.

TABLE 7

(epoxy-based polymer)

| | Refractive Index Distribution W | | |
|---|---|---|---|
| | WL | Wm | Wm − WL |
| Example 1 | 1.535 | 1.548 | 0.013 |
| Example 2 | 1.540 | 1.549 | 0.009 |
| Example 3 | 1.538 | 1.548 | 0.010 |
| Example 4 | 1.530 | 1.547 | 0.017 |
| Example 5 | 1.580 | 1.601 | 0.021 |
| Example 6 | 1.585 | 1.602 | 0.017 |
| Example 7 | 1.582 | 1.600 | 0.018 |
| Example 8 | 1.575 | 1.602 | 0.027 |

TABLE 7-continued (epoxy-based polymer)

| | Refractive Index Distribution W | | |
|---|---|---|---|
| | WL | Wm | Wm − WL |
| Reference Example 1 | 1.542 | 1.550 | 0.008 |
| Reference Example 2 | 1.545 | 1.549 | 0.004 |

TABLE 8

(acrylic-based polymer)

| | Refractive Index Distribution W | | |
|---|---|---|---|
| | WL | Wm | Wm − WL |
| Example 9 | 1.502 | 1.513 | 0.011 |
| Example 10 | 1.503 | 1.515 | 0.012 |
| Example 11 | 1.506 | 1.514 | 0.008 |
| Example 12 | 1.498 | 1.513 | 0.015 |
| Reference Example 3 | 1.505 | 1.512 | 0.007 |
| Reference Example 4 | 1.508 | 1.512 | 0.004 |

TABLE 9

(polyolefin-based polymer)

| | Refractive Index Distribution W | | |
|---|---|---|---|
| | WL | Wm | Wm − WL |
| Example 13 | 1.543 | 1.557 | 0.014 |
| Example 14 | 1.546 | 1.556 | 0.010 |
| Example 15 | 1 544 | 1.556 | 0.012 |
| Example 16 | 1.547 | 1.557 | 0.010 |
| Example 17 | 1.544 | 1.557 | 0.013 |
| Example 18 | 1.549 | 1.557 | 0.008 |
| Comparative Example 1 | | Step index type | |

TABLE 10

(polyolefin-based polymer)

| | Refractive Index Distribution T | | |
|---|---|---|---|
| | TA | Tm | Tm − TA |
| Example 16 | 1.537 | 1.557 | 0.020 |
| Example 17 | 1.537 | 1.557 | 0.020 |
| Example 18 | 1.537 | 1.557 | 0.020 |

TABLE 11

(epoxy-based polymer)

Parameters for Refractive Index Distribution W in Width Direction

| | Wm1 | Ws1 | Wm2 | Ws2 | Wm3 | Ws3 | Wm4 | Ws4 | Wm5 | Average Refractive Index WA | (WA − Ws1)/ (Wm2 − Ws1) × 100 | (Wm1 − Ws1)/ (Wm2 − Ws1) × 100 | (Wm2 − Ws1) | a [μm] | b |
|---|---|---|---|---|---|---|---|---|---|---|---|---|---|---|---|
| Example 19 | 1.538 | 1.534 | 1.550 | 1.534 | 1.538 | 1.534 | 1.550 | 1.534 | 1.538 | 1.5360 | 12.5 | 25.0 | 0.016 | 38 | 0.30a |
| Example 20 | 1.540 | 1.538 | 1.551 | 1.538 | 1.540 | 1.538 | 1.551 | 1.538 | 1.540 | 1.5390 | 7.7 | 15.4 | 0.013 | 30 | 0.92a |
| Example 21 | 1.540 | 1.536 | 1.551 | 1.536 | 1.540 | 1.538 | 1.551 | 1.536 | 1.540 | 1.5380 | 13.3 | 26.7 | 0.015 | 42 | 0.55a |
| Example 22 | 1.537 | 1.534 | 1.549 | 1.534 | 1.537 | 1.534 | 1.549 | 1.534 | 1.537 | 1.5355 | 10.0 | 20.0 | 0.015 | 25 | 0.28a |
| Example 23 | 1.533 | 1.525 | 1.549 | 1.525 | 1.533 | 1.525 | 1.549 | 1.525 | 1.533 | 1.5290 | 16.7 | 33.3 | 0.024 | 28 | 0.42a |
| Example 24 | 1.583 | 1.574 | 1.600 | 1.574 | 1.583 | 1.574 | 1.600 | 1.574 | 1.583 | 1.5785 | 17.3 | 34.6 | 0.026 | 43 | 0.44a |
| Example 25 | 1.584 | 1.578 | 1.602 | 1.578 | 1.584 | 1.578 | 1.602 | 1.578 | 1.584 | 1.5810 | 12.5 | 25.0 | 0.024 | 35 | 1.1a |
| Example 26 | 1.586 | 1.575 | 1.601 | 1.575 | 1.586 | 1.575 | 1.601 | 1.575 | 1.586 | 1.5805 | 21.2 | 42.3 | 0.026 | 42 | 0.28a |

TABLE 11-continued (epoxy-based polymer)

Parameters for Refractive Index Distribution W in Width Direction

| | Wm1 | Ws1 | Wm2 | Ws2 | Wm3 | Ws3 | Wm4 | Ws4 | Wm5 | Average Refractive Index WA | (WA − Ws1)/(Wm2 − Ws1) × 100 | (Wm1 − Ws1)/(Wm2 − Ws1) × 100 | (Wm2 − Ws1) | a [μm] | b |
|---|---|---|---|---|---|---|---|---|---|---|---|---|---|---|---|
| Example 27 | 1.583 | 1.580 | 1.598 | 1.580 | 1.583 | 1.580 | 1.598 | 1.580 | 1.583 | 1.5815 | 8.3 | 16.7 | 0.018 | 37 | 0.79a |
| Reference Example 5 | 1.541 | 1.540 | 1.545 | 1.540 | 1.541 | 1.540 | 1.545 | 1.540 | 1.541 | 1.5405 | 10.0 | 20.0 | 0.005 | 9 | 1.5a |
| Reference Example 6 | 1.546 | 1.545 | 1.549 | 1.545 | 1.546 | 1.545 | 1.549 | 1.545 | 1.546 | 1.5455 | 12.5 | 25.0 | 0.004 | 48 | 0.05a |

15

TABLE 12

(acrylic-based polymer)

Parameters for Refractive Index Distribution W in Width Direction

| | Wm1 | Ws1 | Wm2 | Ws2 | Wm3 | Ws3 | Wm4 | Ws4 | Wm5 | Average Refractive Index WA | (WA − Ws1)/(Wm2 − Ws1) × 100 | (Wm1 − Ws1)/(Wm2 − Ws1) × 100 | (Wm2 − Ws1) | a [μm] | b |
|---|---|---|---|---|---|---|---|---|---|---|---|---|---|---|---|
| Example 28 | 1.503 | 1.498 | 1.514 | 1.498 | 1.503 | 1.498 | 1.514 | 1.498 | 1.503 | 1.5005 | 15.6 | 31.2 | 0.016 | 44 | 0.25a |
| Example 29 | 1.502 | 1.500 | 1.515 | 1.500 | 1.502 | 1.500 | 1.515 | 1.500 | 1.502 | 1.5010 | 6.7 | 13.3 | 0.015 | 36 | 0.62a |
| Example 30 | 1.502 | 1.501 | 1.514 | 1.501 | 1.502 | 1.501 | 1.514 | 1.501 | 1.502 | 1.5015 | 3.8 | 7.7 | 0.013 | 35 | 0.85a |
| Example 31 | 1.498 | 1.492 | 1.513 | 1.492 | 1.498 | 1.492 | 1.513 | 1.492 | 1.498 | 1.4950 | 14.3 | 28.6 | 0.021 | 35 | 0.45a |
| Reference Example 7 | 1.505 | 1.503 | 1.511 | 1.503 | 1.505 | 1.503 | 1.511 | 1.503 | 1.505 | 1.5040 | 12.5 | 25.0 | 0.008 | 11 | 1.5a |
| Reference Example 8 | 1.505 | 1.504 | 1.513 | 1.504 | 1.505 | 1.504 | 1.513 | 1.504 | 1.505 | 1.5045 | 5.6 | 11.1 | 0.009 | 75 | 0.08a |

TABLE 13

(polyolefin-based polymer)

Parameters for Refractive Index Distribution W in Width Direction

| | Wm1 | Ws1 | Wm2 | Ws2 | Wm3 | Ws3 | Wm4 | Ws4 | Wm5 | Average Refractive Index WA | (WA − Ws1)/(Wm2 − Ws1) × 100 | (Wm1 − Ws1)/(Wm2 − Ws1) × 100 | (Wm2 − Ws1) | a [μm] | b |
|---|---|---|---|---|---|---|---|---|---|---|---|---|---|---|---|
| Example 32 | 1.545 | 1.541 | 1.557 | 1.541 | 1.545 | 1.541 | 1.557 | 1.541 | 1.545 | 1.5430 | 12.5 | 25.0 | 0.016 | 35 | 0.15a |
| Example 33 | 1.548 | 1.544 | 1.556 | 1.544 | 1.548 | 1.544 | 1.556 | 1.544 | 1.548 | 1.5460 | 16.7 | 33.3 | 0.012 | 38 | 0.82a |
| Example 34 | 1.546 | 1.542 | 1.556 | 1.542 | 1.546 | 1.542 | 1.556 | 1.542 | 1.546 | 1.5440 | 14.3 | 28.6 | 0.014 | 45 | 0.3a |
| Example 35 | 1.546 | 1.543 | 1.557 | 1.543 | 1.546 | 1.543 | 1.557 | 1.543 | 1.546 | 1.5445 | 10.7 | 21.4 | 0.014 | 42 | 0.32a |
| Example 36 | 1.544 | 1.541 | 1.557 | 1.541 | 1.544 | 1.541 | 1.557 | 1.541 | 1.544 | 1.5425 | 9.4 | 18.8 | 0.016 | 38 | 0.45a |
| Example 37 | 1.549 | 1.546 | 1.557 | 1.546 | 1.549 | 1.546 | 1.557 | 1.546 | 1.549 | 1.5475 | 13.6 | 27.3 | 0.011 | 44 | 0.28a |
| Comparative Example 2 | Step index-type refractive index distribution W |
| Reference Example 9 | Graded index-type refractive index distribution W |
| Reference Example 10 | Discontinuous refractive index distribution W |

In addition, the refractive index distribution W in the width direction of the optical waveguides obtained in Comparative Examples 1 and 2 was step index type.

3.2 Transmission Loss of Optical Waveguide

Light emitted from an 850 nm VCSEL (surface emitting laser) was introduced through an optical fiber having a diameter of 50 μm into the optical waveguide obtained in each example and each comparative example, and the light intensity was measured by receiving the emitted light with an optical fiber having a diameter of 200 μm. In addition, a cutback method was used for measurement of the transmission loss. Also, when the measurement values were plotted with the longitudinal direction of the optical waveguide defined as the vertical axis and the insertion loss defined as the horizontal axis, the measurement values fell on a straight line. The transmission loss was obtained from the slope of this line. The results are shown in Tables 14 to 19.

3.3 Waveform Retention of Pulse Signal

Pulse signals having a pulse width of 1 ns from a laser pulse light source were made incident on the obtained optical waveguides and then the pulse width of the output light was measured.

Also, regarding the measured pulse width of the output light, relative values when the measurement value of the optical waveguide obtained in Comparative Example 1 in Tables 14 to 16 was defined as 1 and when the measurement value of the optical waveguide obtained in Comparative Example 2 in Tables 17 to 19 were obtained. Such was evaluated according to the evaluation criteria below. The results are shown in Tables 14 to 19.

Also, regarding the pulse width of the measured emitted light, the relative values were calculated denoting 1 as the measured value of the optical waveguide obtained in Comparative Example 1 in Tables 14 to 16 and denoting 1 as the measured valued of the optical waveguide obtained in Comparative Example 2 in Tables 17 to 19, and these were evaluated according to the evaluation standard below. The results are shown in Tables 14 to 19 below.

<Pulse Width Evaluation Standard>

A: Relative value of pulse width is less than 0.5

B: Relative value of pulse width is 0.5 or more and less than 0.8

C: Relative value of pulse width is 0.8 or more and less than 1 x: Relative value of pulse width is 1 or more

TABLE 14

(epoxy-based polymer)

| | Evaluation Result | | | | Intersecting Portion Loss [dB/cross] | | | Amount of Interference Light |
|---|---|---|---|---|---|---|---|---|
| | Transmission Loss [dB/cm] | Pulse Width | | | 30° | 60° | 90° | (relative value) |
| Example 1 | 0.04 | A | Example A | | 0.047 | 0.021 | 0.016 | 0.75 |
| Example 2 | 0.11 | C | Example B | | 0.053 | 0.026 | 0.020 | 0.87 |
| Example 3 | 0.10 | B | Example C | | 0.051 | 0.028 | 0.020 | 0.84 |
| Example 4 | 0.05 | B | Example D | | 0.052 | 0.026 | 0.018 | 0.81 |
| Example 5 | 0.05 | A | Example E | | 0.047 | 0.024 | 0.017 | 0.78 |
| Example 6 | 0.07 | B | Example F | | 0.051 | 0.025 | 0.019 | 0.80 |
| Example 7 | 0.10 | B | Example G | | 0.053 | 0.026 | 0.019 | 0.85 |
| Example 8 | 0.04 | A | Example H | | 0.046 | 0.025 | 0.017 | 0.76 |
| Reference Example 1 | 0.15 | C | Reference Example A | | 0.060 | 0.033 | 0.028 | 0.95 |
| Reference Example 2 | 0.35 | x | Reference Example B | | 0.083 | 0.039 | 0.042 | 0.98 |

TABLE 15

(acrylic-based polymer)

| | Evaluation Result | | | | Intersecting Portion Loss [dB/cross] | | | Amount of Interference Light |
|---|---|---|---|---|---|---|---|---|
| | Transmission Loss [dB/cm] | Pulse Width | | | 30° | 60° | 90° | (relative value) |
| Example 9 | 0.05 | A | Example I | | 0.047 | 0.025 | 0.017 | 0.76 |
| Example 10 | 0.08 | B | Example J | | 0.052 | 0.027 | 0.019 | 0.82 |
| Example 11 | 0.07 | C | Example K | | 0.051 | 0.028 | 0.019 | 0.87 |
| Example 12 | 0.06 | A | Example L | | 0.049 | 0.024 | 0.018 | 0.77 |
| Reference Example 3 | 0.17 | C | Reference Example C | | 0.070 | 0.038 | 0.029 | 0.95 |
| Reference Example 4 | 0.55 | x | Reference Example D | | 0.227 | 0.072 | 0.039 | 0.97 |

TABLE 16

(polyolefin-based polymer)

| | Evaluation Result | | | | Intersecting Portion Loss [dB/cross] | | | Amount of Interference Light |
|---|---|---|---|---|---|---|---|---|
| | Transmission Loss [dB/cm] | Pulse Width | | | 30° | 60° | 90° | (relative value) |
| Example 13 | 0.05 | A | Example M | | 0.051 | 0.023 | 0.017 | 0.72 |
| Example 14 | 0.08 | B | Example N | | 0.053 | 0.026 | 0.018 | 0.83 |

TABLE 16-continued (polyolefin-based polymer)

| | Evaluation Result | | | Intersecting Portion Loss [dB/cross] | | | Amount of Interference Light |
|---|---|---|---|---|---|---|---|
| | Transmission Loss [dB/cm] | Pulse Width | | 30° | 60° | 90° | (relative value) |
| Example 15 | 0.07 | C | Example O | 0.062 | 0.027 | 0.019 | 0.88 |
| Example 16 | 0.04 | A | Example P | 0.013 | 0.009 | 0.006 | 0.70 |
| Example 17 | 0.03 | A | Example Q | 0.012 | 0.009 | 0.005 | 0.68 |
| Example 18 | 0.05 | A | Example R | 0.033 | 0.013 | 0.007 | 0.73 |
| Comparative Example 1 | 0.24 | — | Comparative Example A | 0.123 | 0.066 | 0.039 | 1 |

TABLE 17

(epoxy-based polymer)

| | Evaluation Result | | | Intersecting Portion Loss [dB/cross] | | | Amount of Interference Light |
|---|---|---|---|---|---|---|---|
| | Transmission Loss [dB/cm] | Pulse Width | | 30° | 60° | 90° | (relative value) |
| Example 19 | 0.04 | A | Example S | 0.046 | 0.021 | 0.017 | 0.72 |
| Example 20 | 0.08 | C | Example T | 0.051 | 0.026 | 0.019 | 0.91 |
| Example 21 | 0.06 | B | Example U | 0.050 | 0.027 | 0.018 | 0.79 |
| Example 22 | 0.05 | A | Example V | 0.049 | 0.021 | 0.017 | 0.73 |
| Example 23 | 0.07 | B | Example W | 0.051 | 0.025 | 0.018 | 0.81 |
| Example 24 | 0.05 | A | Example X | 0.047 | 0.023 | 0.017 | 0.74 |
| Example 25 | 0.08 | C | Example Y | 0.051 | 0.024 | 0.019 | 0.87 |
| Example 26 | 0.06 | C | Example Z | 0.052 | 0.023 | 0.018 | 0.86 |
| Example 27 | 0.05 | B | Example a | 0.046 | 0.024 | 0.017 | 0.83 |
| Reference Example 5 | 0.23 | C | Reference Example E | 0.058 | 0.031 | 0.027 | 0.94 |
| Reference Example 6 | 0.30 | C | Reference Example F | 0.079 | 0.046 | 0.041 | 0.96 |

TABLE 18

(acrylic-based polymer)

| | Evaluation Result | | | Intersecting Portion Loss [dB/cross] | | | Amount of Interference Light |
|---|---|---|---|---|---|---|---|
| | Transmission Loss [dB/cm] | Pulse Width | | 30° | 60° | 90° | (relative value) |
| Example 28 | 0.05 | A | Example b | 0.047 | 0.024 | 0.017 | 0.74 |
| Example 29 | 0.07 | B | Example c | 0.050 | 0.027 | 0.018 | 0.82 |
| Example 30 | 0.09 | C | Example d | 0.052 | 0.037 | 0.019 | 0.87 |
| Example 31 | 0.06 | A | Example e | 0.050 | 0.023 | 0.017 | 0.77 |
| Reference Example 7 | 0.23 | C | Reference Example G | 0.067 | 0.037 | 0.031 | 0.97 |
| Reference Example 8 | 0.33 | C | Reference Example H | 0.153 | 0.069 | 0.036 | 0.99 |

TABLE 19

(polyolefin-based polymer)

| | Evaluation Result | | | Intersecting Portion Loss [dB/cross] | | | Amount of Interference Light |
|---|---|---|---|---|---|---|---|
| | Transmission Loss | | | | | | |
| | [dB/cm] | Pulse Width | | 30° | 60° | 90° | (relative value) |
| Example 32 | 0.04 | A | Example f | 0.049 | 0.023 | 0.016 | 0.71 |
| Example 33 | 0.06 | C | Example g | 0.052 | 0.028 | 0.019 | 0.84 |
| Example 34 | 0.04 | B | Example h | 0.053 | 0.026 | 0.018 | 0.79 |
| Example 35 | 0.03 | A | Example i | 0.012 | 0.009 | 0.005 | 0.67 |
| Example 36 | 0.03 | A | Example j | 0.011 | 0.009 | 0.005 | 0.66 |
| Example 37 | 0.05 | A | Example k | 0.029 | 0.011 | 0.006 | 0.69 |
| Comparative Example 2 | 0.21 | — | Comparative Example B | 0.123 | 0.066 | 0.039 | 1 |
| Reference Example 9 | 0.12 | C | Reference Example I | 0.100 | 0.043 | 0.026 | 0.95 |
| Reference Example 10 | 0.10 | C | Reference Example J | 0.086 | 0.039 | 0.022 | 0.97 |

As is clear from Tables 14 to 19, it is recognized that transmission loss and bluntness of the pulse signal were suppressed in the optical waveguide obtained in each example compared to the optical waveguide obtained in each comparative example.

In addition, regarding the composition for forming a core layer in which the photobleaching phenomenon occurs used in Comparative Example 1, since the modulation amount of the refractive index was able to be adjusted according to the amount of irradiated light, utilizing this, forming the refractive index distribution W using a photomask set such that the accumulated light amount gradually changes was tested. Upon evaluation of the refractive index distribution like as described above for the obtained optical waveguide, although a high refractive index region and a low refractive index region were confirmed, change in the refractive index was not as continuous as each example. Also, the transmission loss was large and retention of the wave shape of the pulse signal was also low for the obtained optical waveguide compared to each example.

4. Production of Optical Waveguide Having Intersecting Section

Next, under the same conditions as each of the above-mentioned examples, comparative examples, and reference examples, optical waveguides having an intersecting section were produced as follows.

Example A

Other than using a photomask corresponding to the pattern of the optical waveguide having an intersecting section as the photomask used when producing the core layer, an optical waveguide having an intersecting section was prepared by producing an optical waveguide in the same way as Example 1. In addition, when producing the optical waveguide, three optical waveguides in which the intersection angle in each intersecting section was 30°, 60°, and 90° respectively were produced.

Examples B to Z, and a to k, Comparative Examples A and B, and Reference Examples A to J Other than using a photomask corresponding to the pattern of the optical waveguide having an intersecting section as the photomask used when producing the core layer, an optical waveguide having an intersecting section was prepared by producing an optical waveguide in the same way Examples 2 to 37, Comparative Examples 1 and 2, and Reference Examples 1 to 10. Also, when producing the optical waveguide, three optical waveguides in which the intersection angle in each intersecting section was 30°, 60°, and 90° respectively were produced.

5. Evaluation of Optical Waveguide Having Intersecting Section

Next, the insertion loss between both end sections was measured for the obtained optical waveguide having an intersecting section. The calculated transmission loss in the intersecting section is shown in Tables 14 to 19. As a result, the insertion loss value showed the same tendency as the above-described transmission loss. In other words, whereas the insertion loss was sufficiently small for the optical waveguide having an intersecting section obtained in each example, the insertion loss was comparatively large for the optical waveguide having an intersecting section obtained in each comparative example. Also, it was recognized that the smaller the transmission loss measured in 3, the smaller also is amount of the interfering signal light.

Also, upon measuring the transmission loss in the intersecting section, it became clear that the optical waveguide having an intersecting section obtained in each example have a smaller transmission loss in the intersecting section than the optical waveguide having an intersecting section obtained in each comparative example. In addition, when the intersection angle was 90°, the transmission losses were all 0.02 dB or less.

Also, the calculation method of the transmission loss in the intersecting section was a method in which a plurality of sample having a different number of intersections were prepared and, from a comparison of the insertion loss thereof, the transmission loss for one intersecting section is calculated.

Also, the amount of interfering light (interference light amount) in the core section intersecting with the core section which is the measurement target was measured. Also, regarding the measured interference light amount, the relative values were calculated when 1 is denoted as the measured value of the optical waveguide obtained in Comparative Example 1 in Tables 14 to 16 and when the measured value of the optical waveguide obtained in Comparative Example 2 is denoted as 1 in Tables 17 to 19, and are shown in Tables 14 to 19.

As a result, it was recognized that the amount of interfering signal light is reduced by optimizing the refractive index distribution W.

From the above, it has become clear that loss and transmission can be suppressed in an optical waveguide having a core section in which the refractive index distribution has become a continuous distribution satisfying specific conditions.

INDUSTRIAL APPLICABILITY

In accordance with the present invention, an opto-electric hybrid board in which optical wiring is freely disposed without restriction by the arrangement of electrical elements and the like, and in which high-density mounting of electrical wiring and optical wiring is possible can be obtained.

Also, since detachment of an optical waveguide in which optical wiring has been constructed is possible, on opto-electric hybrid board for which assembly and repair are easy can be obtained.

Also, in accordance with the present invention, an electrical device including the above-mentioned opto-electric hybrid board, and for which miniaturization and high performance has been made possible, can be obtained.

Furthermore, in accordance with the present invention, an optical waveguide which, when mounted so as to be superimposed on the electrical wiring board, has made possible the free construction of optical wiring while retaining heat dissipation of electrical elements disposed on the electrical wiring board can be obtained.

Also, in accordance with the present invention, an optical interconnection component, an optical module, an opto-electric hybrid board, and an electronic device including high-density optical wiring can be obtained.

From the above, the present invention is very industrially useful.

1 optical waveguide
1a sheet-like part
1b belt-like part
1c notch
1d connection section
10 optical interconnection component
100 optical module
1000 opto-electric hybrid board
101 optical connector
1011 connector body
1012 leg section
1013 connector lid
11, 12 cladding layer
13 core layer
14 core section
141, 142 core section
147, 148 intersecting section
15 side surface cladding section
151, 152, 153 side surface cladding sections
16 lens
17 mirror
170 convex section
18 metal layer
18c through wiring
2 support film
3 cover film
4 opto-electric conversion section
41 opto-electric conversion section substrate
411, 411a, 411b insulating substrate
412, 412a, 412b electrical wiring
4120 connection point
413 through wiring
414 through-hole
42 electrical connector
44 heat spreader
45 sealing material
5 motherboard
50 electrical element for electrical wiring board
501 LSI
502 condenser
503 chip resistor
51 insulating substrate
52 electrical wiring
53 electrical connector
55 electrical interposer
550 multilayer substrate
551 core substrate
552 build-up layer
553 bump
554, 555 reinforcement member
556 heat transfer post
6 optical element
60 element body
61 light receiving/emitting section
62 terminal
7 electrical element for opto-electric conversion section
70 element body
72 terminal
C1 center line
W refractive index distribution

The invention claimed is:

1. An opto-electric hybrid board, comprising:
an electrical wiring board including a first substrate, an electrical wiring disposed on an inside of the first substrate or on a surface of the first substrate, and an electrical element mounted on the first substrate; and
an optical waveguide film configured such that a signal associated with opto-electric conversion is transmitted between the optical waveguide film and the electrical wiring board and positioned on the electrical wiring board such that the electrical element is positioned between the optical waveguide film and the first substrate,
wherein the optical waveguide film includes a core layer including a plurality of core sections and a side surface cladding section formed adjacent to a side surface of each of the core sections and an optical path conversion element configured to convert an optical path of the core sections, the core sections intersect each other on one plane, the core layer has a refractive index distribution in a width direction of the core layer such that the refractive index distribution has a maximum value, a first and second secondary maximum values smaller than the maximum value and a first and second minimum values in an order of the first secondary maximum value, the first minimum value, the maximum value, the second minimum value and the second secondary maximum value, a section between the first and second minimum values including the maximum value corresponds to the core section, and a section including the first or second secondary maximum value corresponds to the side surface cladding section.

2. The opto-electric hybrid board according to claim 1, wherein the optical waveguide film is detachable from the electrical wiring board.

3. The opto-electric hybrid board according to claim 1, wherein the optical waveguide film further includes an opto-electric conversion element including a second substrate, an electrical wiring disposed on an inside of the second substrate or on a surface of the second substrate, and an optical element mounted on the second substrate, the optical path conversion element of the optical waveguide is film optically connected to the optical element of the opto-electric conversion element, and the electrical wiring of the opto-electric conversion element is configured to be electrically connected to the electrical wiring of the electrical wiring board.

4. The opto-electric hybrid board according to claim 3, wherein the electrical wiring board further comprises an electrical connector configured to be electrically connected to the electrical wiring of the opto-electric conversion element and connected to the electrical wiring of the electrical wiring board.

5. The opto-electric hybrid board according to claim 3, wherein the opto-electric conversion element further includes a radiator covering the optical element.

6. The opto-electric hybrid board according to claim 1, wherein the optical waveguide film further includes a metal layer positioned on at least one surface of the core layer.

7. The opto-electric hybrid board according to claim 6, wherein the metal layer includes as a main component aluminum, iron, copper, or an alloy of aluminum, iron or copper.

8. The opto-electric hybrid board according to claim 6, wherein the metal layer is in direct contact with the electrical element or in indirect contact with the electrical element via a heat conduction section.

9. The opto-electric hybrid board according to claim 1, wherein the optical waveguide film is positioned such that a space is formed between the first substrate of the electrical wiring board and the optical waveguide film.

10. The opto-electric hybrid board according to claim 1, further comprising:
a motherboard,
wherein the electrical wiring board is forming an electrical interposer and mounted on the motherboard, and the optical waveguide film is configured such that the optical waveguide film covers the electrical element of the electrical interposer and that the electrical element is positioned between the optical waveguide film and the first substrate.

11. The opto-electric hybrid board according to claim 10, wherein the electrical wiring board further includes a metal layer positioned on each side of the first substrate, and a via post connecting the metal layers by penetrating the first substrate.

12. The opto-electric hybrid board according to claim 1, wherein the electrical wiring board further includes a metal layer positioned on at least one side of the first substrate.

13. The opto-electric hybrid board according to claim 1, further comprising:
an optical connector attached to an end section of the core sections.

14. An electronic device, comprising:
the opto-electric hybrid board according to claim 1.

15. An optical waveguide, comprising:
a core layer including a through-hole configured to insert an electrical element therein when the optical waveguide is superimposed on an electrical wiring board having the electrical element, the core layer including a core section and a side surface cladding section formed adjacent to each side surface of the core section; and
an optical path conversion element configured to convert an optical path of the core section,
wherein the core layer has a refractive index distribution in a width direction of the core layer such that the refractive index distribution has a maximum value, a first and second secondary maximum values smaller than the maximum value and a first and second minimum values in an order of the first secondary maximum value, the first minimum value, the maximum value, the second minimum value and the second secondary maximum value, a section between the first and second minimum values including the maximum value corresponds to the core section, and a section including the first or second secondary maximum value corresponds to the side surface cladding section.

16. The optical waveguide according to claim 15, further comprising:
a metal layer positioned on one side of the core layer such that the metal layer blocks at least a part of the through-hole.

17. The optical waveguide according to claim 16, wherein the metal layer includes as a main component one of copper, a copper alloy, aluminum, and an aluminum alloy.

18. The optical waveguide according to claim 15, wherein the core layer includes a plurality of core sections such that the plurality of core sections intersect with each other on one plane.

19. The optical waveguide according to claim 18, wherein each of the core sections has the refractive index distribution continuously decreasing from the maximum value toward each of the first and second minimum values.

20. The optical waveguide according to claim 16, further comprising:
a lens positioned on a side of the core layer other than the side on which the metal layer is positioned.

21. An optical interconnection component, comprising:
an optical waveguide according to claim 15; and
an optical connector attached to an end section of the core section.

22. An optical module, comprising:
an optical waveguide according to claim 15; and
an optical element positioned on one side of the core layer and optically connected to the optical path conversion element.

23. The optical module according to claim 22, further comprising:
a radiator covering the optical element.

24. The optical module according to claim 22, further comprising:
a substrate positioned between the core layer and the optical element;
an electrical wiring disposed on an inside of the substrate or on a surface of the substrate; and
a first terminal connected to the electrical wiring.

25. The optical module according to claim 24, further comprising:
a motherboard,
wherein the electrical wiring board is forming an electrical interposer and mounted on the motherboard,
the optical waveguide is configured to cover the electrical interposer, and the electrical element of the electric interposer is configured to be inserted into the through-hole.

26. The optical module according to claim 25, wherein the electrical interposer includes an electrical wiring disposed on an inside of the electrical interposer or on a surface of the electrical interposer and a second terminal configured to be connected to the electrical wiring, and the first terminal is configured to be connected to the second terminal of the electrical interposer.

27. An opto-electric hybrid board, comprising:
   an optical waveguide according to claim 15,
   wherein the core layer of the optical waveguide film is made of a polymer material.

28. An electronic device, comprising:
   an optical waveguide according to claim 15.

* * * * *